US005752054A

United States Patent [19]

Garber et al.

[11] Patent Number: 5,752,054

[45] Date of Patent: May 12, 1998

[54] SYSTEM AND METHOD FOR DEVELOPING AND/OR MAINTAINING MULTIPLE WORKPLACE PROTECTION PROGRAMS

[75] Inventors: Sharon R. Garber, Crystal; Rena H. Glaser, St. Paul; Carolyn M. Cary, Woodbury, all of Minn.

[73] Assignee: Minnesota Mining and Manufacturing Company, St. Paul, Minn.

[21] Appl. No.: 471,725

[22] Filed: Jun. 6, 1995

[51] Int. Cl.[6] .......... G06F 17/30

[52] U.S. Cl. .......... 395/767; 395/768; 395/615

[58] Field of Search .......... 395/155, 600; 364/300

[56] References Cited

U.S. PATENT DOCUMENTS

| | | | |
|---|---|---|---|
| 4,347,568 | 8/1982 | Giguere | 364/300 |
| 5,241,671 | 8/1993 | Reed | 395/600 |
| 5,251,294 | 10/1993 | Abelow | 395/155 |

OTHER PUBLICATIONS

Worker Safety Hinges on Knowledge Plant Engineering v47, n5, pt-12(3) Mar. 18, 1993.

Keeping the Shine on Your Respirator Program (Smith, S.L) Occupational Hazards, v54, n11, p. 34(4).

For Environmental Contractors, Protective Gear American Agent & Brown, v66 n4, pp. 22–23 (Apr. 1994).

HealthWorks Occupational Medicine Centers Brochure, undated, 5 pages (No Date).

HealthWorks Medical Authorization Form, Patient Registration Form, and Worker's Compensation Update Form, undated, 3 pages (No Date).

DOT/OSHA/EPA Compliance Software Brochure "Powerful Tools To Help Make Managing Vital Information Faster and Easier", 1995, J.J. Keller & Associates, Inc., Neenah, Wisconsin, 4 pages.

PC Compliance Training Tracker Sample Report Packet, authoir unidentified, dated Apr. 4, 199, 7 pages.5

Keller's Safety Tracker Sample Report Packet, dated Apr. and May, 1995, 12 pages.

Brochure Keller's SafetyTracker™, The OSHA Accident & Illness Reportig Software!, undated, J.J. Keller & Associates, Neenah, Wisconsin, 1 page (No Date).

Software Resources Resources & Marketing "TRAIN/TRAK™ Training Documentation Data Management System for Personal Computers", The HAWKA Group, Inc., Wadsworth, Illinois, 20 pages.

Brochure Software Reviews, American Indiana Hygienists Association, J(56), Jun. 1995, Neil T. McManus, 2 pages.

Brochure "Mapping the World of Computerised Industrial Audiometry", undated, Ruskal Systems, 11 pages (No Date).

Brochure "OHC–K Occupational Hearing Conservation Data Management on IBM Compatible Computers", Mar. 7, 1995, by Savear Inc., 4 pages.

Manual Relating to Administrative Respiratory Protection Program Written Standard Operating Procedures and released by 3M (No Date).

(List continued on next page.)

*Primary Examiner*—Thomas G. Black
*Assistant Examiner*—Diane D. Mizrahi
*Attorney, Agent, or Firm*—Marshall, O'Toole, Gerstein, Murray & Borun

[57] ABSTRACT

A program is disclosed which fully integrates the development and maintenance of multiple workplace protection programs. The program (i) provides the forms which are useful in developing and maintaining multiple workplace protection programs, (ii) facilitates the training of employees which is necessary to ensure that the multiple workplace protection programs are effective, (iii) includes the database which is necessary to provide all of the knowledge required during the development and maintenance of the multiple workplace protection programs, (iv) permits customization of the multiple workplace protection programs, (v) allows the employer and employees to read the knowledge provided by fully informative multiple workplace protection programs, (vi) assists the employer in preparing for an audit of the multiple workplace protection programs, and (vii) generates written standard operating procedures.

71 Claims, 80 Drawing Sheets

OTHER PUBLICATIONS

Brochure—Software 2000, The AS/400 Software Market Survey by Sentry Market Research (6 pages), 1992.

Brochure—Medgate OHS&E Software Article, AIHCE May 1993.

Brochure—Stewart-Todd Corporate Maintenance Subsystem (No Date).

Brochure—O.R.M. Objective Risk Management (No Date).

Brochure—RegScan "We Gotta Talk" (No Date).

Brochure—SSG, Ware: The Worksite Accident Reduction Expert, Systems & Software Group (No Date).

Brochure—RespFit, Respirator Fit Testing Software, Sigma Science (No Date).

Brochure—OHMIS, Occupational Health Management Information System "Hears HHIM MIM" (No Date).

Brochure—ChemAdvisor, Inc. Regulatory Compliance Products & Services (No Date).

Brochure—Industrial Hygiene Specialty Services, Exposure Base Software (No Date).

Brochure—"We don't make the rules. We just make them easier for you to find.", Micromedex, Inc., IHS (No Date).

Brochure—OSHALOG.200 Series, Risk Management Software Solutions for Business and Industry, Safety Software (No Date).

Brochure—Employee Health Environmental Surveillance Regulatory Compliance, Flow Gemini, Occupational Health and Environmental Information Systems (No Date).

Brochure—"How to obtain Regulatory relief. In seconds.", OSHA-Soft, Inc. (No Date).

Brochure—Environment Today, Special Supplement to Environmental Technology News, Software spotlight: Compliance programs prove their worth, ERM Computer Services, Inc., Jan. 1993.

Brochure—SuperTrak Occupational Health Information Tracking System (No Date).

SYSTEM AND METHOD FOR DEVELOPING AND/OR MAINTAINING MULTIPLE WORKPLACE PROTECTION PROGRAMS

RELATED APPLICATION

U.S. patent application Ser. No. 08/233,589 filed on Apr. 26, 1994 and now abandoned is directed to a system and method for developing and/or maintaining a workplace respiratory protection program.

TECHNICAL FIELD

The present invention relates to a system and method for developing and/or maintaining multiple workplace protection programs.

BACKGROUND OF THE INVENTION

Government regulatory bodies, such as the Occupational Safety and Health Administration (OSHA) in the United States of America, and standards setting organizations, such as the Canadian Standards Administration (CSA) in Canada, promulgate regulations and establish standards intended to control the safety of the workplaces provided by employers to their employees. For example, one such regulation promulgated by OSHA requires employers to establish respiratory protection programs. This regulation is intended to reduce exposure to employees against such airborne contaminants as occupational dusts, fumes, mists, radionuclides, gases, and vapors. Where feasible, effective engineering controls are to be implemented in order to maintain such airborne contaminants at levels which are considered to be non-hazardous to employees. However, where effective engineering controls are not feasible, or while such engineering controls are being designed, implemented, and evaluated, use of respirators may be required in order to protect employees from exposure to these airborne contaminants.

In the past, there have been numerous problems connected with workplace respiratory protection programs. The development of such workplace respiratory protection programs has involved haphazard and nonstructured searches for the various governmental regulations and standards which impact respiratory protection in a workplace and for the respirators and standard operating procedures which must be adopted to assure compliance with the applicable governmental regulations and standards. The development of the workplace respiratory protection program to ensure compliance with the applicable governmental regulations and standards usually also requires the accumulation and maintenance of a great many forms. These forms may include, for example, medical questionnaires, requests for medical clearance, fit test results, exposure assessments, various evaluation forms, and the like. Once the workplace respiratory protection program has been developed, this program must be maintained in order to assure continuing compliance with the applicable governmental regulations and standards.

Moreover, responsibility within the workplace for the development and maintenance of the workplace respiratory protection program may be delegated to a great many people, may be decentralized, and may not be clearly defined. The forms created during both the development and the maintenance of the workplace respiratory protection program typically are filled out by a great many people and are stored in a great many locations within a workplace, which can make finding these records difficult. The documentation, which relates to the respirators and which are approved for each employee, for each type of job within the workplace, for each workplace location, and for each type of contaminant to which employees may be exposed, may also be scattered throughout a workplace. Standard operating procedures, such as those relating to cleaning, inspection, and training, may not be easily accessible. Training requirements and procedures with respect to the use and maintenance of respirators may not be consistently and centrally controlled within a workplace.

Furthermore, workplaces are frequently audited to assure that the employer is in compliance with the applicable governmental regulations and standards. Because the forms and records used in the workplace respiratory protection program are typically decentralized and may be scattered throughout a workplace, it may be extremely difficult for the employer to prepare for an audit. Failure to assure the auditor that the employer is in compliance with governmental regulations and standards can lead to the imposition of fines and other penalties.

While some efforts have been made in the past in an attempt to manage compliance with various governmental regulations and standards relating to health and safety, such efforts have not been adequate and have not involved complete workplace respiratory protection programs. Thus, software application programs exist which allow the users thereof to create and maintain databases containing certain employee records relating to health and safety. These records may include medical tests, physical examinations, accident and illness reports, and the treatments prescribed as a result of the reported accidents and illnesses. These records allow accidents and illnesses to be tracked and, hopefully, managed. Some software application programs assist the user in filling out the forms required by government regulators for the reporting of employee accidents and illnesses. Some software application programs assist the user in maintaining records relating to hygiene and to workplace safety training.

It has even been known to integrate one or more of these software application programs with each other and with software application programs which allow maintenance of Material Safety Data Sheets and records related to hazardous materials. There are also software application programs which allow employers to monitor and track employee demographics, injuries and illnesses, worker's compensation claims, the workplace environment, employee medical health, and hazardous materials in the workplace.

However, such software application programs have substantial problems. For example, none of these software application programs relate to respiratory protection, and none of these software application programs fully integrate the development and maintenance of a workplace respiratory protection program for the protection of employees in the workplace. Accordingly, none of these software application programs integrate all aspects of workplace respiratory protection programs such as (i) the forms which are useful in developing and maintaining a workplace respiratory protection program, (ii) the training of employees which is necessary to ensure that the workplace respiratory protection program is effective, (iii) the database which is necessary to provide all of the information required during the development and maintenance of a workplace respiratory protection program, (iv) the customization which is necessary to permit the employer to tailor a workplace respiratory protection program to the employer's workplace, (v) the ability of the employer and employees to read the information provided by a fully informative workplace respiratory protection program, and (vi) the assistance helpful to the employer in preparing for an audit of the workplace respiratory protection program.

Additionally, another regulation promulgated by OSHA requires employers to establish hearing protection programs. This regulation is intended to reduce exposure to employees of potentially harmful noise levels. Where feasible; the noise level within the workplace is to be controlled at levels below those which may be harmful to the hearing of workers. However, where noise levels cannot be controlled below potentially harmful levels, use of hearing protectors may be required in order to protect employees from potential loss of hearing.

There are existing hearing conservation software programs which primarily handle record keeping and analysis. Such programs facilitate the maintenance of records regarding noise level tests conducted in the workplace, regarding employees who may be exposed to harmful noise levels, regarding hearing protection devices which are to be worn by such employees, and the like. Moreover, these hearing conservation software programs permit employers to conduct in-depth analyses relating to noise exposure in the workplace. Furthermore, there are several software programs which help employers address different safety related regulations and standards.

Such hearing related software programs, however, do not support the development of workplace hearing protection programs, do not permit hypertext linking of the requirements and forms of a workplace hearing protection program, do not integrate the customization of workplace hearing protection requirements and the display of forms useful in the customization process, do not integrate the development of a workplace hearing protection program which complies with governmental hearing protection regulations and the assistance necessary for the preparation of an audit, do not integrate the development and maintenance of a workplace hearing protection program, and do not integrate the maintenance of records relating to a workplace protection program and the assistance necessary in order to prepare for an audit.

Moreover, software programs related to workplace safety do not prompt the development of multiple workplace protection programs, and do not integrate the display of multiple workplace protection programs and the development of records relating to the multiple workplace protection programs.

The present invention solves one or more of the above described problems.

SUMMARY OF THE INVENTION

In one aspect of the present invention, a method of developing a workplace hearing protection program comprises the steps, performed by a data processing system, of (a) executing program code to retrieve requirements of the workplace hearing protection program from a database of the data processing system and to display the requirements of the workplace hearing protection program to a user, and (b) executing program code to prompt development of the workplace hearing protection program based upon the requirements of the workplace hearing protection program stored in the database and displayed to the user.

In another aspect of the present invention, a method of developing a workplace hearing protection program comprises the steps, performed by a data processing system, of (a) executing first program code to display requirements for a workplace hearing protection program, (b) executing second program code in order to display forms useful in the development of the workplace hearing protection program, and (c) linking the first and second program codes in hypertext fashion.

In still another aspect of the present invention, a method of customizing a workplace hearing protection program comprises the steps, performed by a data processing system, of (a) executing first program code to prompt customization of workplace hearing protection requirements of the workplace hearing protection program, and (b) executing second program code in order to display forms useful in the customization of the workplace hearing protection program.

In yet another aspect of the present invention, a method of developing a workplace hearing protection program and of preparing for an audit thereof comprises the steps, performed by a data processing system, of (a) executing first program code to prompt the development of a workplace hearing protection program which complies with governmental hearing protection regulations, and (b) executing second program code in order to assist a user in preparing for an audit of the workplace hearing protection program.

In a still further aspect of the present invention, a method of developing and maintaining a workplace hearing protection program comprises the steps, performed by a data processing system, of (a) executing first program code to prompt the development of a workplace hearing protection program which includes hearing protection requirements and creation of records, and (b) executing second program code in order to maintain the workplace hearing protection program and in order to maintain the records so as to stay in compliance with the hearing protection requirements.

In yet a still further aspect of the present invention, a method of maintaining a workplace hearing protection program and of preparing for an audit thereof comprises the steps, performed by a data processing system, of (a) executing first program code to maintain records relating to the workplace hearing protection program, and (b) executing second program code in order to assist a user in preparing for an audit of the workplace hearing program.

In yet another aspect of the present invention, a method of developing workplace protection programs comprises the steps, performed by a data processing system, of (a) executing first program code to select execution of second and third program code, (b) upon selecting execution of the second program code, executing the second program code to retrieve requirements of a first workplace protection program from a database of the data processing system, to display the requirements of the first workplace protection program to a user, and to prompt development of the first workplace protection program based upon the requirements of the first workplace protection program stored in the database and displayed to the user, and (c) upon selecting execution of the third program code, executing the third program code to retrieve requirements of a second workplace protection program from a database of the data processing system, to display the requirements of the second workplace protection program to the user, and to prompt development of the second workplace protection program based upon the requirements of the second workplace protection program stored in the database and displayed to the user.

In still another aspect of the present invention, a method of developing workplace protection programs comprises the steps, performed by a data processing system, of (a) executing first program code to display a first workplace protection program to a user, (b) executing second program code to display a second workplace protection program to the user, and (c) executing third program code to prompt creation of records relating to the first and second workplace protection programs.

BRIEF DESCRIPTION OF THE DRAWING

These and other features and advantages will become more apparent from a detailed consideration of the invention when taken In conjunction with the drawing in which.

DETAILED DESCRIPTION OF THE INVENTION

Figure 1:
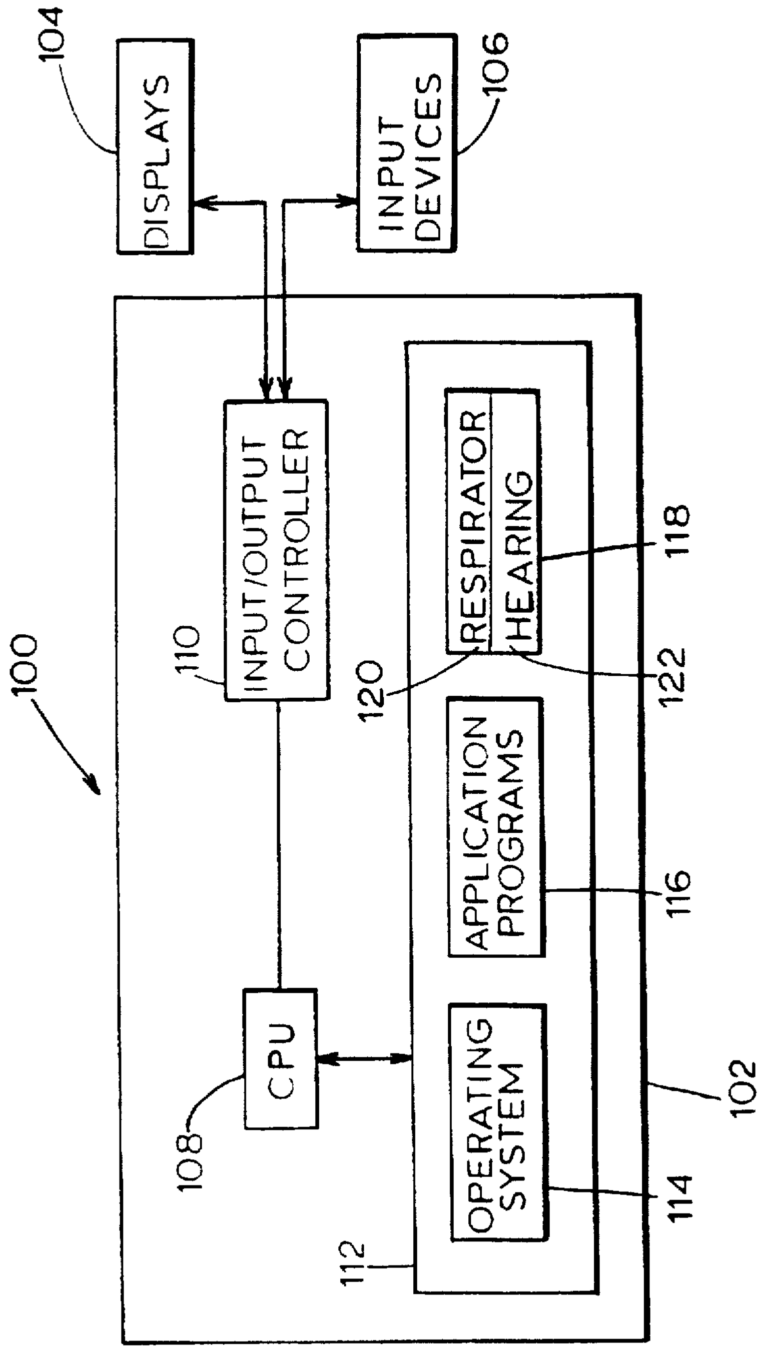
FIG. 1 is a block diagram of a data processing system which can be configured in accordance with the present invention.

One possible operating environment of the present invention is a data processing system, such as a data processing system 100 shown in FIG. 1. However, it should be noted that the present invention can be used in any other operating environment. The data processing system 100, for example, can be a personal computer, or a work station, and can include a processor 102, one or more display terminals 104, and one or more input devices 106. The display terminals 104 may include, for example, a monitor having a viewing screen, a printer, and/or the like. The input devices 106 may include, for example, a mouse, a keyboard, and/or similar devices.

The processor 102 may include a central processing unit (CPU) 108 which communicates with the display terminals 104 and with the input devices 106 through an input/output controller 110, and which processes program code stored in a memory 112. The program code stored in the memory 112 includes, for example, an operating system 114, various application programs 116, and a workplace protection program set 118 which may include multiple workplace protection programs such as, for example, a respirator program 120 and a hearing program 122. The application programs 116 may include word processing programs, spreadsheet programs, and the like. The workplace protection programs 120 and 122 are executed by the processor 102 in order to perform the functions of the present invention.

Figure 2:
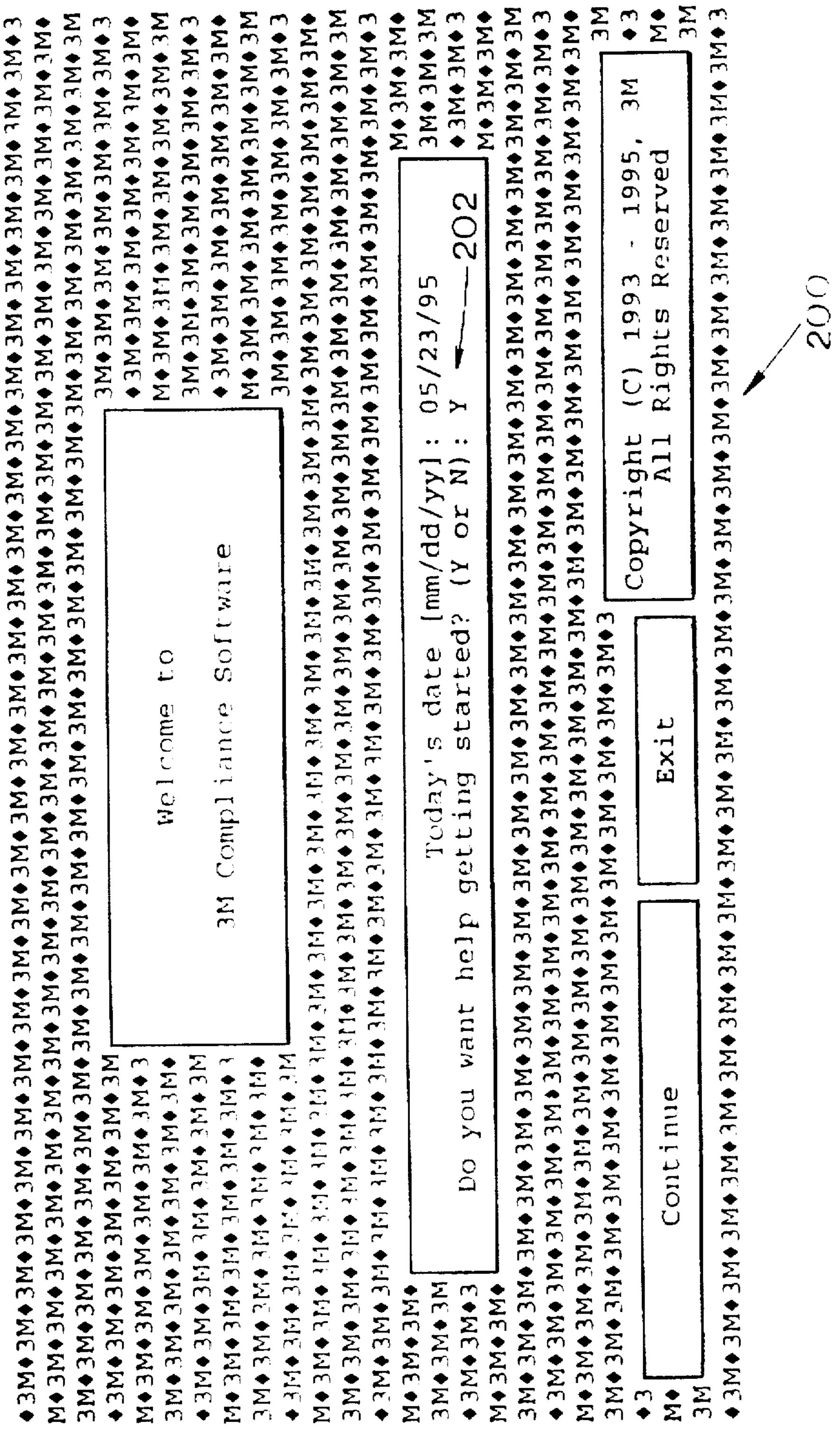
FIG. 2 is a representation of a welcome screen which is presented to a user of the present invention.

When the workplace protection programs 120 and 122 are first entered, a user is presented with a welcome screen display 200 such as that shown in FIG. 2. This screen display asks the user to confirm both the current date and whether the user wishes to have help in getting started with the development of a workplace protection program. Ordinarily, a user who wishes to begin the development of a workplace protection program will request help in getting started. The user indicates a desire for help in getting started with the development of a workplace protection program by entering a Y in a region 202 of the screen display 200.

Figure 3:
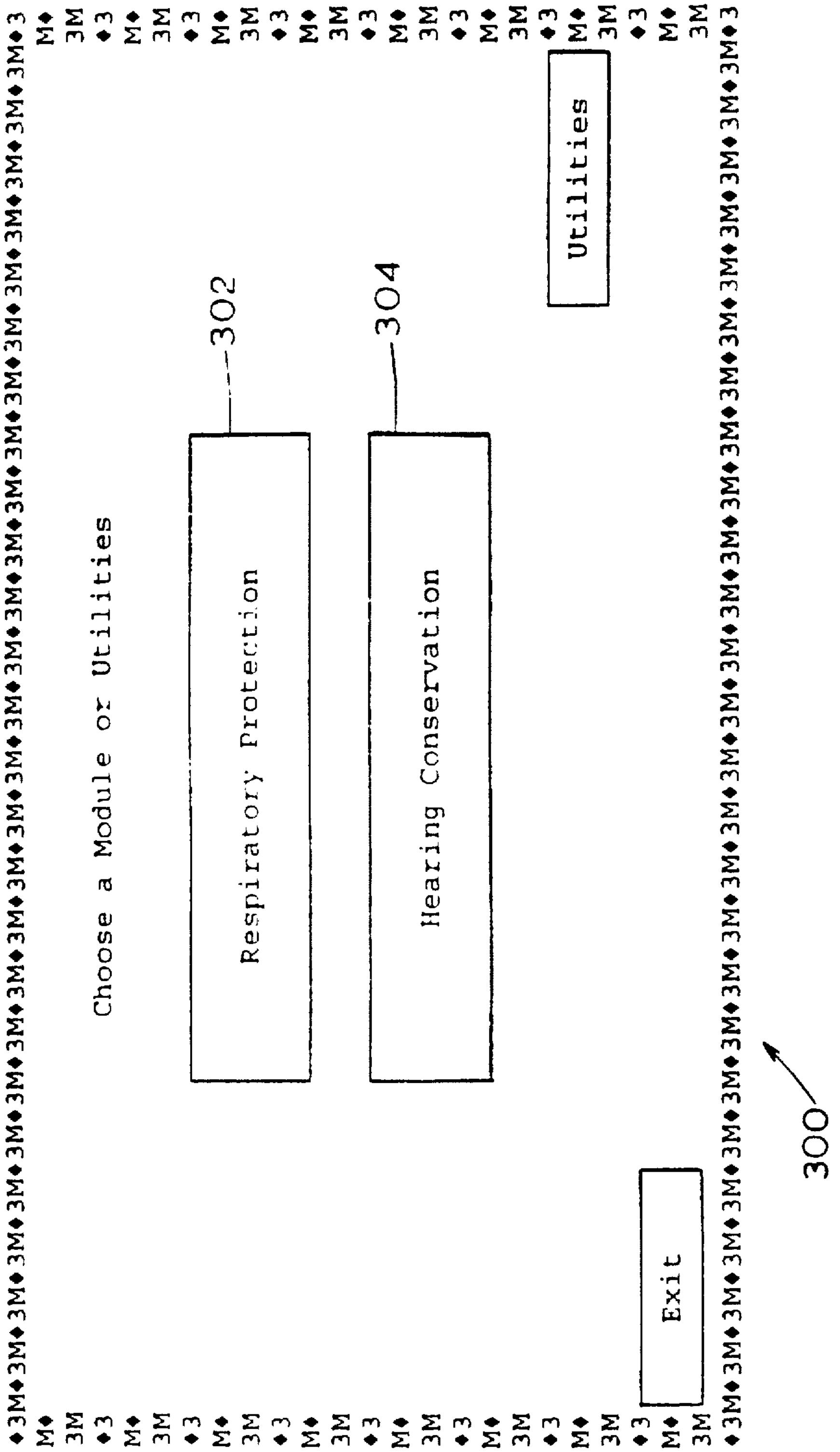
FIG. 3 is a representation of a screen display which is accessed from the welcome screen of FIG. 2.

As shown in FIG. 2, the user can either continue to execute the workplace protection programs 120 and 122, or the user can exit therefrom. If the user elects to continue execution of the workplace protection programs 120 and 122, the user is presented with a screen display 300 as shown in FIG. 3. The screen display 300, by way of a utilities button, allows the user to select certain options which may include, for example, printer set up, screen colors, importation of employee names, database maintenance, mouse sensitivity, program configuration, and/or the like. The screen display 300 also offers the user a choice between multiple workplace protection programs in the workplace protection program set 118. In the specific example shown in FIG. 3, the multiple workplace protection programs in the workplace protection program set 118 include a workplace respiratory protection program and a workplace hearing protection program. By selecting a button 302, the user may select the respirator program 120.

Figure 4:
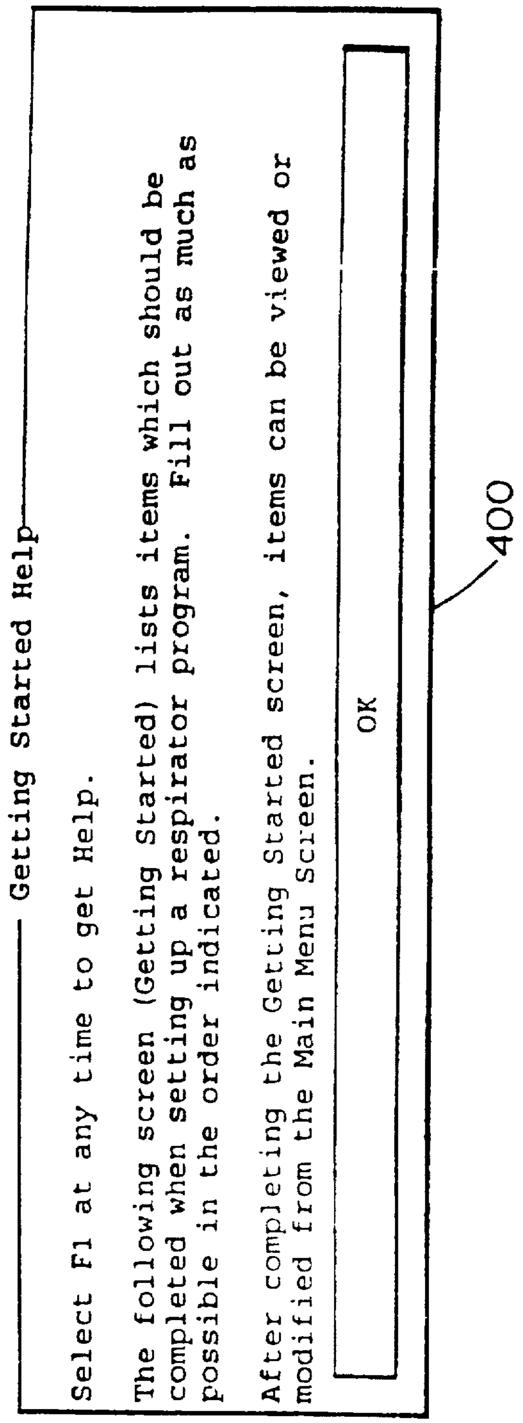
FIG. 4 is a representation of a screen display which is accessed from the screen display of FIG. 3 during development of a workplace respiratory protection program.

If the user selects the respirator program 120, a screen display 400 as shown in FIG. 4 is presented to the user. The screen display 400 presents introductory information about starting the development of a workplace respiratory protection program. As shown in FIG. 4, the screen display 400 may inform the user that, after completion of the items on a Getting Started screen display, any items contained in the workplace respiratory protection program may be viewed or modified from a Main Menu screen display of the respirator program 120. This Main Menu screen display will be described hereinafter.

Figure 5:
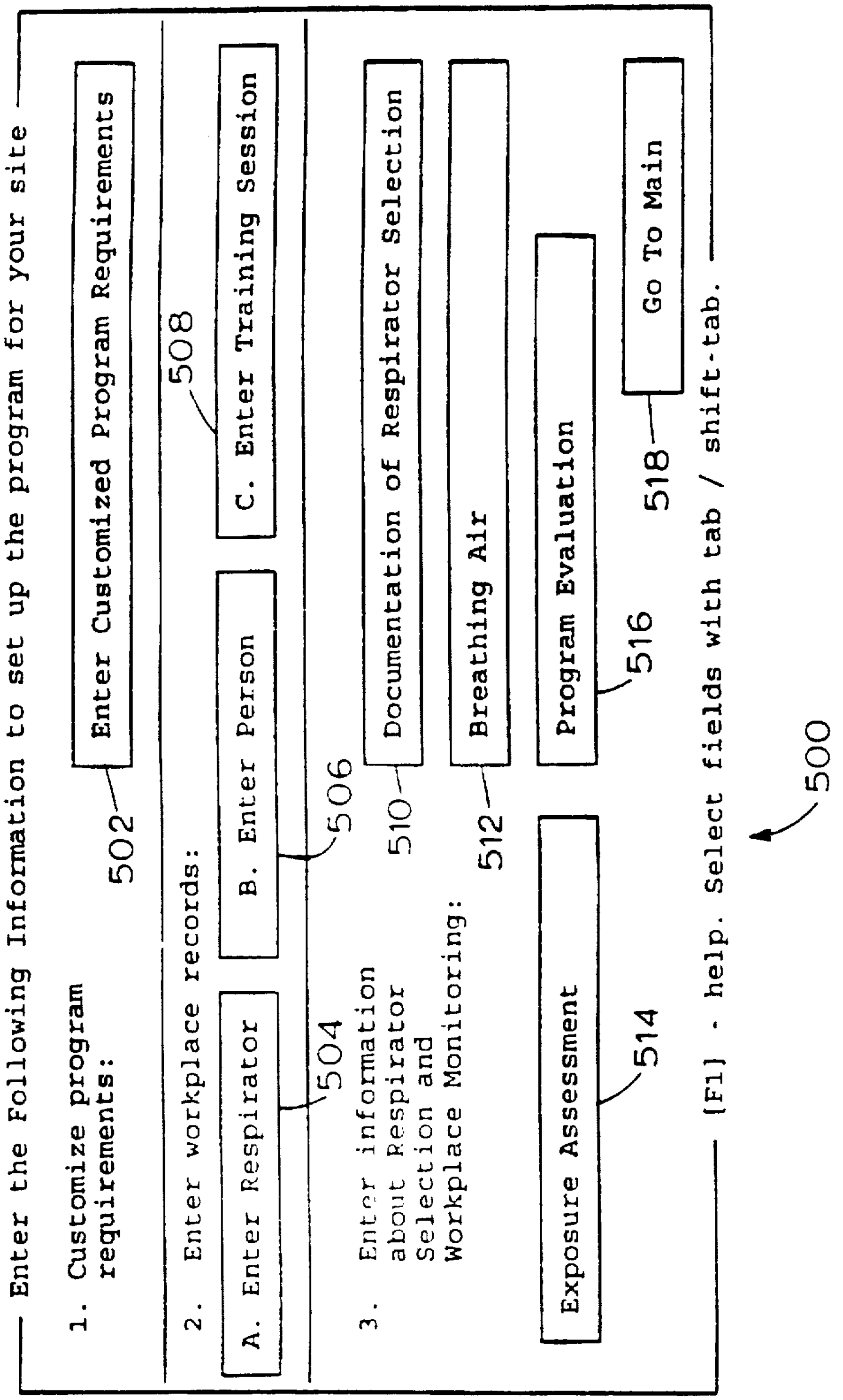
FIG. 5 is a representation of a screen display which is accessed from the screen display of FIG. 4.

When the user indicates on the screen display 400 that it is OK to proceed with the development of a workplace respiratory protection program, the respirator program 120 causes a screen display 500 as shown in FIG. 5 to be presented to the user. The screen display 500 includes a plurality of buttons 502–518 which are selectable by the user. Selection of the button 518 returns the user to the Main Menu of the respirator program 120. Buttons may be selected by using arrow keys, the tab key, and/or the like, in order to position a cursor over a button and by then pressing the enter key. Alternatively, a mouse may be clicked on a button. Other ways of selecting buttons are, of course, possible.

Selection of the button 502 allows the user to customize the program requirements of the workplace respiratory protection program to be developed. Selection of the buttons 504, 506, and 508 permit the user to create workplace records concerning the workplace respiratory protection program. Specifically, selection of the button 504 permits the user to enter into these records information concerning the respirators which might be used in the workplace respiratory protection program, selection of the button 506 allows the user to enter into these records information concerning employees, and selection of the button 508 permits the user to enter into these records information concerning employee training sessions.

Selection of the buttons 510, 512, 514, and 516 permit the user to enter information about the selection of respirators, about contaminant exposure in the workplace, about the monitoring of the workplace environment, and about evaluation of the workplace respiratory protection program. Specifically, selection of the button 510 permits the user to enter information concerning the selection of respirators. For example, such information may be entered by the job and/or location in which a respirator is to be used. Selection of the button 512 permits the user to enter information concerning the contaminants which may affect the breathability of the air in the workplace. Selection of the button 514 allows the user to enter information concerning the user's assessment of the exposure of employees to the contaminants which may be found at locations or during jobs within the workplace. Selection of the button 516 permits the user to enter information concerning the evaluation of the workplace respiratory protection program.

Figure 6:
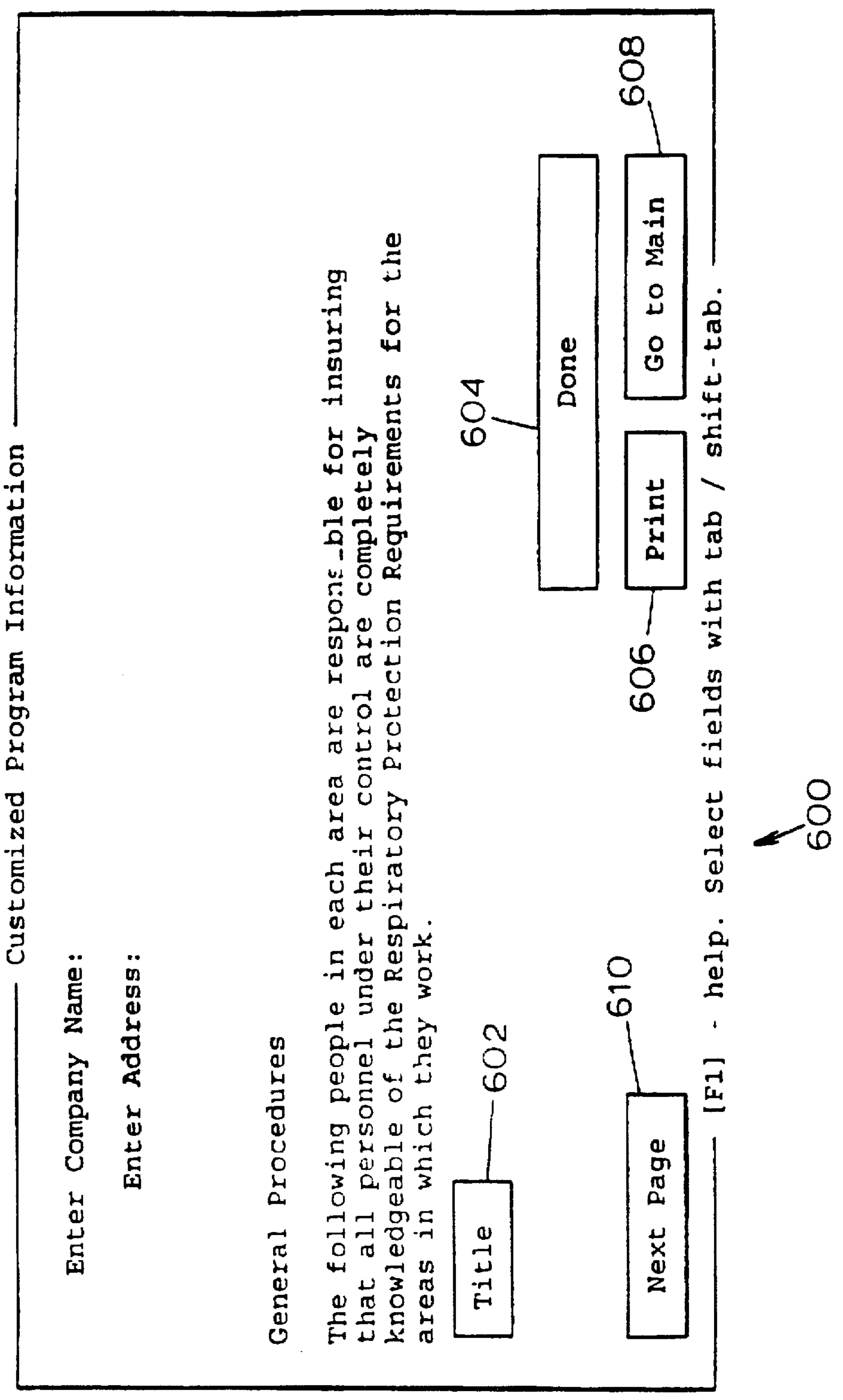
FIG. 6 is a representation of a screen display which is accessed from the screen display of FIG. 5.

Selection of the button 502 permits the user to customize the requirements of the workplace respiratory protection program. When the button 502 is selected by the user, the user is presented with a screen display 600 as shown in FIG. 6 to begin the process of customization. Within this screen display 600, the user may enter the name and address of the company (i.e., employer) for which the workplace respiratory protection program is being developed. The user may enter, in the region next to a button 602, the title of the people in each area who are responsible for ensuring that all personnel under their control are completely knowledgeable with the workplace respiratory protection program requirements for the areas in which they work. Selection of the button 602 presents the user with a list of possible titles. The user may select a title from this list or may insert any other title.

Selection of a button 604 in the screen display 600 permits the user to indicate that customization of the workplace respiratory protection program has been completed. If the button 604 is selected, the respirator program 120 returns the user to the screen display 500. Selection of a button 606 allows the user to print the current screen display 600, to print a group of screen displays, or to print all of the customization screen displays involved in the customization of the workplace respiratory protection program. A button 608 allows the user to return to the Main Menu of the respirator program 120. A button 610 allows the user to proceed to the next page for the customization of further program requirements of the workplace respiratory protection program.

Figure 7:
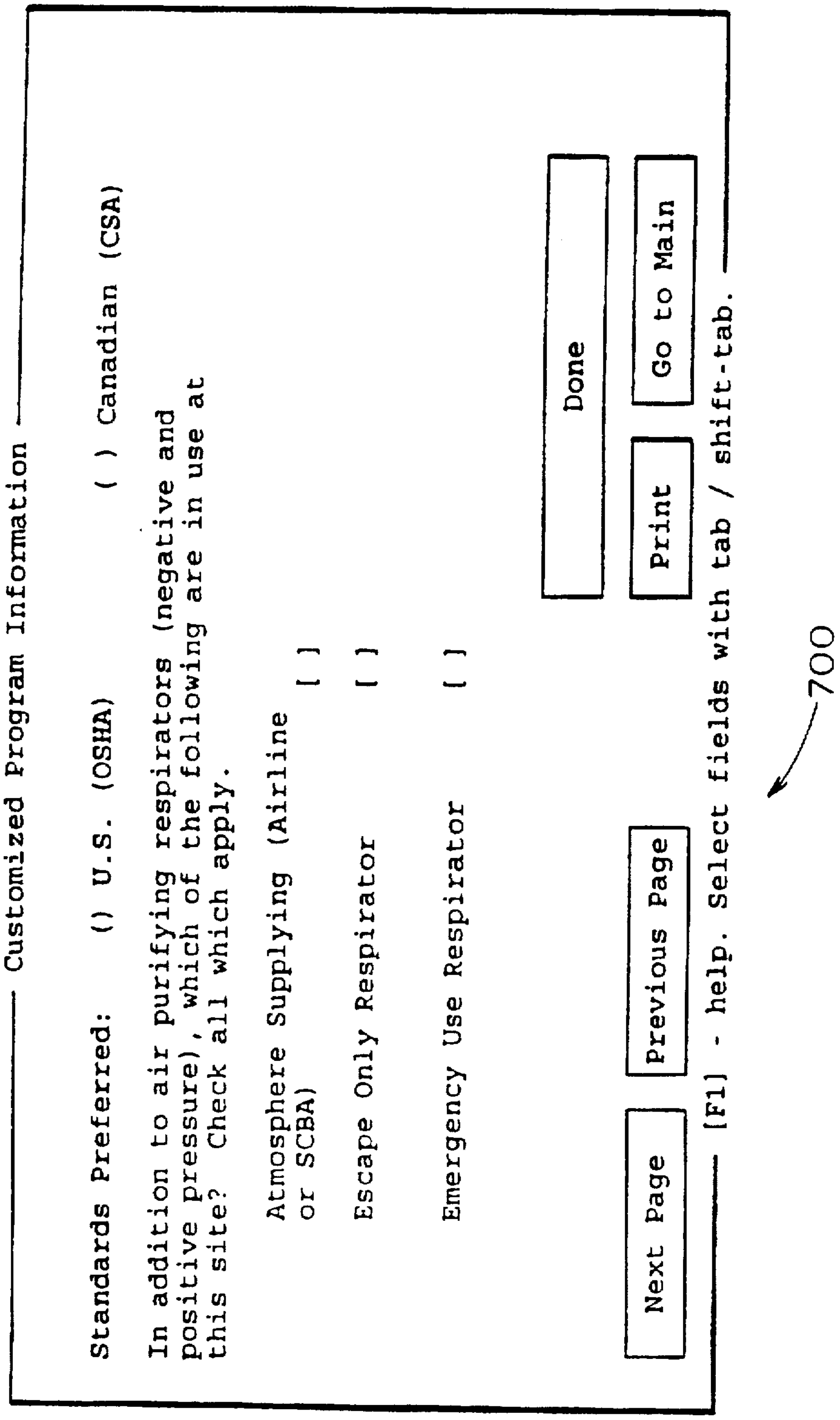
FIG. 7 is a representation of a screen display which is accessed from the screen display of FIG. 6.

After the appropriate information is entered into the screen display 600 by the user, customization may be continued by the user by selection of the button 610 which causes a screen display 700 as shown in FIG. 7 to be displayed. This screen display 700 allows the user to select the country for which the workplace respiratory protection program is being developed. Thus, as indicated by the screen display 700, the respirator program 120 contains the necessary knowledge to help a user in the development of workplace respiratory protection programs which will satisfy the governmental regulations and standards of more than one country. In the specific example shown by the screen display 700 of FIG. 7, the respirator program 120 is configured to permit the development of workplace respiratory protection programs to satisfy the governmental regulations and standards of the United States of America and of Canada. Thus, if the U.S. is selected, the respirator program 120 displays knowledge to the user tailored to U.S. requirements; and, if Canada is selected, the respirator program 120 displays knowledge to the user tailored to Canadian standards.

Also, as shown by the screen display 700, the user may indicate the types of respirators which are used in the employer's workplace, may print those items which may be printed by selection of the print button 606 of the screen display 600, may terminate customization (by selecting the Done button), may return to the Main Menu of the respirator program 120, may return to the previous page, and may proceed to the next page.

Although the next pages which may be accessed through execution of the respirator program 120 are not specifically shown herein, these next pages may include any of the following: (i) a page permitting the user to provide the names, titles, and departments of a person having overall responsibility for the administration of the workplace respiratory protection program and of a person having responsibility for identifying and measuring contaminants in the workplace; (ii) a page permitting the user to provide the names, titles, and departments of a person having responsibility for evaluating the health of employees and of a person having responsibility for directing and coordinating engineering projects related to the workplace respiratory protection program; (iii) a page permitting the user to provide the name, title, and department of a person having responsibility for the selection, issuance, training, and/or fit testing of all respirators which may be used in the workplace respiratory protection program and to designate the effective date of the workplace respiratory protection program; (iv) a page permitting the user to select the periodicity within which employees must be medically evaluated and to include exceptions within a scrollable window; (v) a page permitting the user to designate where copies of medical clearance request records are maintained; (vi) a page permitting the user to designate the periodicity for making exposure assessments and to indicate where records of such exposure assessments are maintained; (vii) a page permitting the user to designate the criteria being employed to govern the selection of respirator types; (viii) a page permitting the user to designate in a scrollable window those from whom respirators may be purchased and to list in a scrollable window the approved respirators which may be used in the workplace respiratory protection program; (ix) a page permitting the user to designate a respirator instructor and to indicate where records concerning the training of employees are maintained; (x) a page permitting the user to designate where fit testing records are maintained; (xi) a page permitting the user to designate those employees who are responsible for spot checking respirators for fit, usage, and condition and to designate a person to whom defective respirators are to be returned; and, (xii) a page designating the periodicity for evaluating the workplace respiratory protection program and where copies of program summary reports may be found.

As in the case of the screen displays 600 and 700, the screen displays containing these pages may have buttons allowing the user to print those items which may be printed by selection of the print button 606 of the screen display 600, to terminate customization (indicating that customization is done), to return to the Main Menu of the respirator program 120, to return to the previous page, and to proceed to the next page. It should be apparent that more or fewer pages may be provided than those described above. Selection of the Done button on any of these screen displays to indicate that the customization process is completed returns the user to the screen display 500.

After these requirements of the workplace respiratory protection program have been customized, the user may continue the development of the workplace respiratory protection program by selecting the button 504 from the screen display 500. Where the performance of jobs by employees in locations of a workplace expose the employees to hazardous airborne contaminants, the employees are required to use respirators. Selection of the button 504 permits the user to designate respirators by location, and by job within the workplace.

Figure 8:
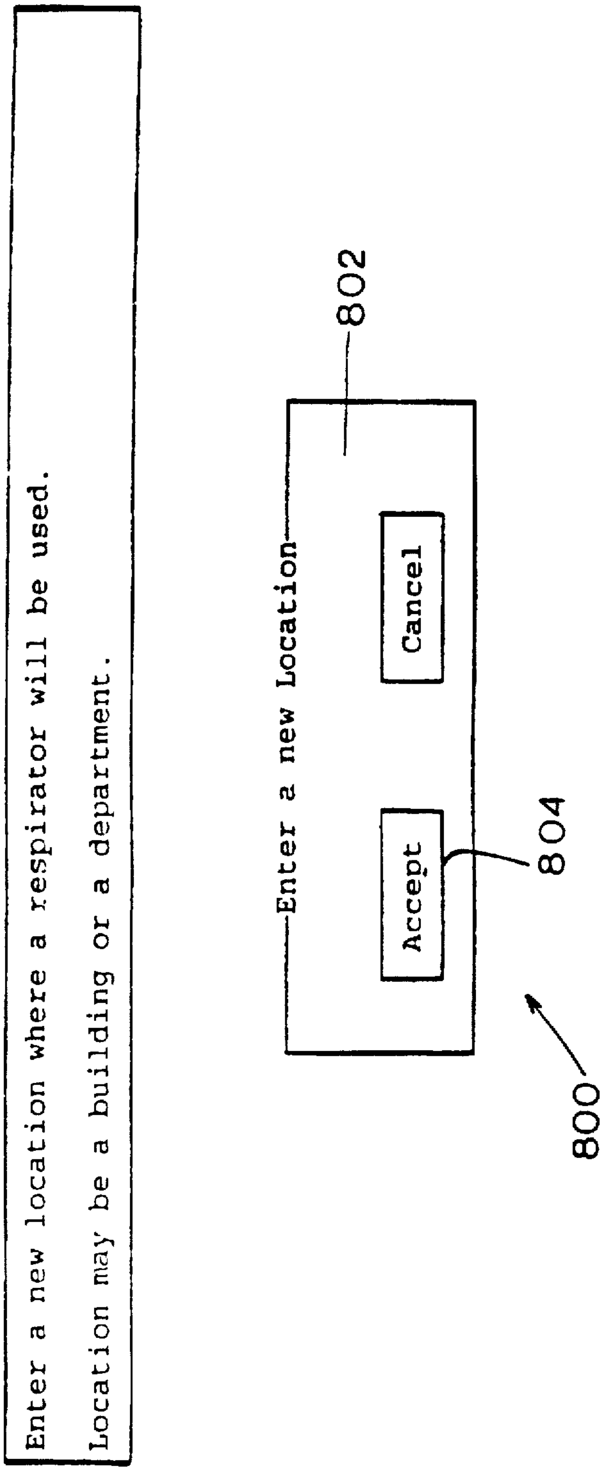
FIG. 8 is a screen display which is accessed from the screen display of FIG. 5.
Figure 9:
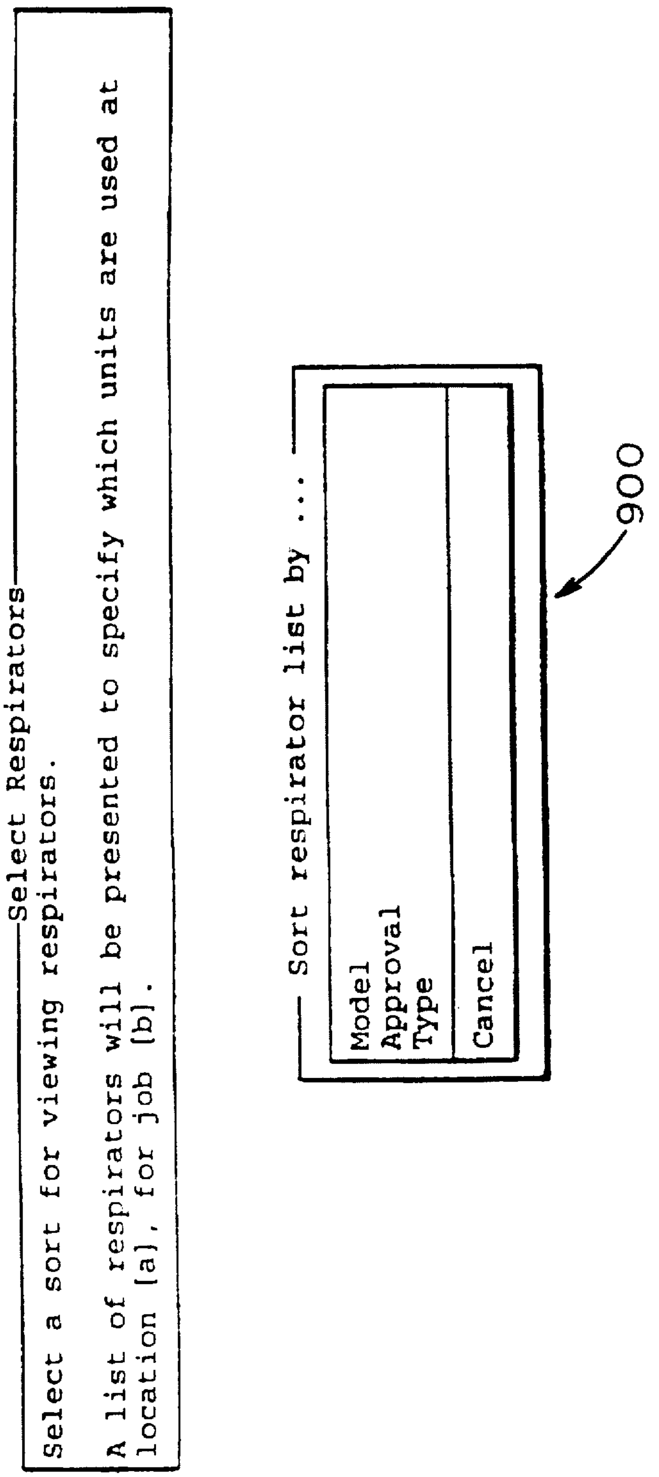
FIG. 9 is a representation of a screen display which is accessed from the screen display of FIG. 8.

Accordingly, the first time that a user selects the button 504, a screen display 800 as shown in FIG. 8 is presented to the user. The screen display 800 allows the user to enter a location of the workplace where the use of a respirator is required. Assuming that the user enters a location for a respirator in a region 802 of the screen display 800 and indicates correct entry by selecting a button 804, the user is then presented with a screen display similar to the screen display 800 but in which the user is requested to enter the title of the job for which the respirator is to be used. The user is then presented with a screen display 900 as shown in FIG. 9 which allows the user to view respirators as sorted by respirator model, by respirator approval, or by respirator type.

Figure 10:
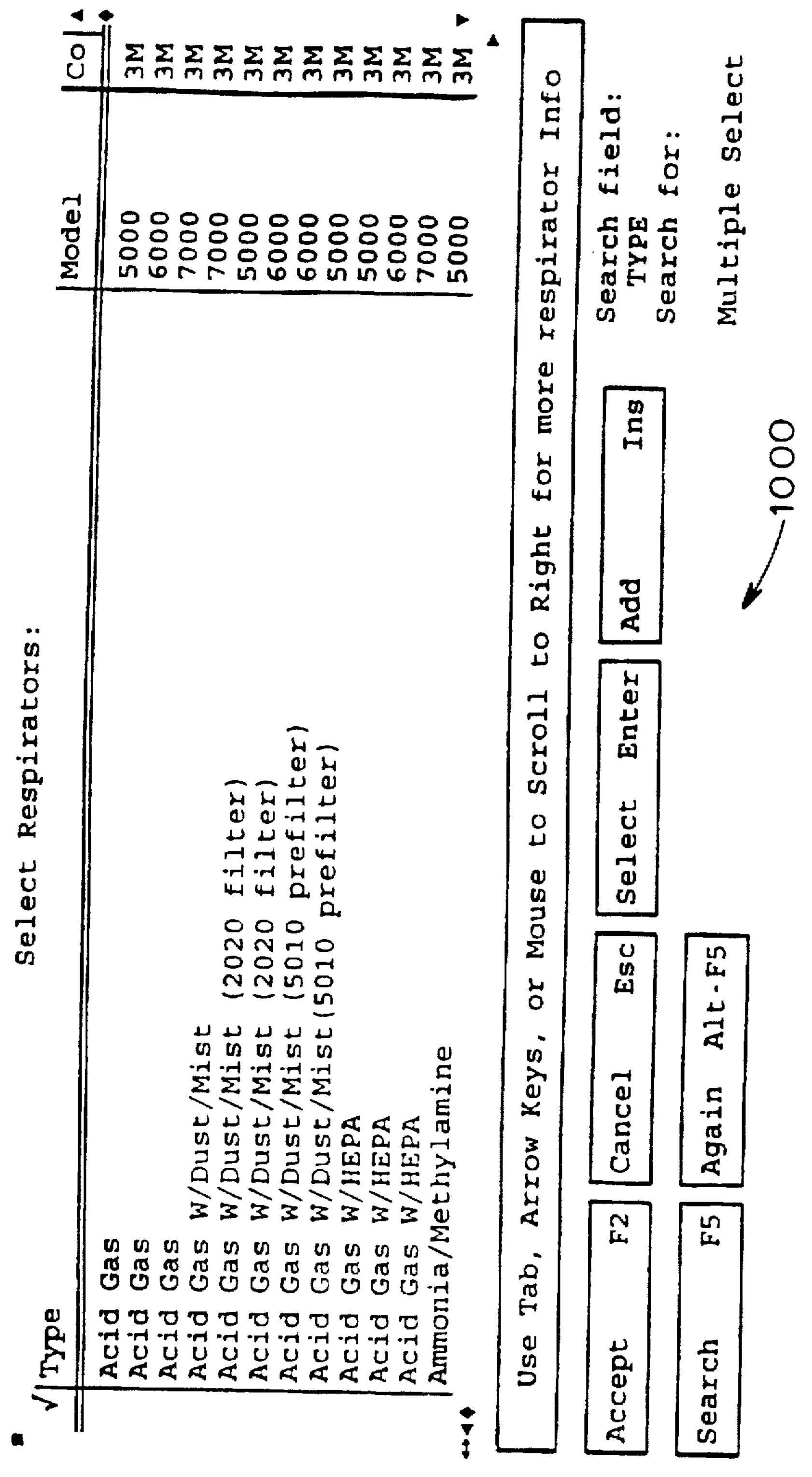
FIG. 10 is a representation of a screen display which is accessed from the screen display of FIG. 9.

For example, if the user requests that the respirators be sorted by type, the user is presented with a screen display 1000 as shown in FIG. 10. The user may select a respirator from the list of respirators presented in the screen display 1000 by highlighting the desired respirator, by pressing the enter key to select the highlighted respirator (which places a check mark in the check column), and by pressing the F2 function key. The respirator program 120 may be provided with a list of pre-approved respirators. Respirators may be added to this list by pressing the insert key. Selecting a respirator returns the user to the screen display 500. This process of specifying a location, a job, and a respirator thereby associates the specified location and the specified job with the specified respirator. Thus, a respirator may be selected for an employee according to the job to be performed by the employee and to the location at which the job is to be performed by the employee.

Figure 11:
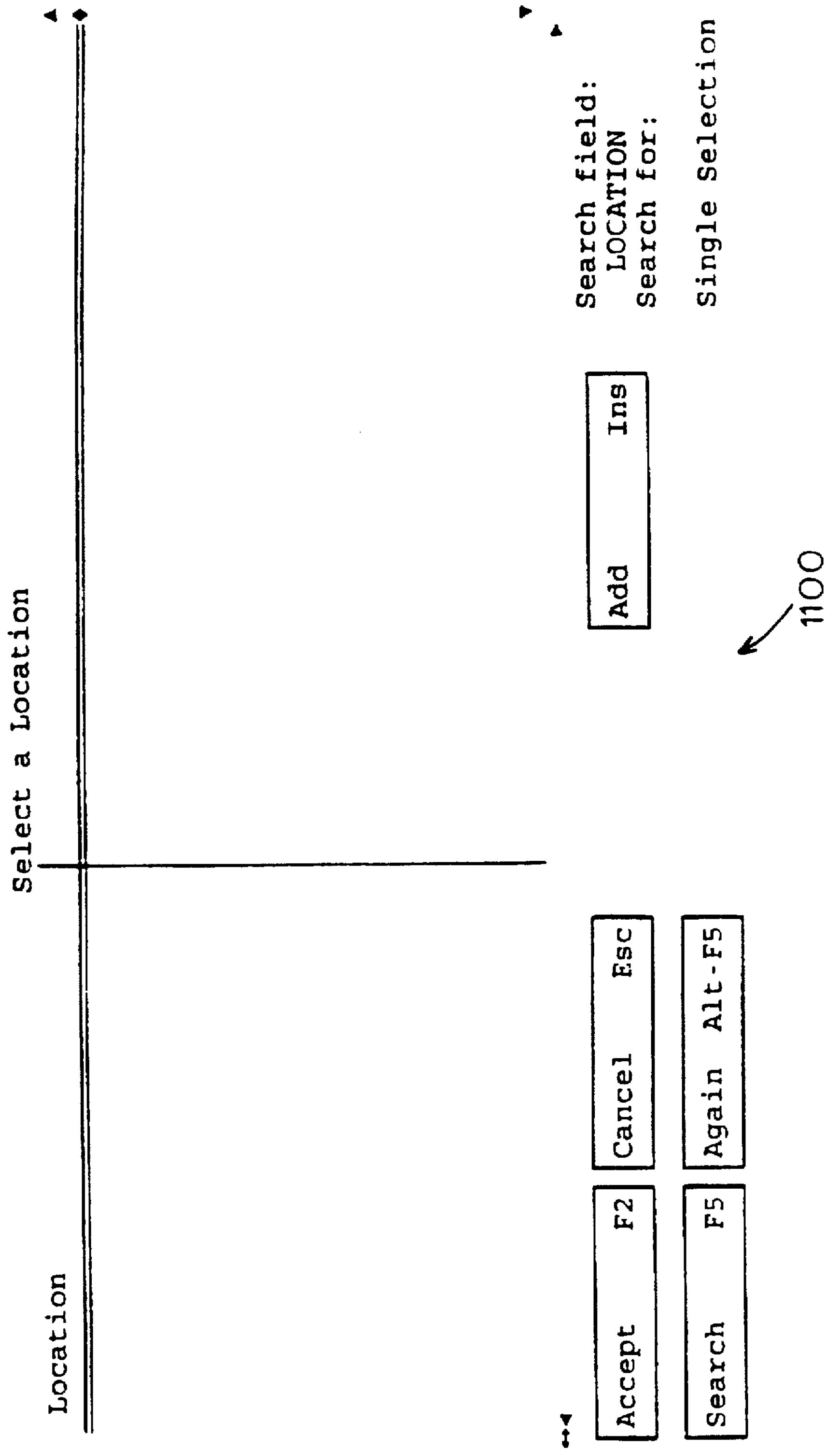
FIG. 11 is a representation of a screen display which is accessed from the screen display of FIG. 5.

Upon return to the display 500, selection of the button 504 presents the user with a screen display 1100 shown in FIG. 11. The screen display 1100 lists the locations previously designated. A second location can be added by pressing the insert key which presents the screen display 800 to the user. A second location can then be specified in the region 802. If this second location is accepted, the user is presented with a screen display 1200 shown in FIG. 12. The screen display 1200 lists the jobs previously designated. A second job can be added by pressing the insert key which presents a screen display similar to the screen display 800 to the user but in which the user may enter a job in a region similar to the region 802. A second job can then be specified. If this second job is accepted, the user is presented with the screen display 900 shown in FIG. 9 from which the user can specify a respirator, as before. The user is then returned to the screen display 500 from which additional locations, jobs, and respirators can be specified.

Figure 13:
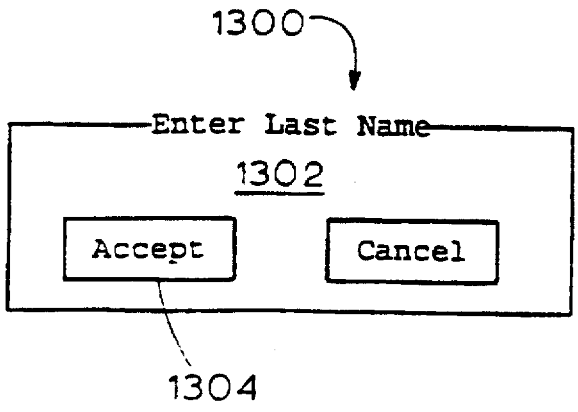
FIG. 13 is a representation of a screen display which is accessed from the screen display of FIG. 5.
Figure 14:
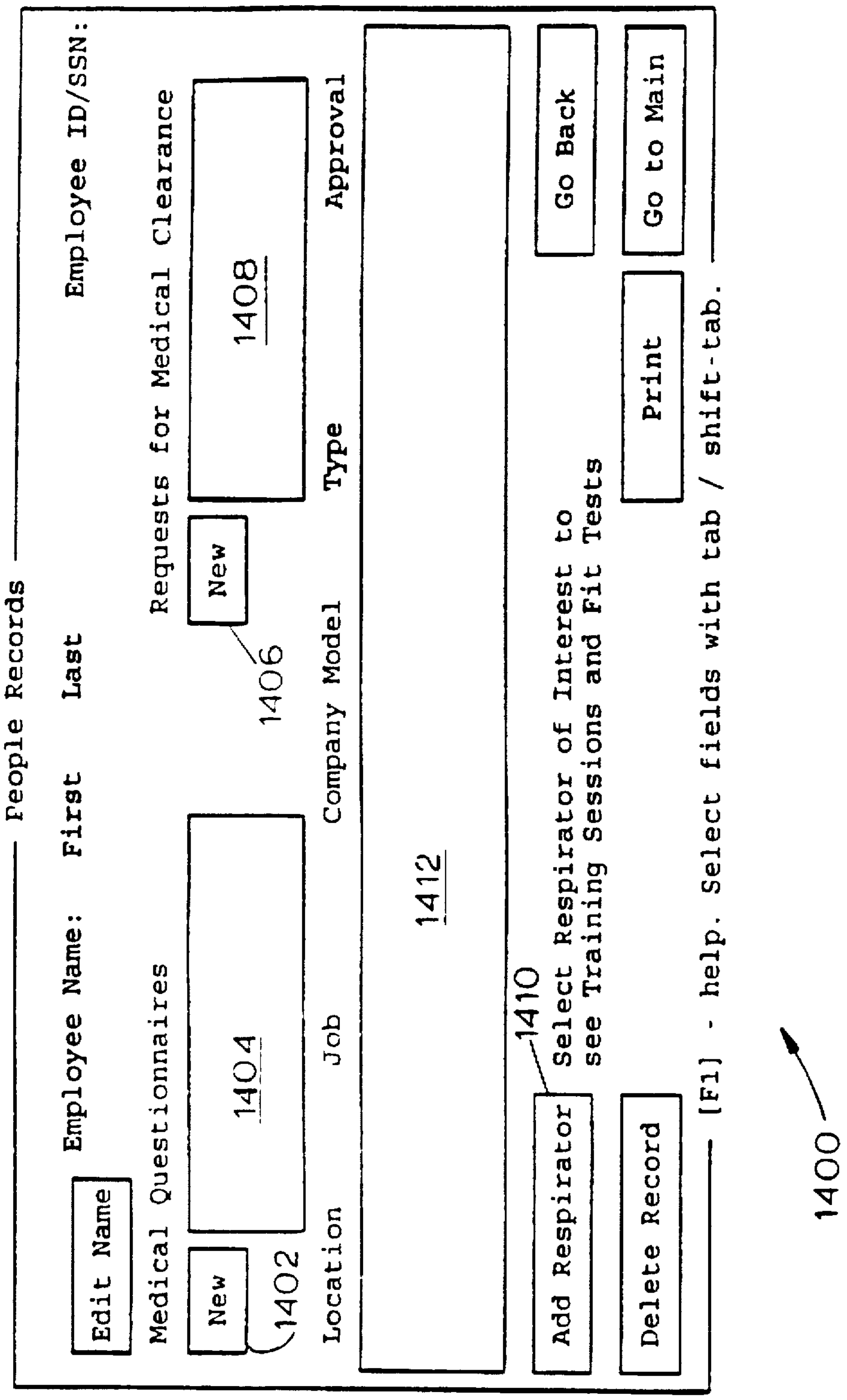
FIG. 14 is a representation of a screen display which is accessed from the screen display of FIG. 13.

Selection of the button 506 of the screen display 500 presents the user with a screen display 1300 as shown in FIG. 13. In the screen display 1300, the user may designate, in a region 1302, the last name of an employee who is to use a respirator, and may indicate acceptance of the employee designation by selection of an Accept button 1304. This screen display may, if desired, be followed by similar screen displays in which the first name and an employee I.D. number are designated for the employee. When this information has been entered, and accepted, a screen display 1400, as shown in FIG. 14, is presented to the user to permit the user to create a record concerning the designated employee. As shown, the screen display 1400 includes the name and employee identification for the designated employee, and allows the name of the employee to be edited.

This record provides a link between each employee and various records concerning that employee. Accordingly, this record permits access to other employee records in a hypertext function. For example, through the screen display 1400, medical questionnaires and requests for medical clearance concerning an employee may be linked to an individual employee. Also, specific respirators, their locations, and the jobs for which they are to be used, may also be linked to an employee. Furthermore, training sessions and fit tests with respect to designated respirators may be linked to an employee. Thus, these different portions of the respirator program 120 are linked by a hypertext function. As discussed elsewhere herein, other portions of the respirator program 120 may be linked as well.

During the development of the workplace respiratory protection program, medical questionnaires and requests for medical clearance may be filled out for each employee. Accordingly, by selecting a button 1402 of the screen display 1400, the user is asked to enter the date for a medical questionnaire and then a medical questionnaire form is presented to the user which can be completed by the user concerning the employee indicated by the screen display 1400. After completing the medical questionnaire, the date of the questionnaire is presented to the user in a region 1404 of the screen display 1400. However, medical questionnaires themselves are not stored in the data processing system 100 by the respirator program 120, and may not be accessed by use of the respirator program 120 for privacy reasons.

By selecting a button 1406 of the screen display 1400, the user is asked to enter the date for a request for medical clearance, and then a request for medical clearance form is presented to the user which can be completed by the user concerning the employee indicated by the screen display 1400. This form asks the user to indicate the type of respirator which the employee should use, the level of work which the employee is permitted, how often an employee may engage in a particular activity, and the like. After completing the request for medical clearance form, the date of this request is presented to the user in a region 1408 of the screen display 1400. The medical questionnaire and request for medical clearance forms will be discussed in additional detail hereinbelow.

Figure 15:
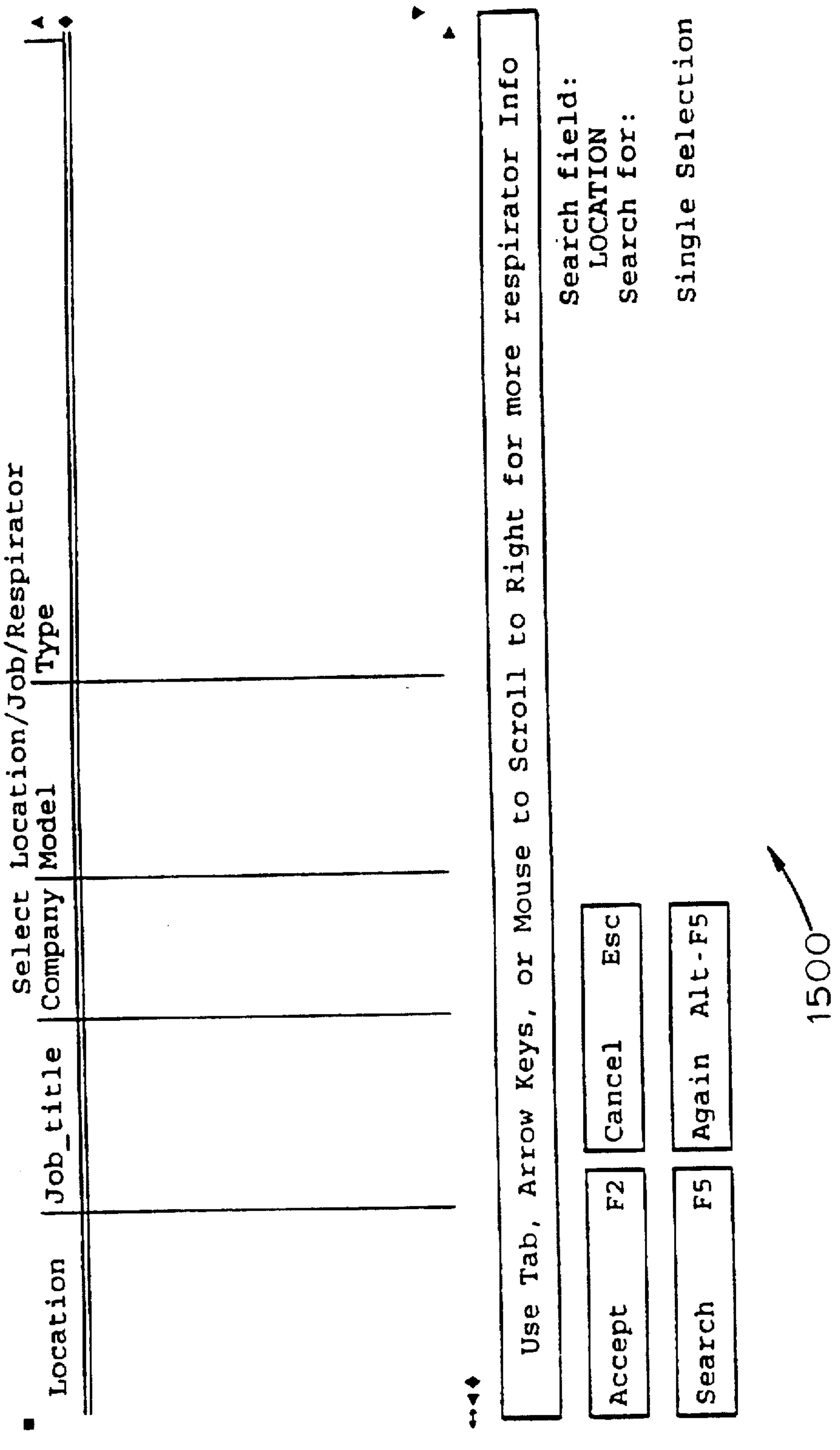
FIG. 15 is a representation of a screen display which is accessed from the screen display of FIG. 14.

During the development of the workplace respiratory protection program, respirators may be added for the employee indicated by the screen display 1400. Accordingly, by selecting a button 1410, a screen display 1500 as shown in FIG. 15 is presented to the user. The screen display 1500 contains the information created by use of the button 504 from the screen display 500. That is, the screen display 1500 contains a list of respirators specified by location and by job. The user may select a respirator from this list by highlighting the appropriate respirator at the appropriate location and for the appropriate job and by pressing the F2 function key. If so, the chosen respirator is inserted into a region 1412 of the screen display 1400. The information presented in the region 1412 includes the location where the respirator is to be used, the job for which the respirator is to be used, the model designation for the respirator, the type of respirator, and the approval designation for the respirator. Each respirator has a location and a job attached to it. The user selects a unique location-job-respirator combination which then associates a particular respirator for a particular job and location with the identified employee. Multiple respirators may be assigned to a person and presented in the region 1412. A personnel record of an employee may be removed by selecting a delete button.

In this fashion, an employee may be linked to his medical questionnaires, requests for medical clearance, respirators, and the like. As will be discussed in more detail below, the user may also access training sessions and fit tests for the employee by highlighting a respirator in the region 1412 and by pressing the enter key.

Figure 16:
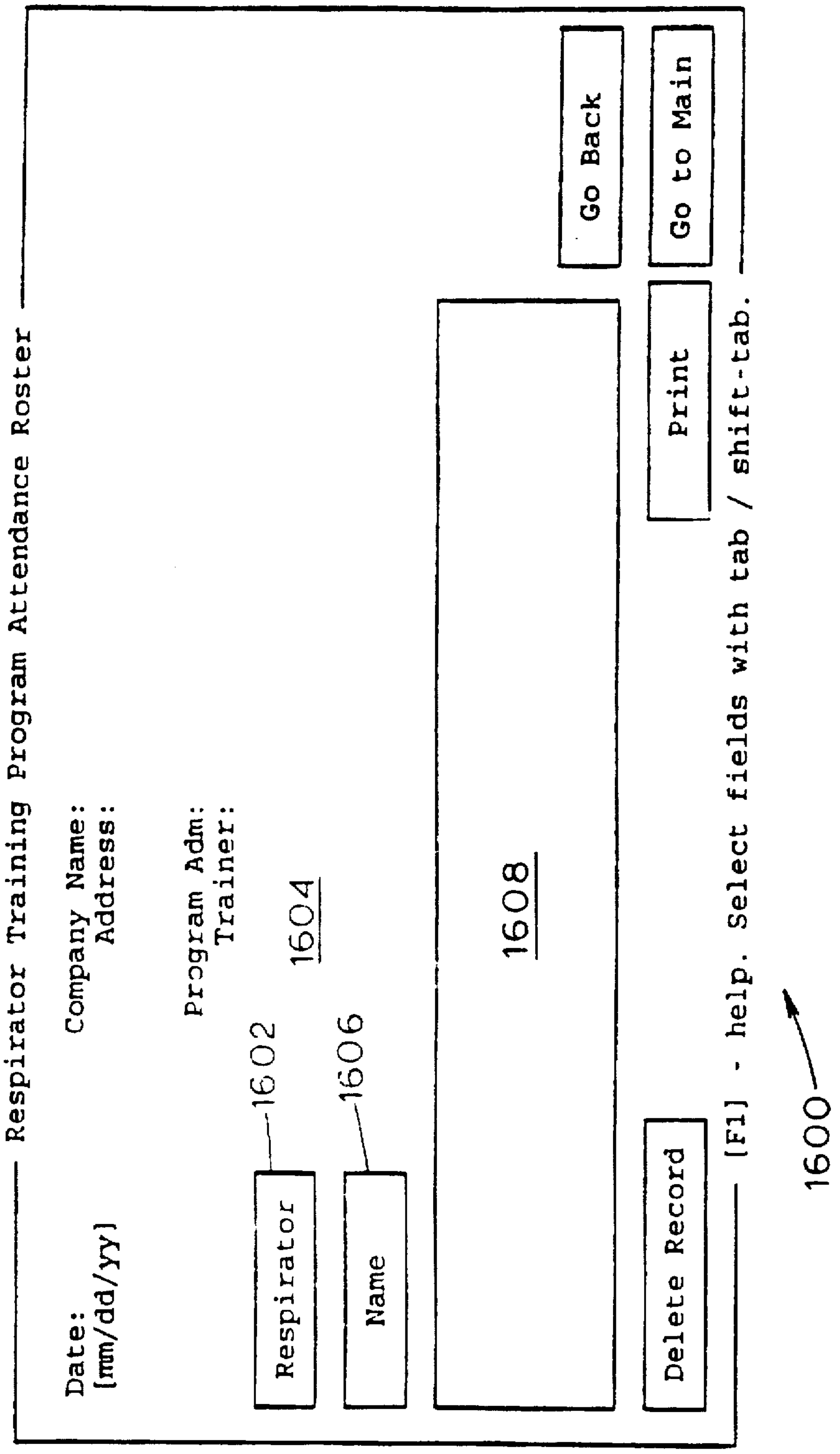
FIG. 16 is a representation of a screen display which is accessed from the screen display of FIG. 5.

If the user selects the button 508 shown in FIG. 5, the user is first asked to insert a date on which a respirator training program is to be conducted. Then, the user is presented with a screen display 1600 as shown in FIG. 16. The screen display 1600 permits the user to enter a roster of those employees who are to attend the training session. The screen display 1600 includes the name and address of the company and the name of the program administrator, which are inserted automatically from the customized requirements. The user must insert the name of the trainer. Selection of a button 1602 presents the user with a list of respirators. If the user selects a respirator from this list, the selected respirator is inserted into a region 1604 of the screen display 1600.

Selection of a button 1606 presents the user with a list of employees. The user may select the employees who are to attend the training session from this list, and the selected employees are inserted into a scrollable region 1608 of the screen display 1600.

Selection of the button 510 of the screen display 500 shown in FIG. 5 presents the user with a screen display, similar to the screen display 1500, from which documentation about respirators may be created by location and/or by job. For example, the information which may be inserted into this documentation by the user may include the following; for each location/job within the workplace, the contaminant against which the respirator is to offer protection; an estimate of the particulate size of the contaminant; information on the contaminant, such as its concentration, hazard ratio, and warning properties; the type of respirator selected for the employee by job and location; the manufacturer of the respirator; and/or the like.

Selection of the button 512 presents the user with a record which the user may fill in concerning any tests of the breathing air quality at a particular location of the workplace.

Selection of the button 514 of the screen display 500 provides a way for the user to create a record concerning the assessment of the exposure of employees. This record may contain, for example, a description of the job category for which a respirator is to be used, the types of contaminants to be guarded against, references to any reports concerning surveys or samples of the contaminants, the concentration of the contaminants, the hazard ratio, and/or the like. This record, therefore, lists the contaminants, and properties of those contaminants, to which an employee may be exposed during performance of a particular job and at a particular location within the workplace.

Selection of the button 516 of the screen display 500 presents the user with a form which may be filled out by the user to create a record of an evaluation of the workplace respiratory protection program. This form may include, for example, a questionnaire to be completed by the user in evaluating the requirements, procedures, controls, training sessions, fit tests, and/or the like of the workplace respiratory protection program. In addition, this form may create a summary of the evaluation.

Figure 17:
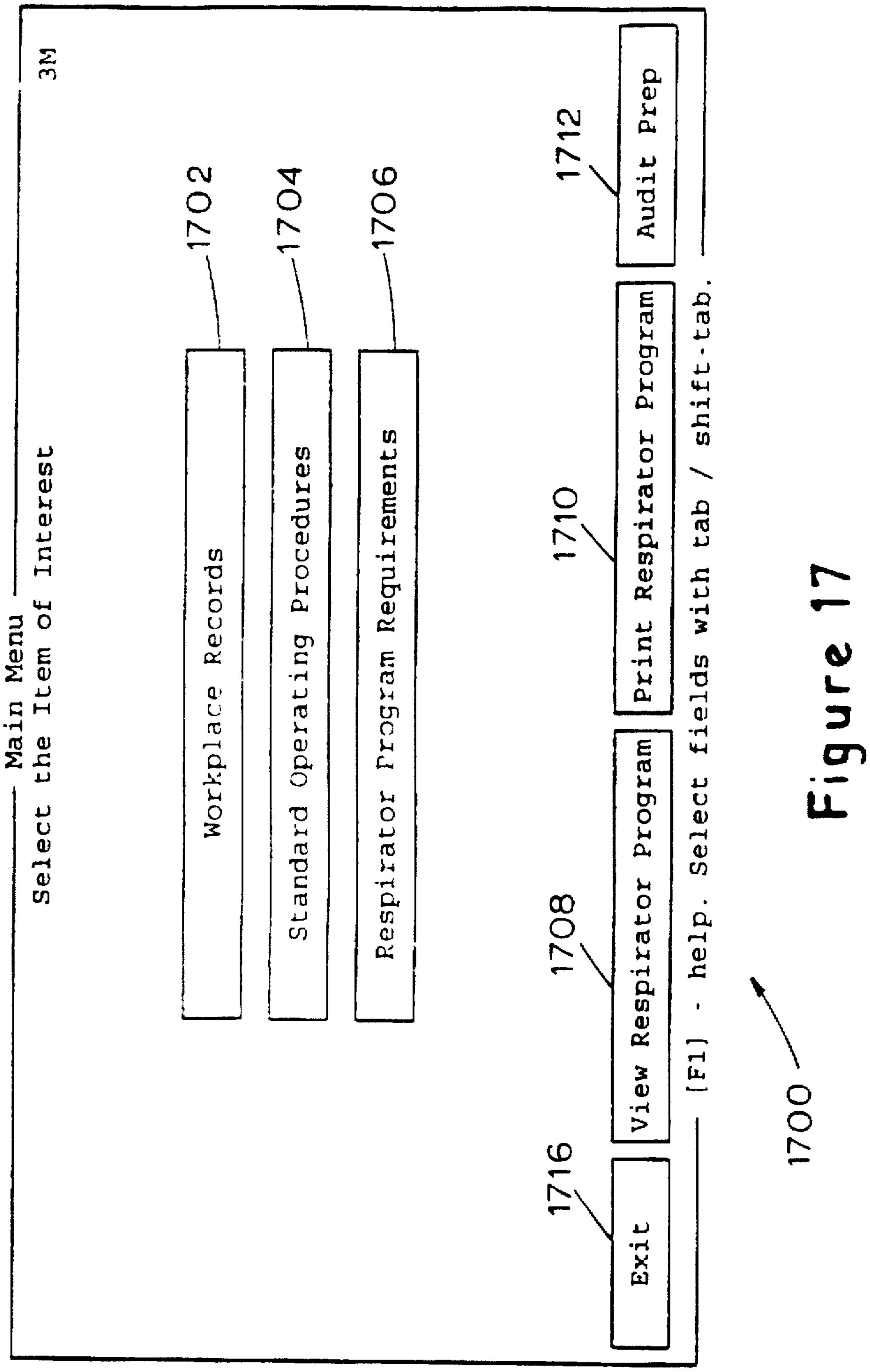
FIG. 17 is a representation of a screen display of a Main Menu which is accessed from the screen displays of either FIG. 3 or FIG. 5.

After development of the workplace respiratory protection program is done, a screen display 1700 shown in FIG. 17 presents the Main Menu of the respirator program 120 to the user. As indicated above, this Main Menu is also presented to the user from the screen display 300 shown in FIG. 3 if the user indicates that the user does not wish help in getting started, i.e. the user has already developed the workplace respiratory protection program. A user may also maintain the workplace respiratory protection program through the Main Menu of the respirator program 120.

Figure 18:
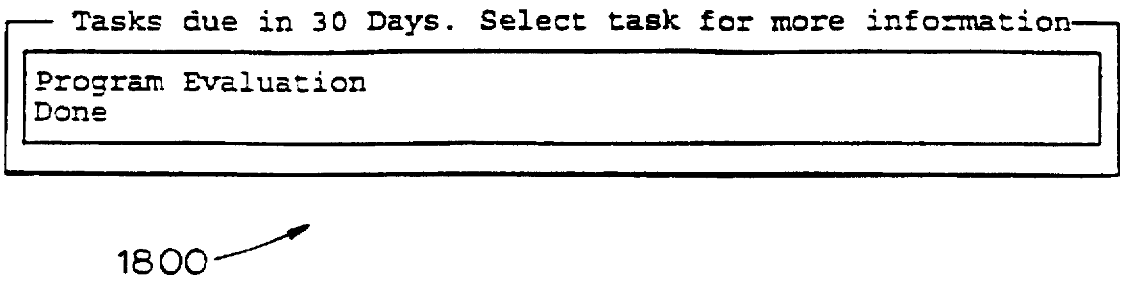
FIG. 18 is a representation of a screen display which is accessed from the screen display of FIG. 3 and which reminds the user of any tasks which are due within a predetermined period of time.

However, before the user is presented with the screen display 1700 from the screen display 300, the user is first presented with an alert screen display in order to alert the user to any tasks which must be completed within a specified period of time, for example, within 30 days of the current date. An example of an alert screen display is the screen display 1800 of FIG. 18 which indicates that the workplace respiratory protection program must be evaluated soon. Accordingly, the respirator program 120 searches its database for any tasks which must be completed within the period of time specified by the alert screen display. If there are tasks to be completed, the user may access more information about each task directly from the alert screen display or select Done to move to the Main Menu 1700. If there are no tasks which are required within the next predetermined period of time, the alert screen display does not appear.

The screen display 1700 includes a button 1702 which, when selected, presents the user with a screen so that the user may find and/or add workplace records. This screen will be discussed below. The screen display 1700 also includes a button 1704 which allows a user to read/print the standard operating procedures involved in the workplace respiratory protection program, a button 1706 which allows the user to read/customize/print the program requirements of the workplace respiratory protection program, a button 1708 which allows the user to view knowledge related to the workplace respiratory protection program in a manual format, a button 1710 which allows the user to print the workplace respiratory protection program, and a button 1712 which provides assistance to a user in preparing for an audit such as may be conducted by a government auditor.

Figure 19:
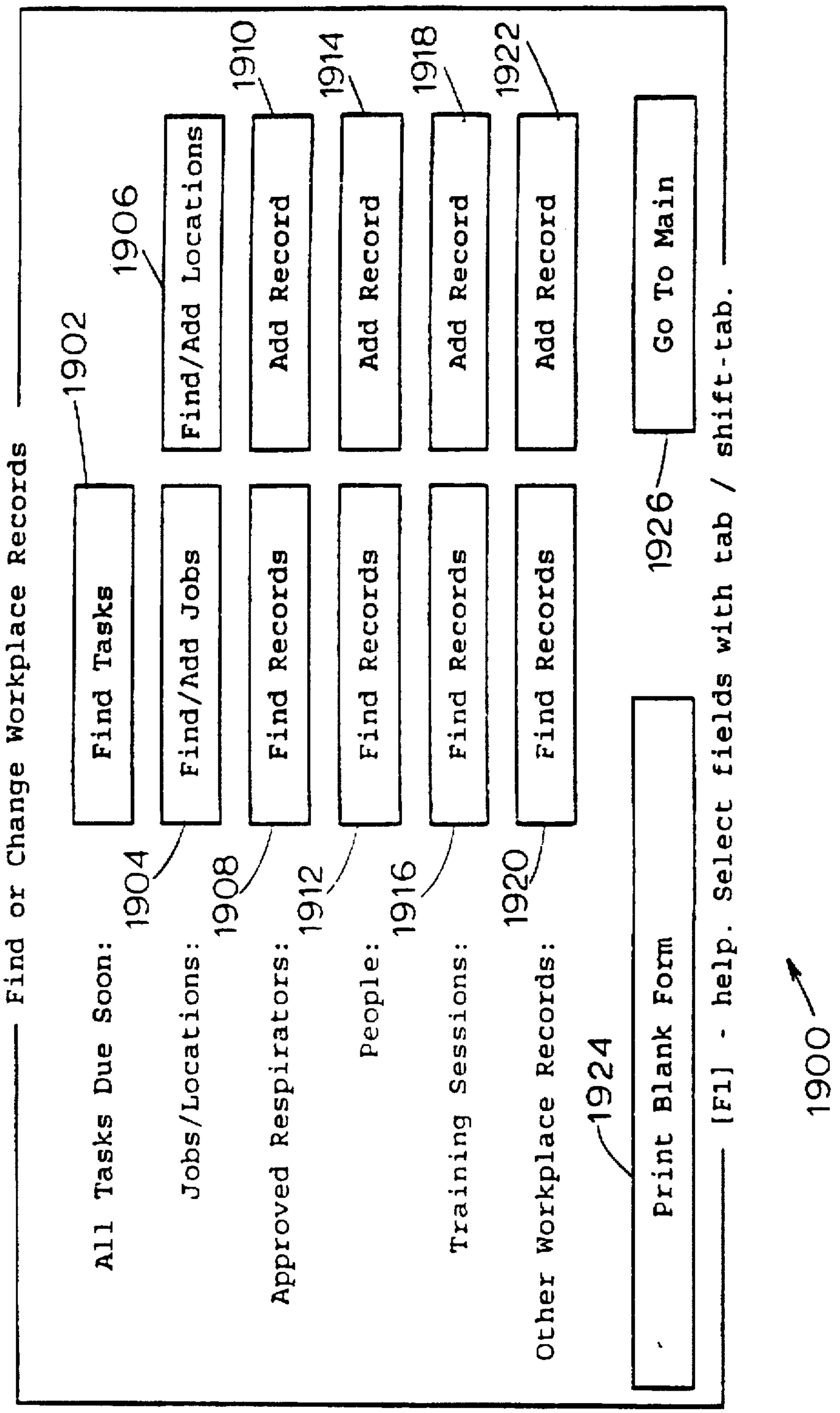
FIG. 19 is a representation of a screen display which is accessed from the screen display of FIG. 17.

Selection of the button 1702 allows the respirator program 120 to find and/or to add workplace records. Accordingly, if the button 1702 of the screen display 1700 shown in FIG. 17 is selected, a screen display 1900 as shown in FIG. 19 is displayed. The screen display 1900 has a button 1902 which allows a user of the data processing system 100 to find those tasks which must be accomplished within a specified amount of time, a button 1904 which allows the user to find/add/delete records related to the jobs for which respirators are required, a button 1906 which allows the user to find/add/delete records related to the locations at which respirators are required, a button 1908 which allows the user to find/delete records related to approved respirators, a button 1910 which allows a user to add records related to approved respirators, a button 1912 which allows the user to find/delete records by employee, a button 1914 which allows the user to add records by employee, a button 1916 which allows a user to find/delete records related to training sessions, a button 1918 which allows a user to add records related to training sessions, a button 1920 which allows a user to find/delete other workplace records, a button 1922 which allows a user to add other workplace records, a button 1924 which allows a user to print blank forms such as medical questionnaires and requests for medical clearance, and a button 1926 which allows the user to jump to the Main Menu presented by the screen display 1700.

Figure 20:
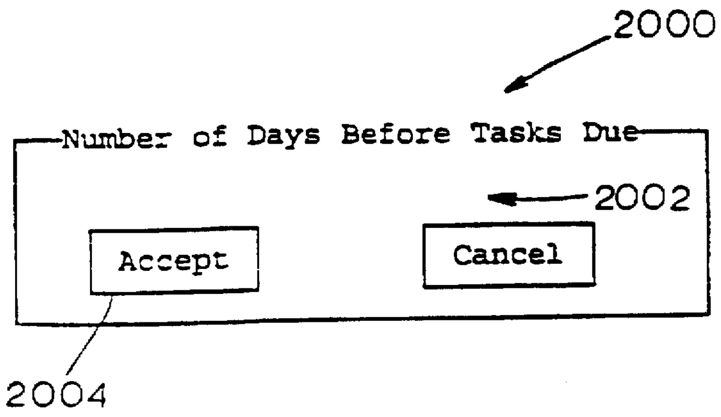
FIG. 20 is a representation of a screen display which is accessed from the screen display of FIG. 19.

When the button 1902 is selected, a screen display 2000 as shown in FIG. 20 is presented to the user to allow the user to specify a search time period within which tasks may be due. By inserting the number of days into a region 2002 of the screen display 2000, the user asks the respirator program 120 to find any tasks due between the current date and the date at the end of the period specified by the number of days entered in the region 2002.

When the number of days (e.g., 30) has been entered in the region 2002 of the screen display 2000 and after this number of days has been accepted by selecting a button 2004, any tasks which are due within the period of time specified by the number of days entered in the region 2002 are displayed to the user. The user can review the tasks which are scheduled to be done within the specified period of time. If no tasks are due within the period of time specified by the user in region 2002 of the screen display 2000, the respirator program 120 returns the user to the screen display 1900.

When the button 1904 is selected from the screen display 1900, the respirator program 120 allows the user to find and/or add records related to the jobs for which respirators are required in much the same way that such records are added during the program development phase (i.e., getting started) described above. Accordingly, the user is presented with a screen display similar to the screen display 1200 in FIG. 12 so that the user can find current jobs by job title or add new job titles to the current list of jobs. Also, each job specified for a respirator may be deleted by selecting a job from the list and selecting the Delete button from a resulting screen.

When the button 1906 is selected from the screen display 1900, the respirator program 120 allows the user to find and/or add records related to the locations at which respirators are required in much the same way that such records are added during the program development phase (i.e., getting started) described above. Accordingly, the user is presented with a screen display similar to the screen display 1100 in FIG. 11 so that the user can find current locations or add new locations to the current list of locations. Also, each location specified for a respirator may be deleted by selecting a location from the list and selecting the Delete button from a resulting screen.

Figure 21:
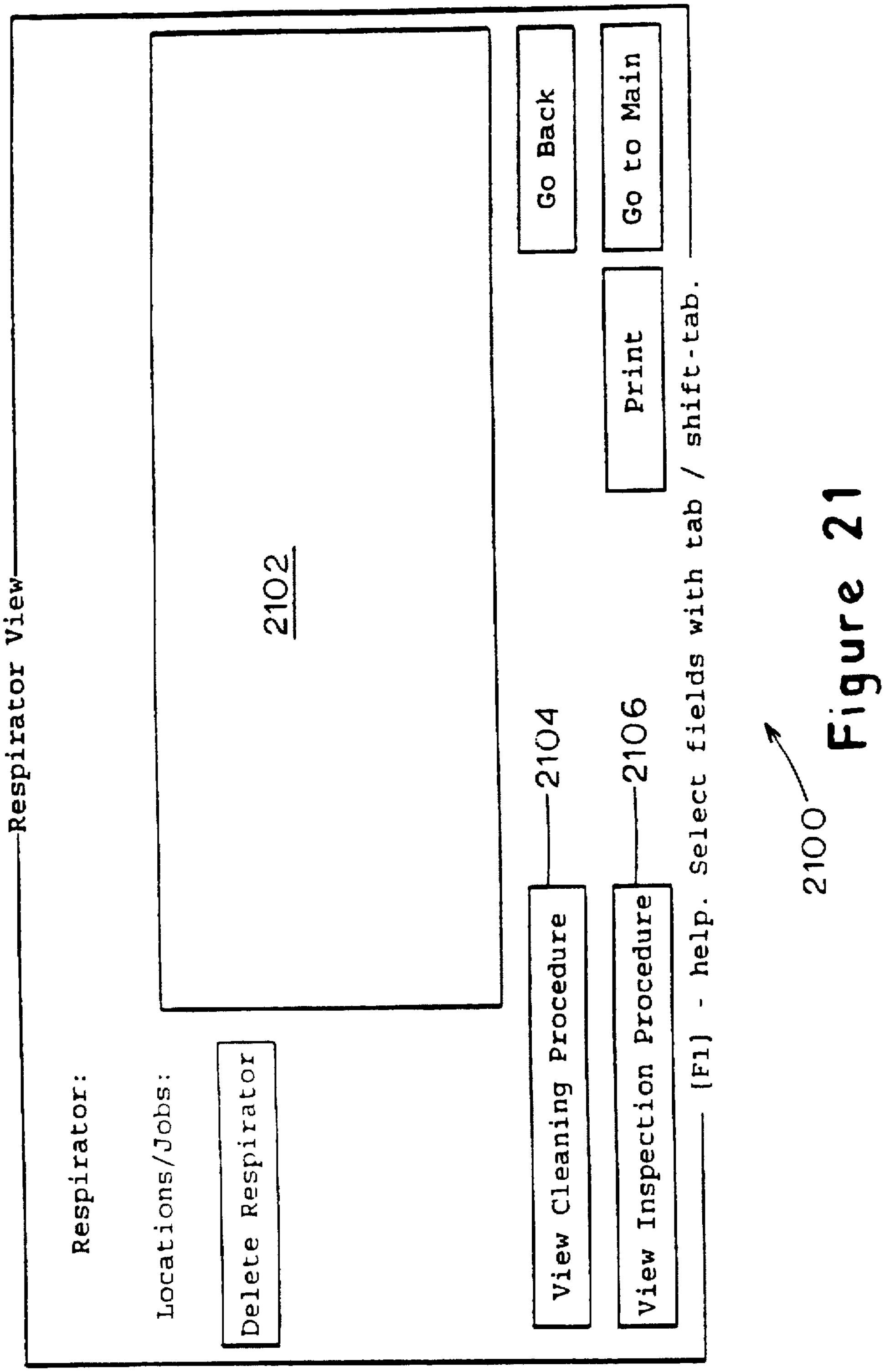
FIG. 21 is a representation of a screen display which is accessed from the screen display of FIG. 19.

The user may search for, and thereby access, a list of approved respirators by selection of the button 1908 of the screen display 1900. Selecting a respirator from this list presents the user with additional information concerning the selected respirator. This information is presented in a screen display 2100 as shown in FIG. 21. The screen display 2100 includes the selected respirator, a scrollable window 2102 containing the locations and jobs for which the selected respirator has been designated, a button 2104 permitting access through a hypertext function to cleaning procedures for the selected respirator, and a button 2106 permitting access through a hypertext function to inspection procedures for the selected respirator. A respirator may be deleted from the list of approved respirators by deleting all jobs and locations for which the respirator is to be used or by selecting a Delete Respirator button. A respirator record may be printed by selecting a Print button. The information displayed by the screen display 2100 is based upon information provided by use of the buttons 504 and/or 1910.

Selecting the button 1910 allows the user to add respirators by location and by job to the list of approved respirators in the same manner that respirators are added by use of the button 504.

When the button 1914 is selected from the screen display 1900, the respirator program 120 allows the user to add employee records in much the same way that such records are added during the program development phase (i.e., getting started) described above. Accordingly, the user is presented with a screen display similar to the screen display 1300 in FIG. 13 so that the user can enter the last name of an employee. The user is also presented with screen displays similar to the screen display 1300 so that the user can enter the first name and employee identification of an employee for whom a record is to be added. Thereafter, a screen display similar to the screen display 1400 shown in FIG. 14 is presented to the user so that the user may enter additional information concerning the employee.

As discussed above, by selecting the button 1402, the user may fill out a medical questionnaire with respect to an identified employee. By selecting the button 1406, the user may fill out a request for medical clearance form for the indicated employee. By selecting the button 1410, the user may select a respirator which is then inserted into the region 1412. In this fashion, an employee may be linked to his medical questionnaires, requests for medical clearance, respirators, and the like. The user may also access training sessions and fit tests for the employee by highlighting a respirator in the region 1412 and by pressing the enter key. In addition, the dates of any existing medical questionnaires are provided in the region 1404, and the dates of any existing requests for medical clearance are provided in the region 1408.

As mentioned above, a medical questionnaire may not be accessed after it has been completed and accepted. It is stored as a hard copy outside of the data processing system 100 for privacy reasons. However, the dates of the records are available in the region 1404 of each person's record. Accordingly, the date of each questionnaire appears in the region 1404 of the screen display 1400. In addition, the date of the most recent questionnaire for each person may be accessed by using the View Respirator Program function of the Main Menu screen display 1700.

Figure 22:
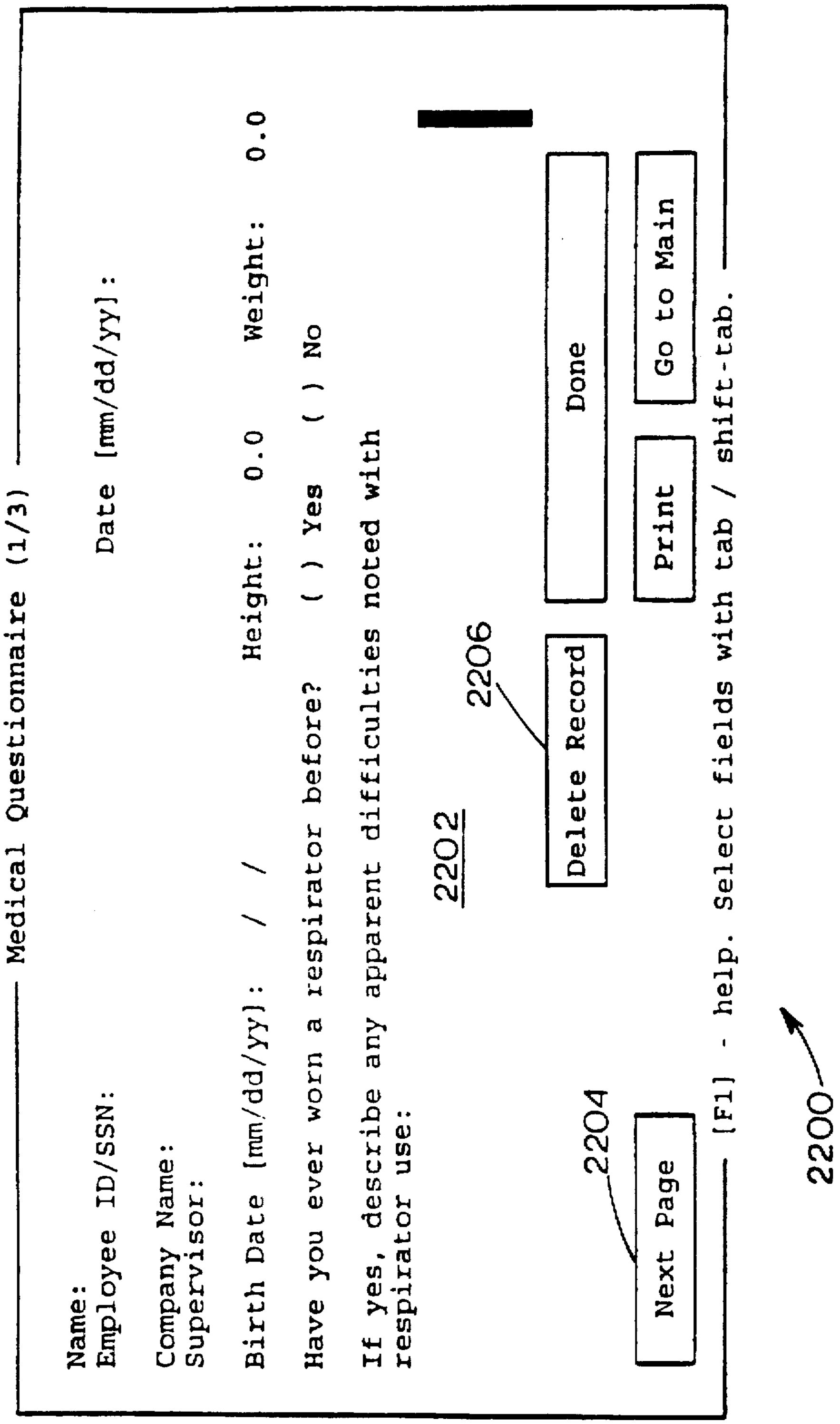
FIG. 22 is a representation of a screen display which is accessed from the screen display of FIG. 14.

An example of a medical questionnaire is shown in FIG. 22 as a screen display 2200. The medical questionnaire allows the user to enter the employee's name, the employee's social security number, the date of the medical questionnaire, the birth date of the employee, the employee's height and weight, an indication as to whether the employee has ever worn a respirator before, and an indication of any apparent difficulties with the use of the respirator (which may be entered in a scrollable window 2202). The company name of the employer is filled in automatically by the respirator program 120 based upon the requirements customized during program development. By accessing additional pages of the medical questionnaire through the use of buttons similar to a button 2204, the user is requested to indicate whether the employee has had any of the illnesses or injuries listed on the questionnaire, and is provided an area where the user may enter additional information concerning specific injuries or illnesses. Accordingly, this medical questionnaire may be a typical medical questionnaire.

While the medical questionnaire in the screen display 2200 is in view, (i.e., while the current medical questionnaire is being completed), information may be changed. However, a medical questionnaire may not be updated after it has been completed and accepted. Also, while the medical questionnaire is in view, it may be deleted. After the medical questionnaire has been completed and accepted, the date may be deleted by selecting the date of the medical questionnaire from the region 1404 and by then selecting a Delete date option which appears in a resulting overlay. A medical questionnaire may be printed before it is accepted. However, once the medical questionnaire has been accepted, it may not be printed because it is stored outside of the data processing system 100.

From the employee record in the screen display 1400, new requests for medical clearance can be added by activating the button 1406, and existing clearance records may be accessed from the region 1408. If desired, the most recent medical clearance records for each person also can be accessed from the "go to related" portions of a medical evaluation requirements screen display and the request for medical clearance form screen display. The requests for medical clearances may also be accessed through the View Respirator Program button 1708 and the Audit Preparation button 1712.

Figure 23:
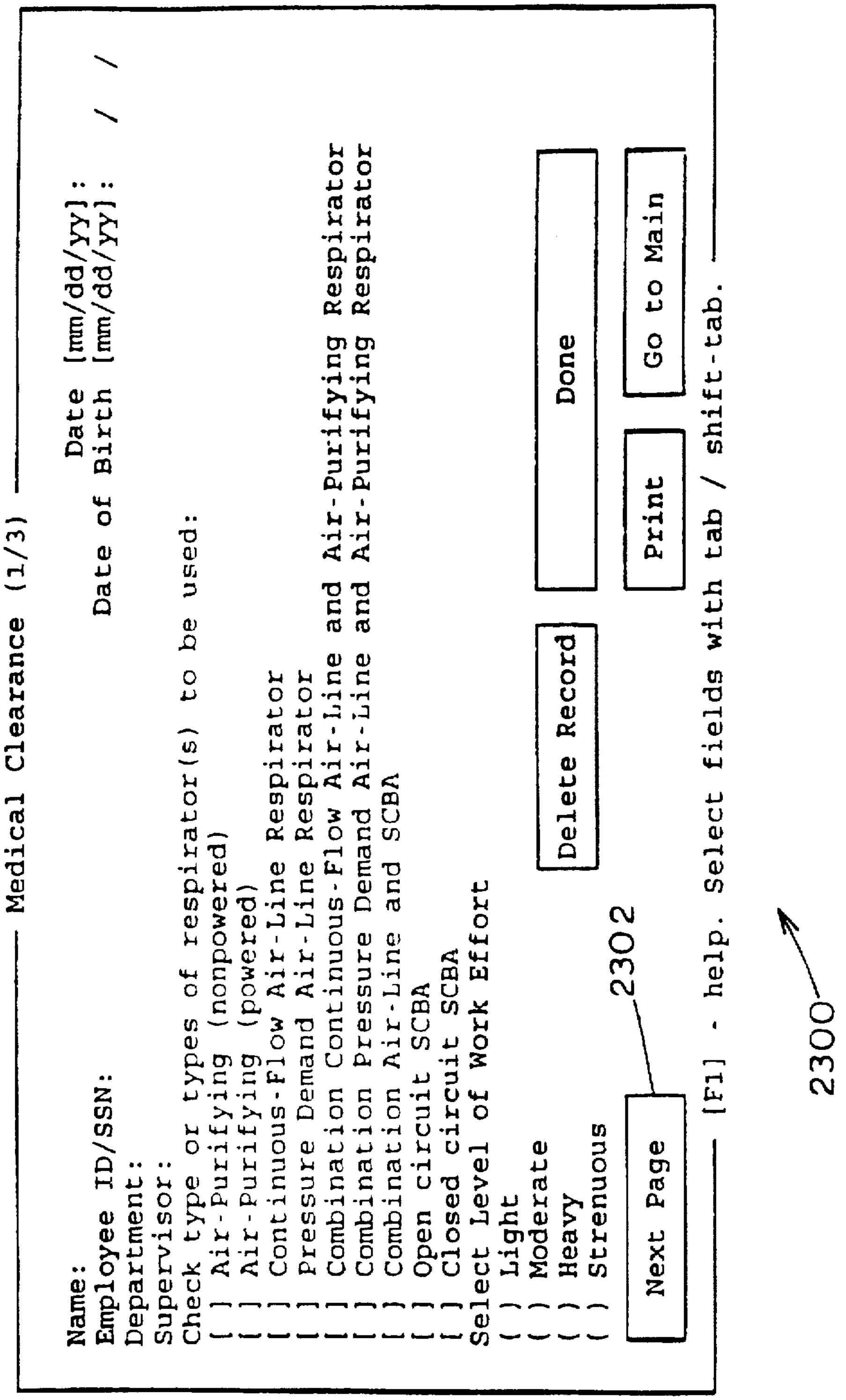
FIG. 23 is a representation of a screen display which is accessed from the screen display of FIG. 14.

An example of a request for medical clearance is shown in FIG. 23 as a screen display 2300. The request is necessary in order to clear the use by the employee of one or more respirators. This screen display 2300 includes the name of the employee for whom medical clearance is requested, the employee's identification number, the date of the request, the birth date of the employee, the employee's supervisor and department, the type or types of respirators to be used by the employee, and the level of work effort to be expended by the employee during the job for which each designated respirator is to be used. By accessing additional pages of the request for medical clearance through the use of buttons similar to a button 2302, the user may provide such other information as the extent of the usage of a respirator, the length of continuous time that a respirator will be used, any special work considerations required for a particular job, the name of a safety representative, any restrictions imposed by a physician on the use of a respirator by the employee, the nature of the restrictions, and the name of the physician imposing the restrictions. As shown by the screen display 2300, records related to requests for medical clearance may be deleted and/or printed.

Figure 24:
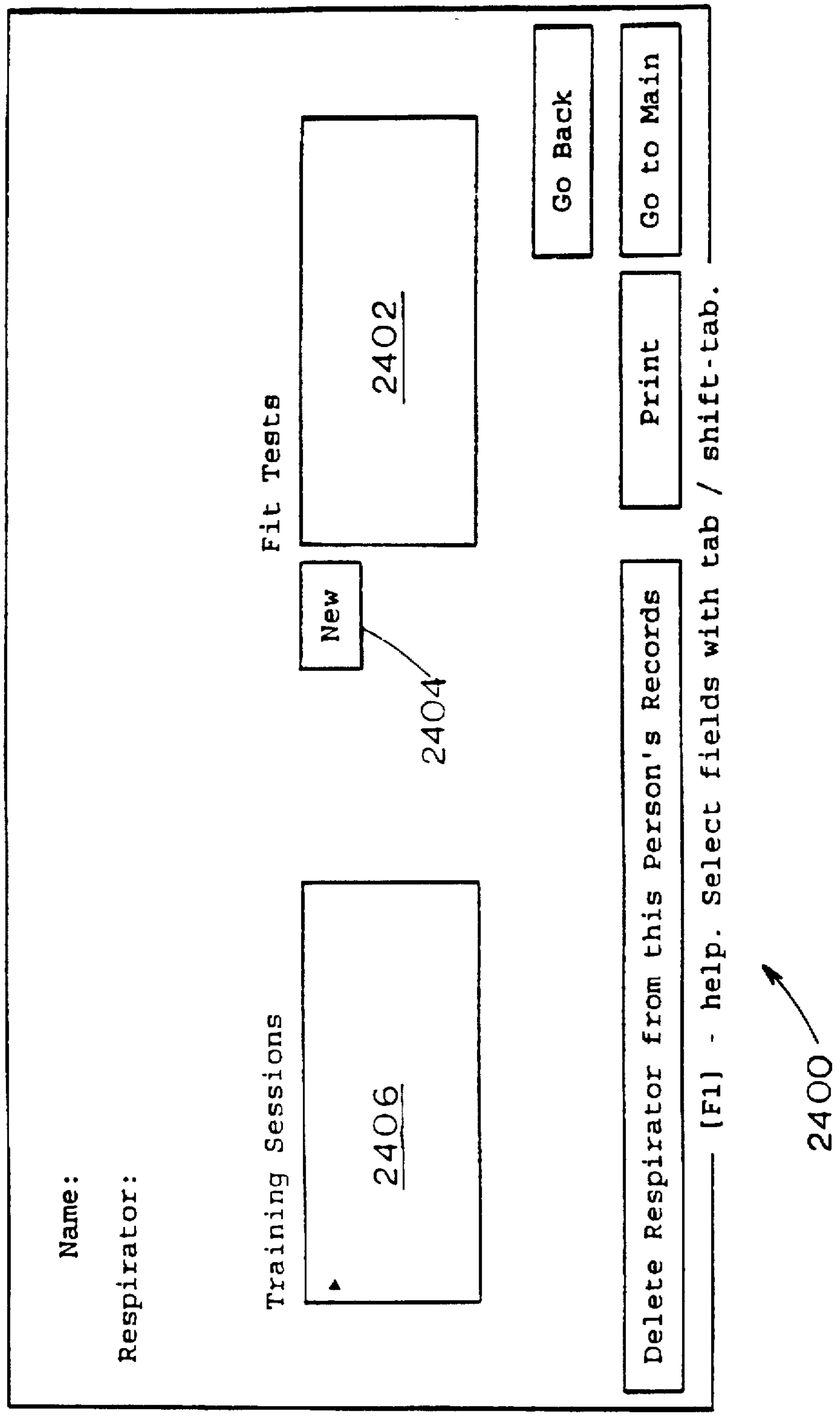
FIG. 24 is a representation of a screen display which is accessed from the screen display of FIG. 14.

Qualitative and quantitative fit test records are also linked to the employee by the screen display 1400. For example, to access qualitative and/or quantitative fit test records from the screen display 1400, a user may highlight a respirator displayed within the region 1412 of the screen display 1400 and may then press the enter key which causes a screen display 2400 as shown in FIG. 24 to be presented. The name of the employee and the respirator type are inserted by the respirator program 120 into the screen display 2400 based upon the employee name and respirator type selected from the screen display 1400. The dates of fit tests for an employee/respirator combination are provided in a region 2402 of screen display 2400. An existing fit test record may be accessed by selecting a fit test record displayed in the region 2402. Also, a new fit test record may be added by selecting a button 2404 of the screen display 2400.

Figure 25:
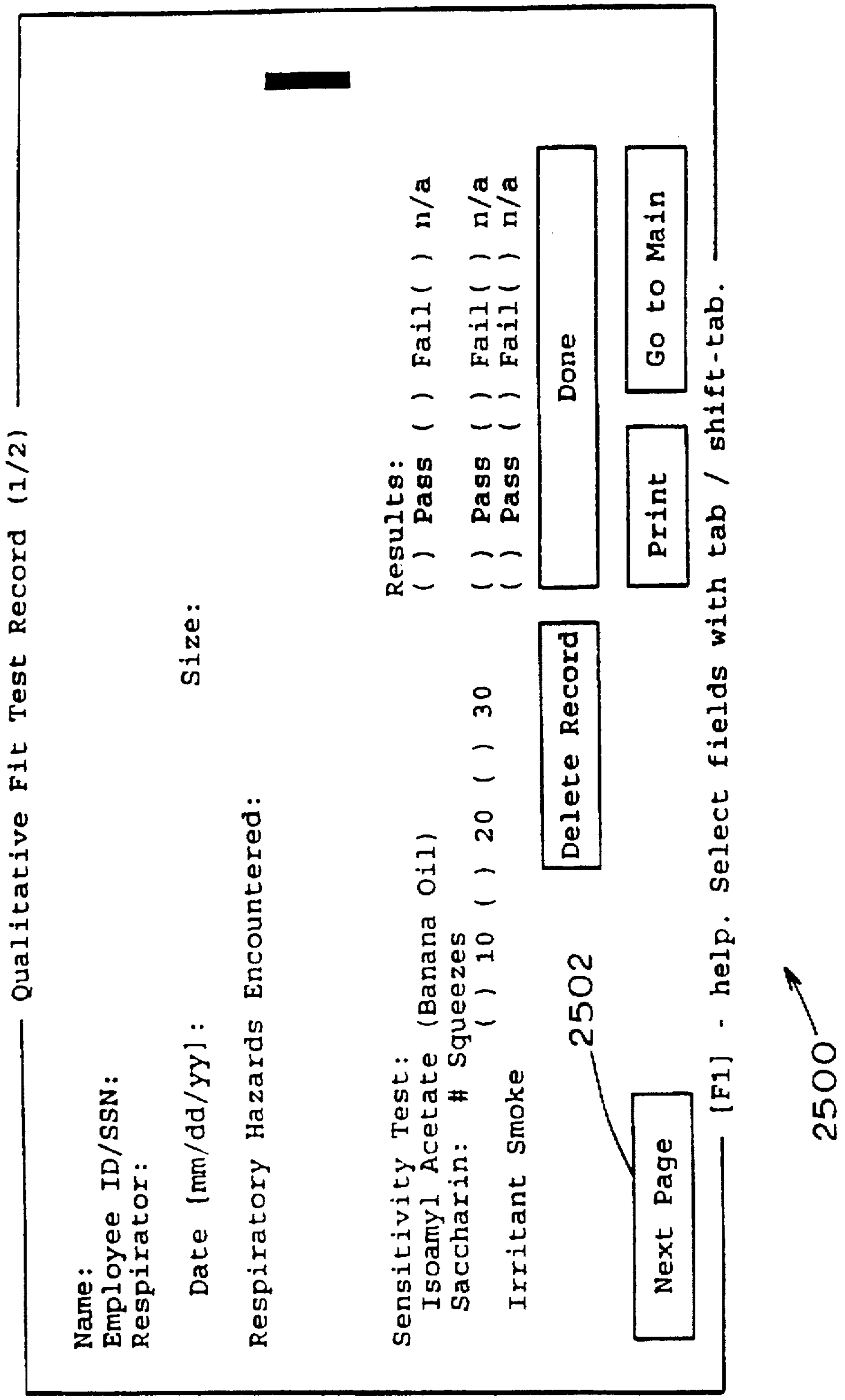
FIG. 25 is a representation of a screen display which is accessed from the screen display of FIG. 24.

When the button 2404 is selected, the user is requested to indicate the type of fit test record which is to be created, i.e. a qualitative fit test record or a quantitative fit test record. If a qualitative fit test record is requested, a screen display 2500 shown in FIG. 25 is presented to the user. This screen display includes the name and employee identification for a specific employee, the type of respirator involved in the qualitative fit test, and the date of the qualitative fit test record. The user may enter the size of the respirator involved in the qualitative fit test, the respiratory hazards against which the fit test was made, and the results of tests of the respirator involving certain contaminants. By accessing additional pages of the qualitative fit test through the use of buttons similar to a button 2502, the user provides such other information as the results of tests of the respirator involving certain other contaminants, comments in a comment section, a date by which the fit test must be repeated, and the name of the person conducting the fit test.

Figure 26:
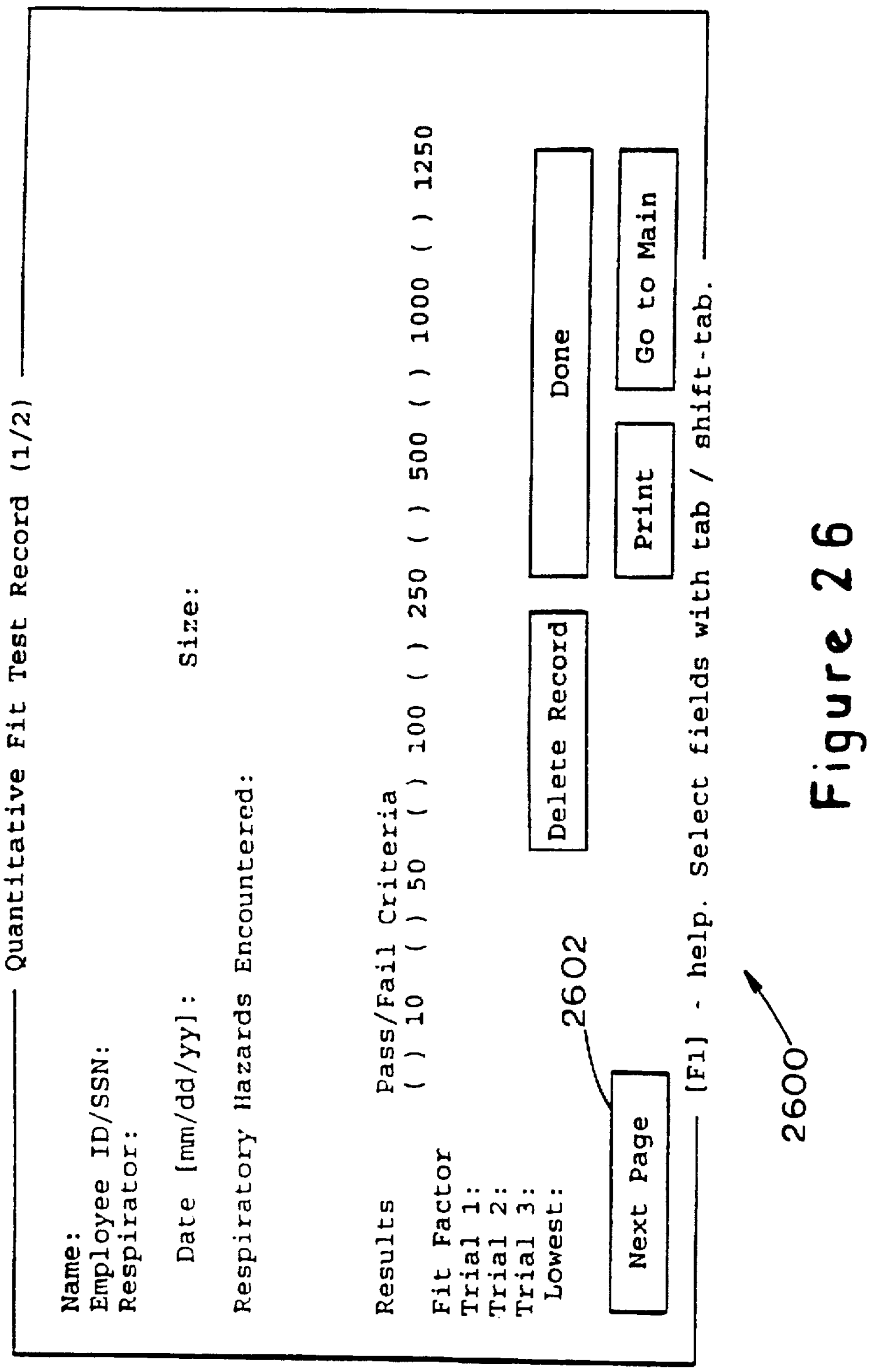
FIG. 26 is a representation of a screen display which is accessed from the screen display of FIG. 24.

A quantitative fit test record may also be generated by activating the button 2404 of the screen display 2400, and choosing the quantitative record option thereby causing a screen display 2600 as shown in FIG. 26 to be presented to the user. As shown in FIG. 26, the screen display 2600 includes the name and employee identification number of the employee, the type of respirator involved in the quantitative fit test, and the date on which the quantitative fit test was conducted. The user may enter the size of the respirator involved in the quantitative fit test, the respiratory hazards encountered during the quantitative fit test, an indication of whether the employee passed the quantitative fit test and the level at which the employee passed, and an indication of the fit factor of the quantitative fit test. By accessing additional pages of the quantitative fit test through the use of buttons similar to a button 2602, the user may provide such other information as the identity of any instrumentation which was used during the test, the identity of a specific probe which was used during the test, comments in a comment section, an indication of where a strip chart record of the test may be found, and the identity of the person who conducted the test.

Training sessions cannot be set up from the screen display 2400. Training sessions are set up from the screen display 500 during development of the workplace respiratory protection program, or from the screen display 1900 as will be discussed hereinafter. When a training session is set up, it is added automatically to a region 2406 of the screen display 2400. Thus, training sessions are displayed in the region 2406 of the screen display 2400.

The user may search for, and thereby access, existing employee records, such as the employee record shown by the screen display 1400 of FIG. 14, by selecting the button 1912 of the screen display 1900. Selecting the button 1912 presents the user with a list of employees. Selection of one of the employees on the list provides the user with the selected employee's record in the form of the screen display 1400 as shown in FIG. 14. From this screen display 1400, the user may process, print, or delete an employee record.

The user may search for, and thereby access, training records by selecting the button 1916 of the screen display 1900. Upon selection of the button 1916, the user is presented with a list of training sessions. After selecting a training session from the list, the user may view an attendance roster in a form similar to the screen display 1600. From this screen display, the records relating to training sessions may be printed and/or deleted. Training session records are also provided in a training appendix of the program which may be accessed by a View Respirator Program button and by a Print Respirator Program button of the screen display 1700 as shown in FIG. 17.

Training sessions may be added by selecting the button 1918 of the screen display 1900. Selection of the button 1918 presents the screen display 1600 to the user. Accordingly, as discussed in connection with FIG. 16, the user may enter employee names in a roster of those employees who are to attend an upcoming training session, and the user may select the respirator for which the training session is to be conducted. Training session records may be changed or deleted.

Buttons 1920 and 1922 of the screen display 1900 allow other workplace records to be found, deleted, and/or added. These other workplace records may include, for example, records related to assessment of exposure of employees to particular contaminants, documentation related to the selection of respirators, records regarding breathing air quality testing, records relating to the evaluation of the respirator program, and/or the like.

Figure 27:
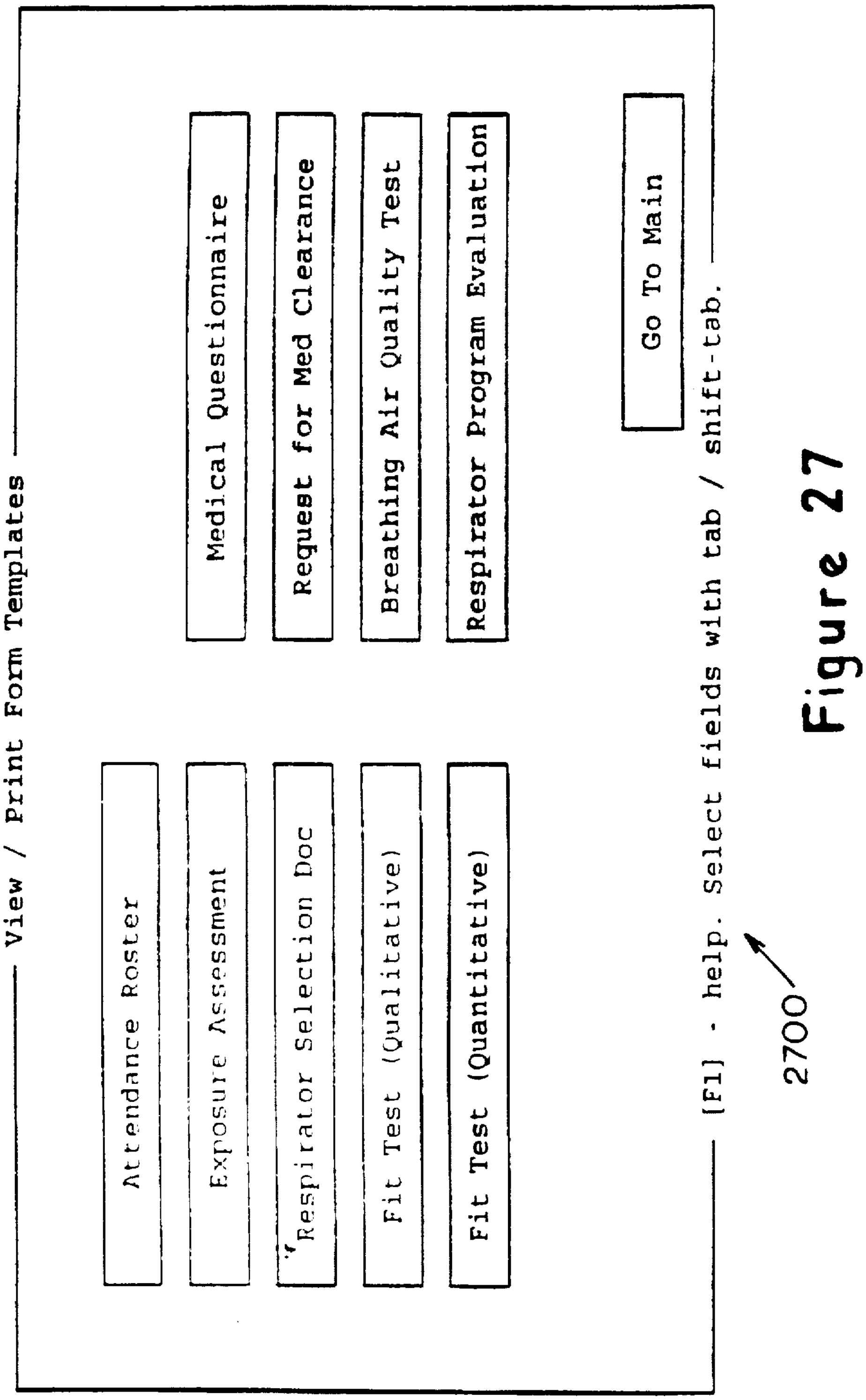
FIG. 27 is a representation of a screen display which is accessed from the screen display of FIG. 19.

Selection of the button 1924 allows the user to view and print the form templates used in the respirator program 120. Selection of the button 1924 presents the user with a screen display 2700 as shown in FIG. 27. Accordingly, the attendance roster form template, an exposure assessment form template, a respirator selection documentation form template, the qualitative and quantitative fit test form templates, the medical questionnaire form template, the request for medical clearance form template, a breathing air quality test form template, and a workplace protection program evaluation form template may be viewed and/or printed. These templates represent the forms which are discussed above and which are presented to the user during development and maintenance of the workplace respiratory protection program.

Finally, selection of the button 1926 allows the user to jump to the Main Menu presented by the screen display 1700.

Figure 28:
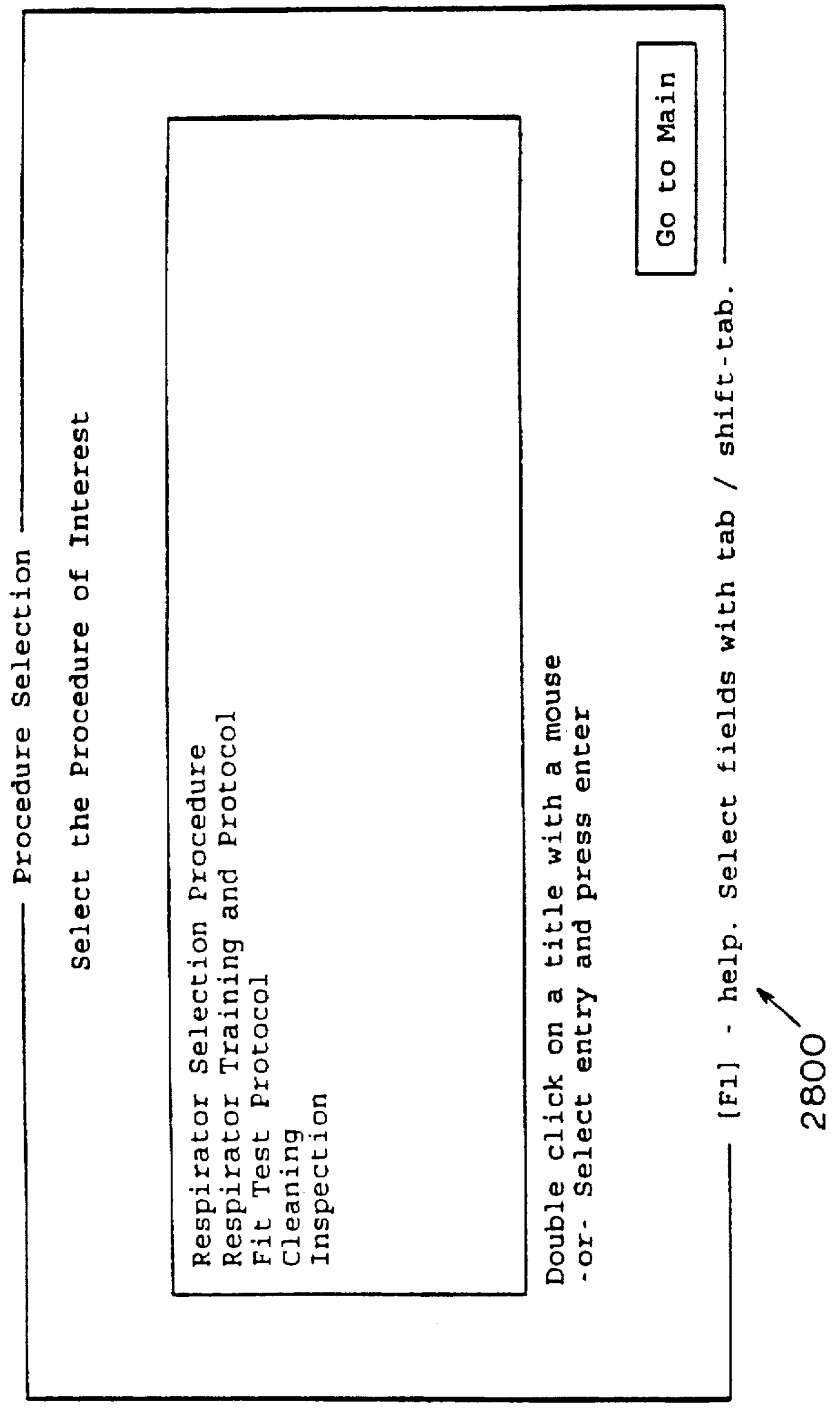
FIG. 28 is a representation of a screen display which is accessed from the screen display of FIG. 17.

Selection of the button 1704 from the screen display 1700 as shown in FIG. 17 permits the user to read/print the standard operating procedures which are incorporated into the respirator program 120. Selection of the button 1704 presents the user with a screen display such as a screen display 2800 as shown in FIG. 28. From this screen display, the user may view the standard operating procedures relating to such aspects of a workplace respiratory protection program as the selection of respirators, the training and protocol related to respirators, the protocols related to fit testing, the procedures related to the cleaning of respirators, and the procedures related to the inspection of respirators. These procedures (i.e., knowledge) may be stored in manual form and may be taken from approved industry recognized procedures, from governmentally recognized procedures relating to the desired topics, and/or from the like.

Figure 29:
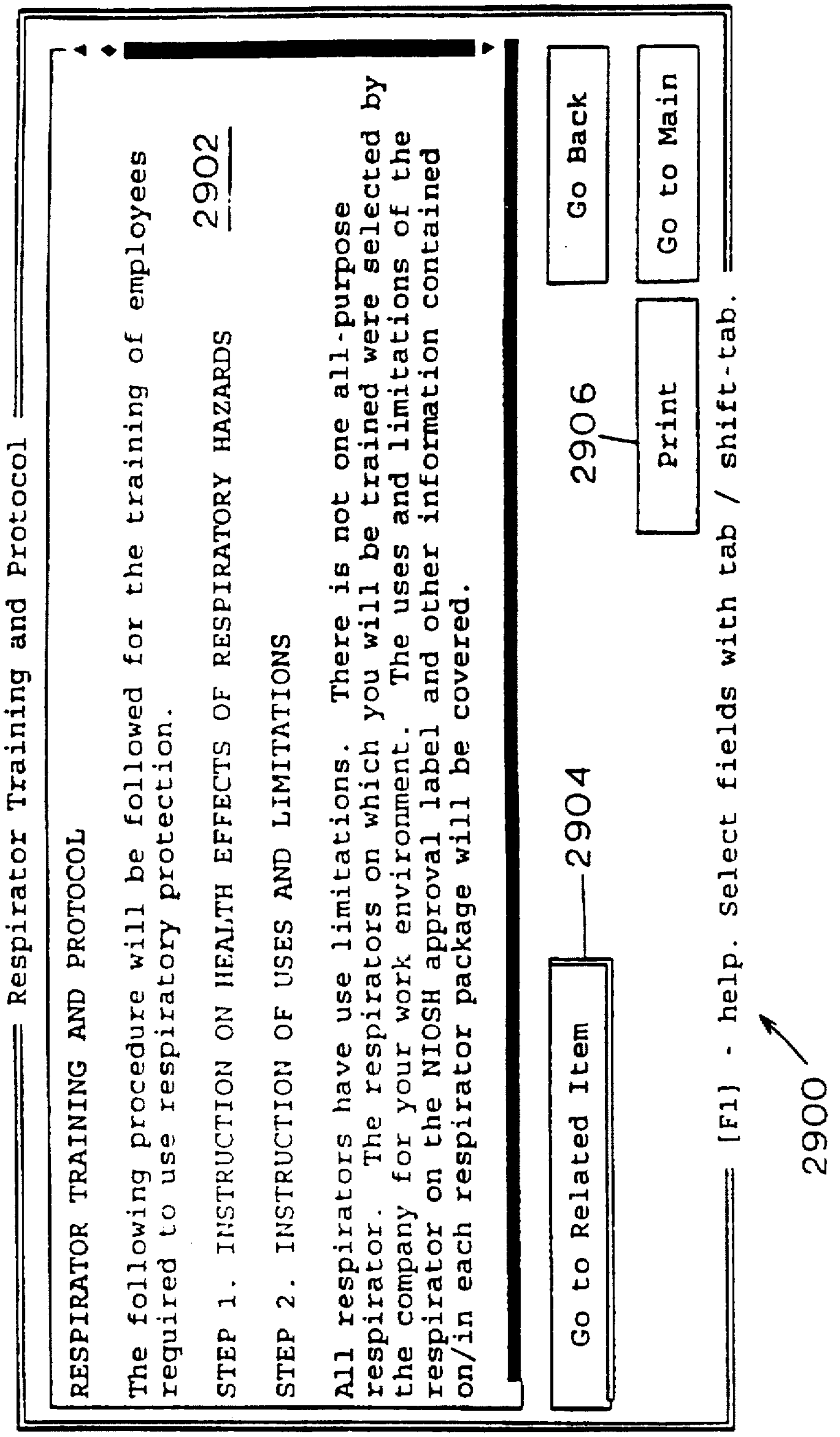
FIG. 29 is a representation of a screen display which is accessed from the screen display of FIG. 28.
Figure 30:
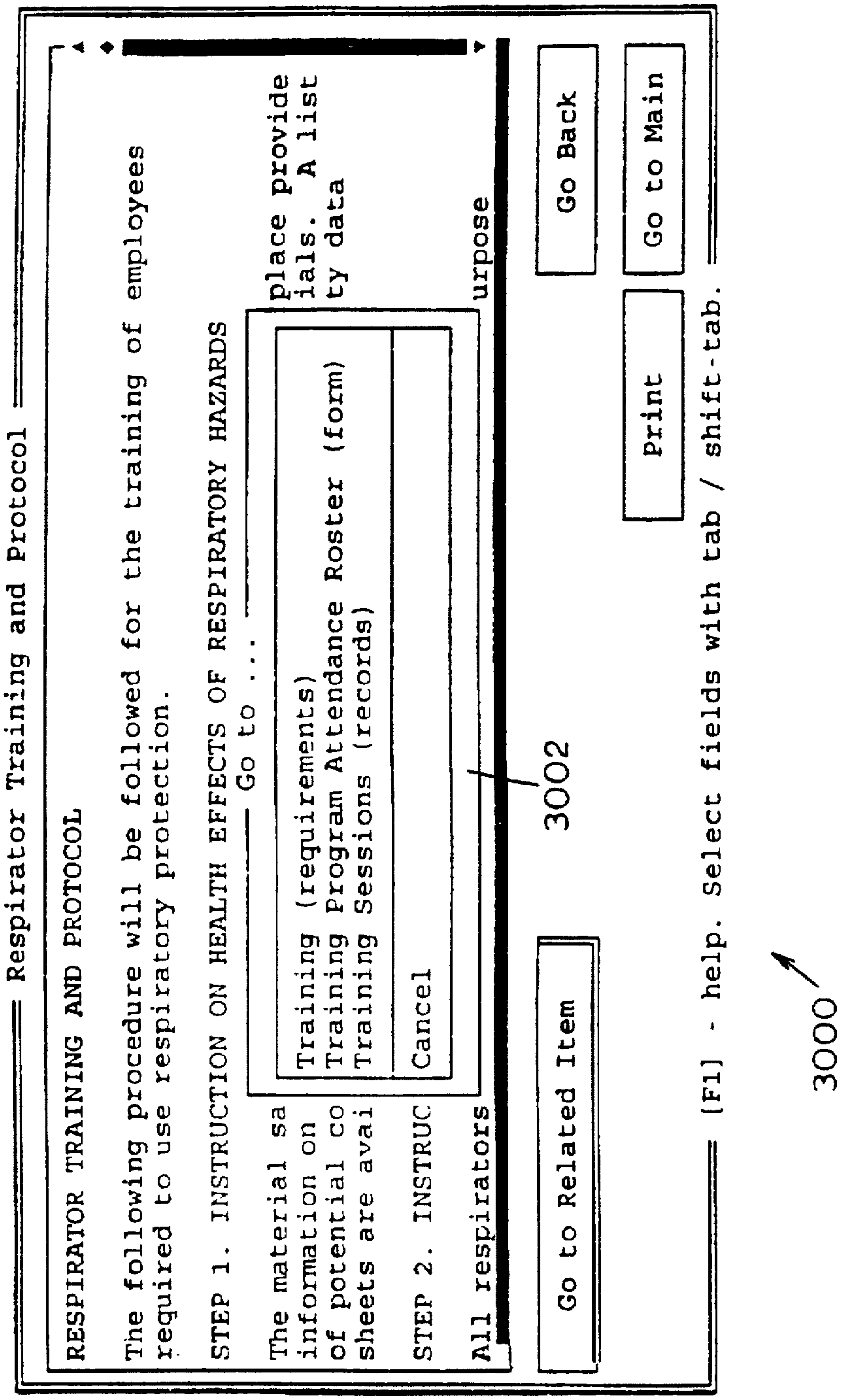
FIG. 30 is a representation of a screen display which is accessed from the screen display of FIG. 29.

As indicated by the screen display 2800, these standard operating procedures may be accessed from the screen display 2800. For example, if the standard operating procedures relating to respiratory training and protocol are accessed, these procedures may be similar to those shown in a screen display 2900. The screen display 2900 includes a scrollable window 2902 wherein the standard operating procedures may be read. The screen display 2900 also includes a button 2904 which, when activated, presents an overlay to permit the user through a link or hypertext function to access training requirements, training program attendance roster forms, and training session records. Accordingly, as shown by a screen display 3000 in FIG. 30, this overlay may be in the form of a region 3002 which is an overlay of the screen display 2900 shown in FIG. 29. Also, as shown in connection with the screen display 2900, the standard operating procedures may be printed by selection of a button 2906.

Similarly, if the standard operating procedures relating to respirator selection are selected from the screen display 2800, a Go to Related Item button on the resulting screen display permits the user through a link or hypertext function to access respirator selection requirements, respirator selection documentation forms, respirator selection documentation records, and approved respirator records. If the standard operating procedures relating to fit test protocol are selected from the screen display 2800, a Go to Related Item button on the resulting screen display permits the user through a link or hypertext function to access fit test requirements, qualitative fit test record forms, and fit test records. If the standard operating procedures relating to respirator cleaning are selected from the screen display 2800, a Go to Related Item button on the resulting screen display permits the user through a link or hypertext function to access cleaning requirements. If the standard operating procedures relating to respirator inspection are selected from the screen display 2800, a Go to Related Item button on the resulting screen display permits the user through a link or hypertext function to access inspection requirements.

Figure 31:
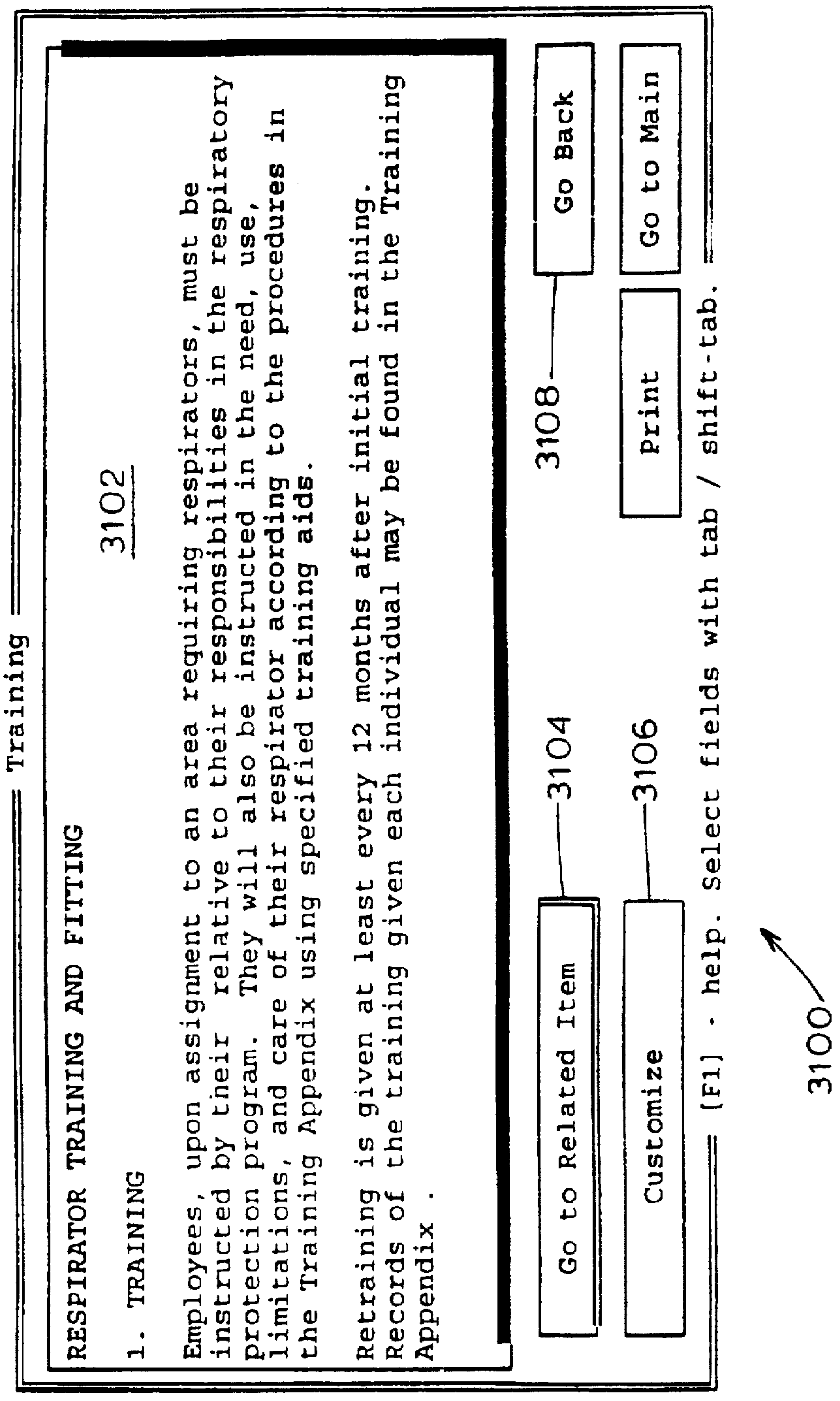
FIG. 31 is a representation of a screen display which is accessed from the screen display of FIG. 30.

Selection of training requirements from the region 3002 of the screen display 3000 may result, for example, in a screen display 3100 as shown in FIG. 31. This screen display 3100 has a scrollable window region 3102 within which the training requirements may be viewed, and a Go to Related Item button 3104 which allows the user through a link or hypertext function to access, for example, the respirator training protocol, the training program attendance roster form, and the training session records. The screen display 3100 also has a Customize button 3106 which allows the user through a link or hypertext function to customize certain information with regard to a training program, such as the title of the employee responsible for instructing employees on respirators and where records regarding the training of each individual employee may be found. A Go Back button 3108 takes the user back to the screen display 2900.

Figure 32:
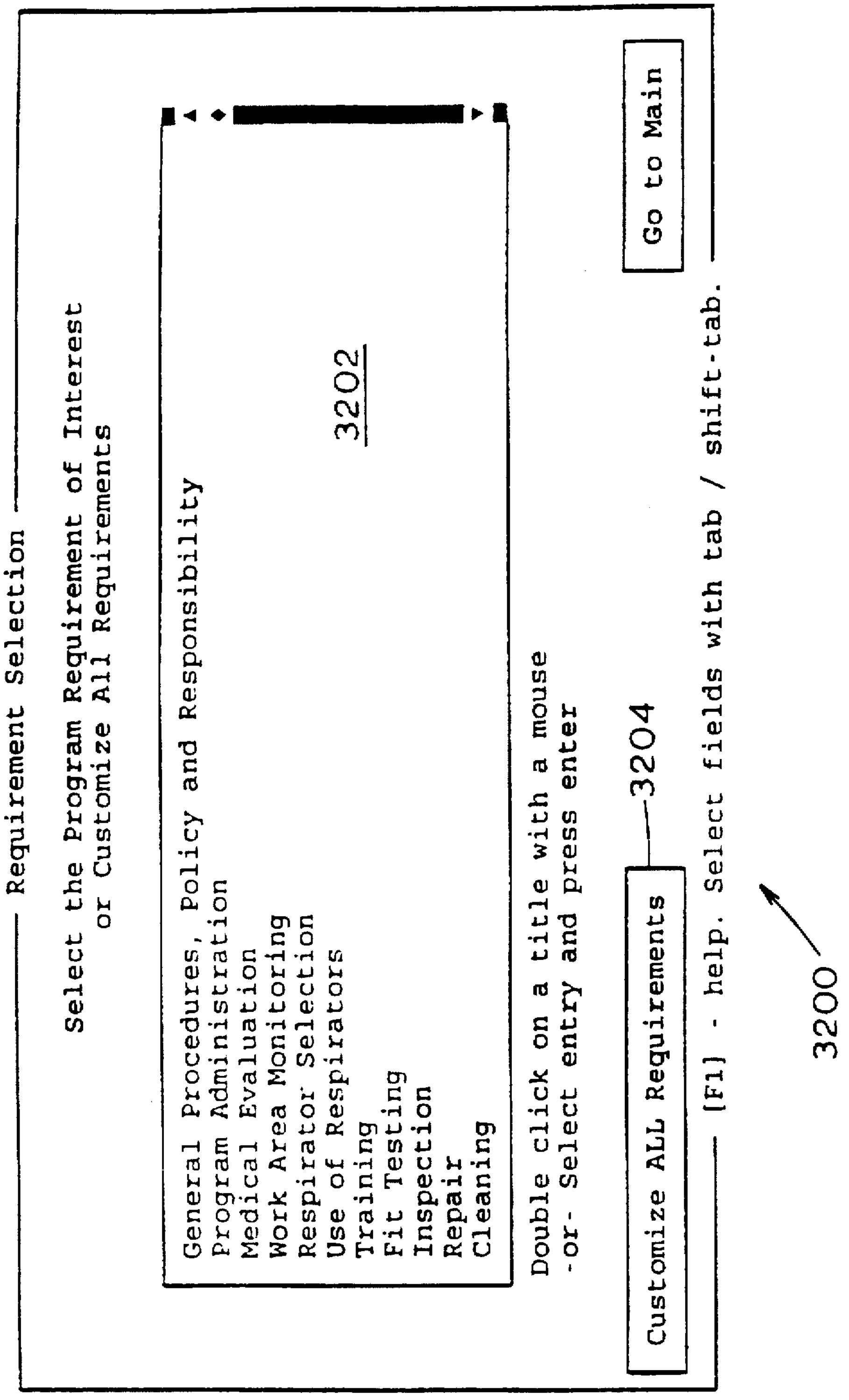
FIG. 32 is a representation of a screen display which is accessed from the screen display of FIG. 17.

Respirator program requirements may be accessed through selection of the button 1706 from the screen display 1700. Selection of the button 1706 presents the screen display 3200 shown in FIG. 32. This screen display allows the user to view requirements related to the workplace respiratory protection program such as the program's general procedures, program administration, medical evaluation, work area monitoring, respirator selection, and the like. In addition to the items shown in the screen display 3200, procedures relating to the storage of respirators and the evaluation of the workplace respiratory protection program may also be accessed. Furthermore, a button 3204 allows customization of all requirements. As discussed above, customization may allow the user to enter the company name of the employer relating to the workplace respiratory protection program, the address of the company, the name and titles of individuals responsible for the various implementation of the requirements, and the like.

Selection of the button 1708 from the screen display 1700 shown in FIG. 17 allows the user to view the respiratory program by paging through information and knowledge in the form of a manual. This manual is assembled by the respirator program 120 as the workplace respiratory protection program is developed, customized, and maintained by the user. It also provides the user with the pre-entered knowledge which forms the basis of any workplace respiratory protection program. Thus, the manual may contain, for example, a plurality of sections wherein some of the sections have been discussed above. These sections in an exemplary order may include general procedures, policy and responsibilities, program administration, medical evaluation, work area monitoring, respiratory selection, use of respirators, training, fit testing, inspection, repair, cleaning, storage, various medical appendices, exposure assessments, respirator selection, training appendices, fit testing appendices, respirator inspection and cleaning appendices, and/or the like.

Selection of the button 1710 from the screen display 1700 shown in FIG. 17 allows the user to print the respiratory program which the user may view by selection of the button 1708.

Figure 33:
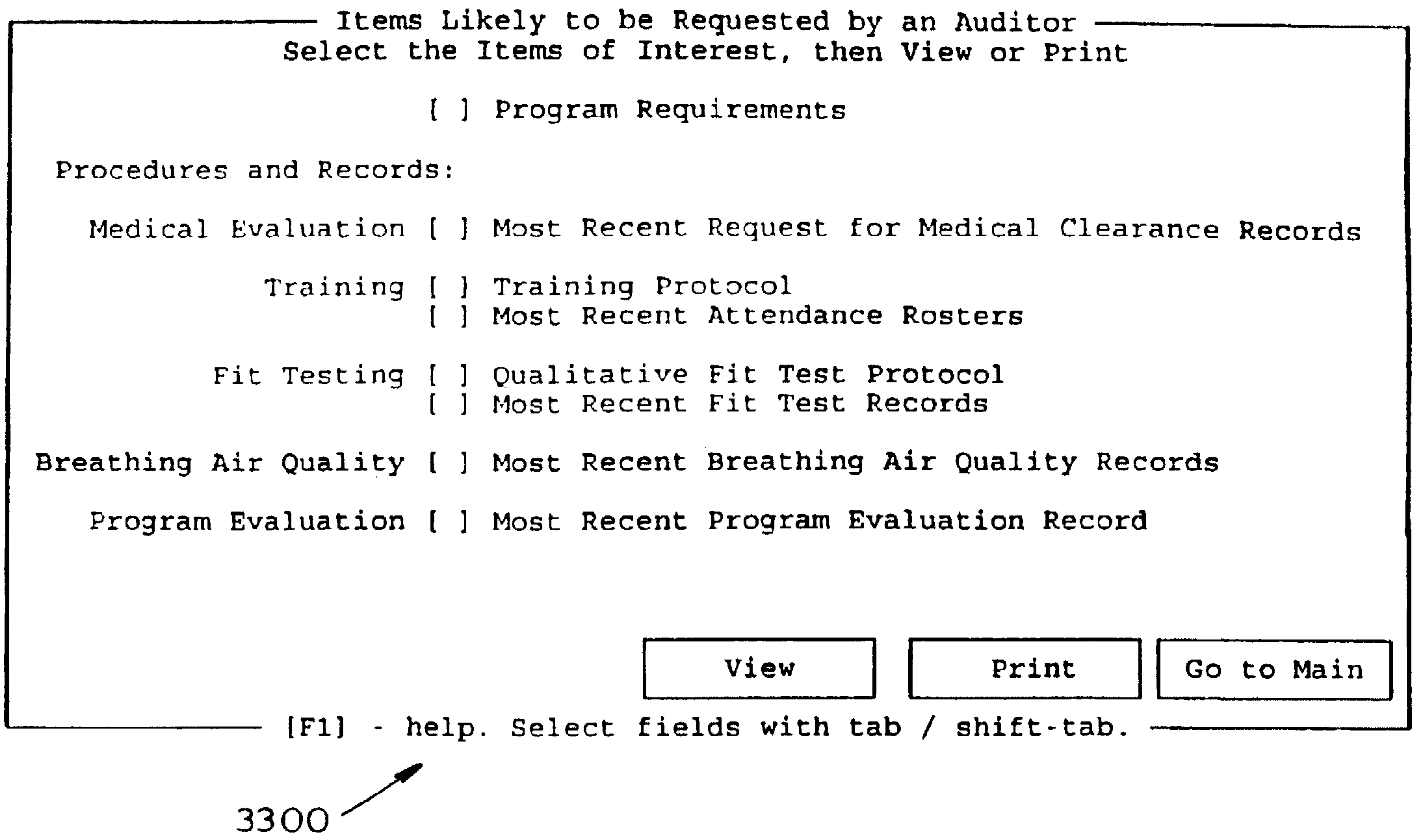
FIG. 33 is a representation of a screen display which is accessed from the screen display of FIG. 17.

Selection of the button 1712 from the screen display 1700 shown in FIG. 17 assists the user in preparing for an audit. Accordingly, selection of the button 1712 presents the user with a screen display 3300 as shown in FIG. 33. From this screen display, the user is reminded of the information likely to be required by an auditor. This information may include, for example, program requirements related to the workplace respiratory protection program as developed by the user and as contained in the respirator program 120, records relating to the most recent requests for medical clearances, training protocol, attendance rosters, qualitative fit tests protocols, fit test records, breathing air quality records, and program evaluation records. The user may view and/or print any of this information, as desired, by selecting the item and by then selecting a View and/or Print button.

Figure 34:
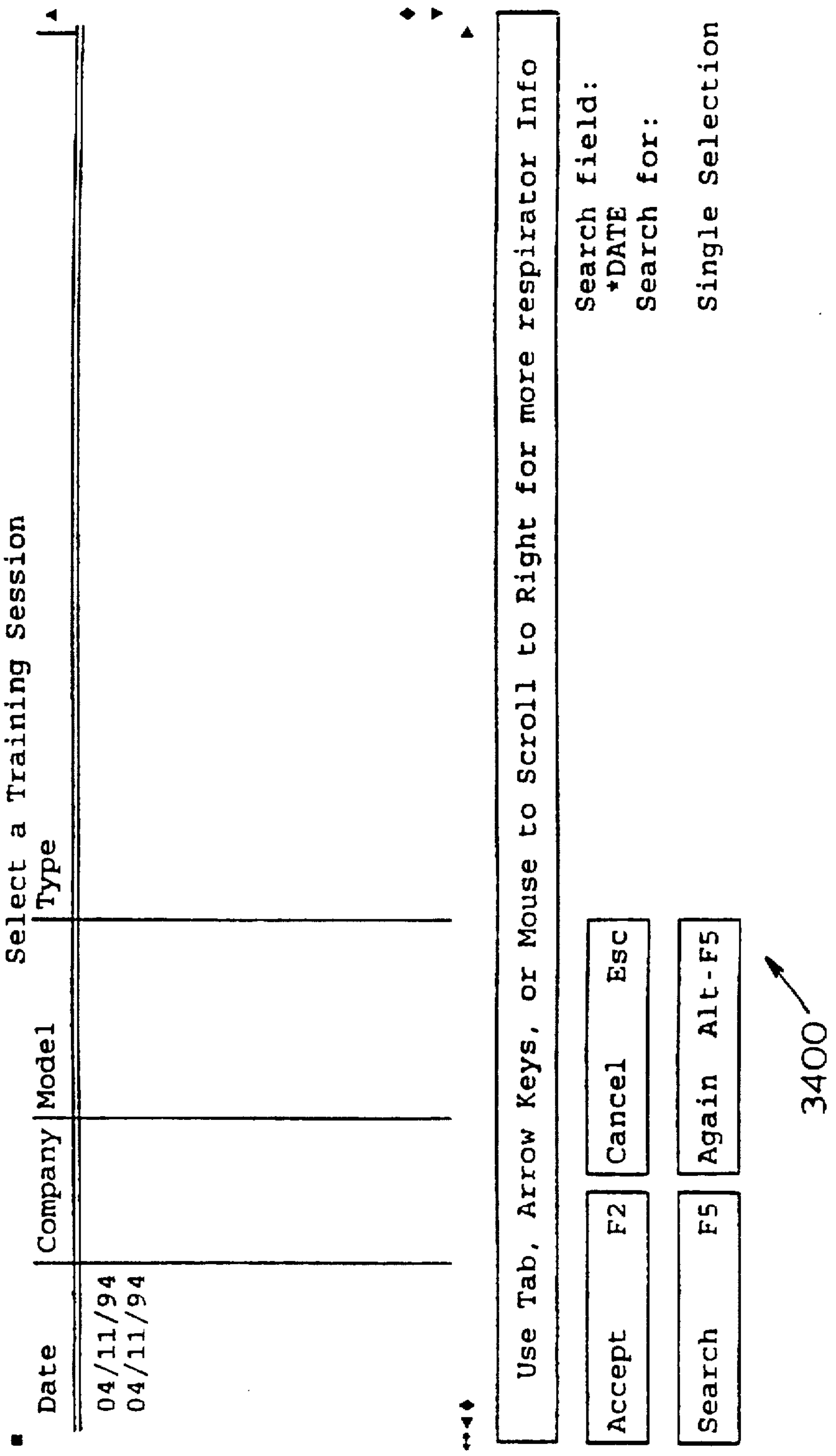
FIG. 34 is a representation of a screen display which is accessed from the screen display of FIG. 30.

If the user selects training sessions records from the overlay 3002, the user is presented with a display 3400 as shown in FIG. 34 from which, by the user selecting a training session from a list of training sessions, the respirator program 120 jumps through a hypertext link to the screen display 1600 so that the user can view training sessions records.

Figure 35:
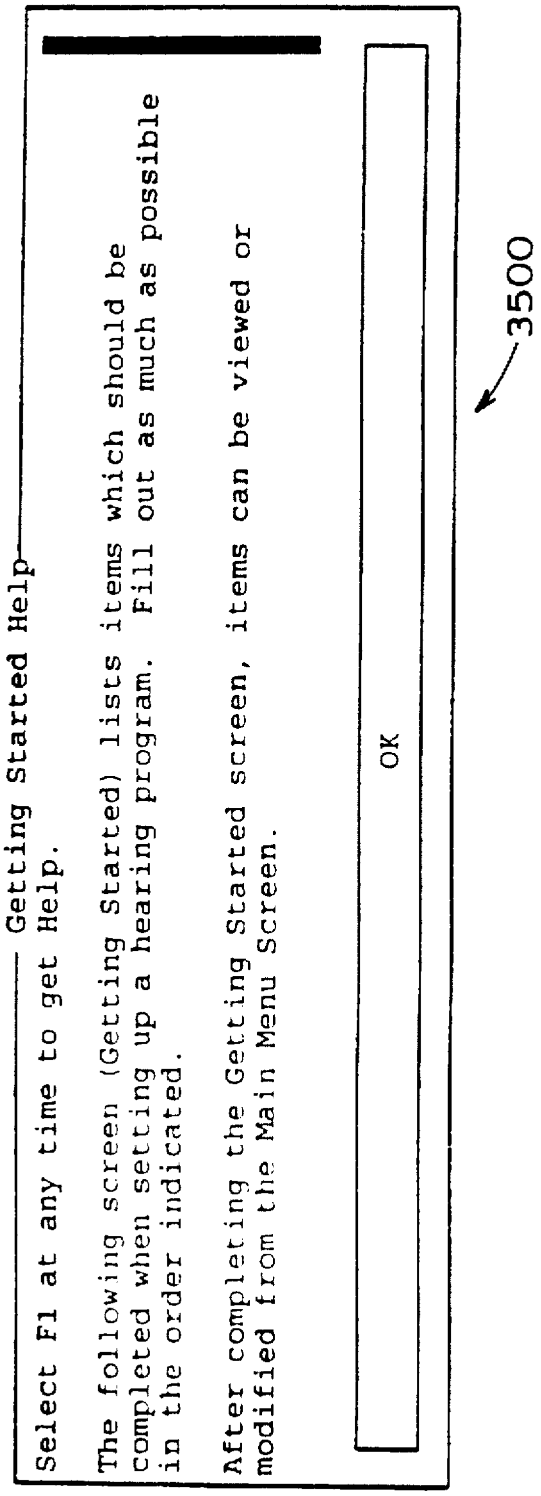
FIG. 35 is a representation of a screen display which is accessed from the screen displays of FIG. 3 during development of a workplace hearing protection program.

Instead of selecting the respirator program 120 by the selection of the button 302 shown in FIG. 3, the user may select the hearing program 122 by the selection of a button 304 on the screen display 300. If the user selects the hearing program 122, and if the user had indicated a desire for help in getting started by entering a Y in the region 202 of the screen display 200, a screen display 3500 as shown in FIG. 35 is presented to the user. The screen display 3500 presents introductory information about starting the development of a workplace hearing protection program. As shown in FIG. 35, the screen display 3500 may inform the user that, after completion of the items on the getting started screen display, any items contained in the workplace hearing protection program may be viewed or modified from a Main Menu screen display of the hearing program 122. This Main Menu screen display will be described hereinafter.

Figure 36:
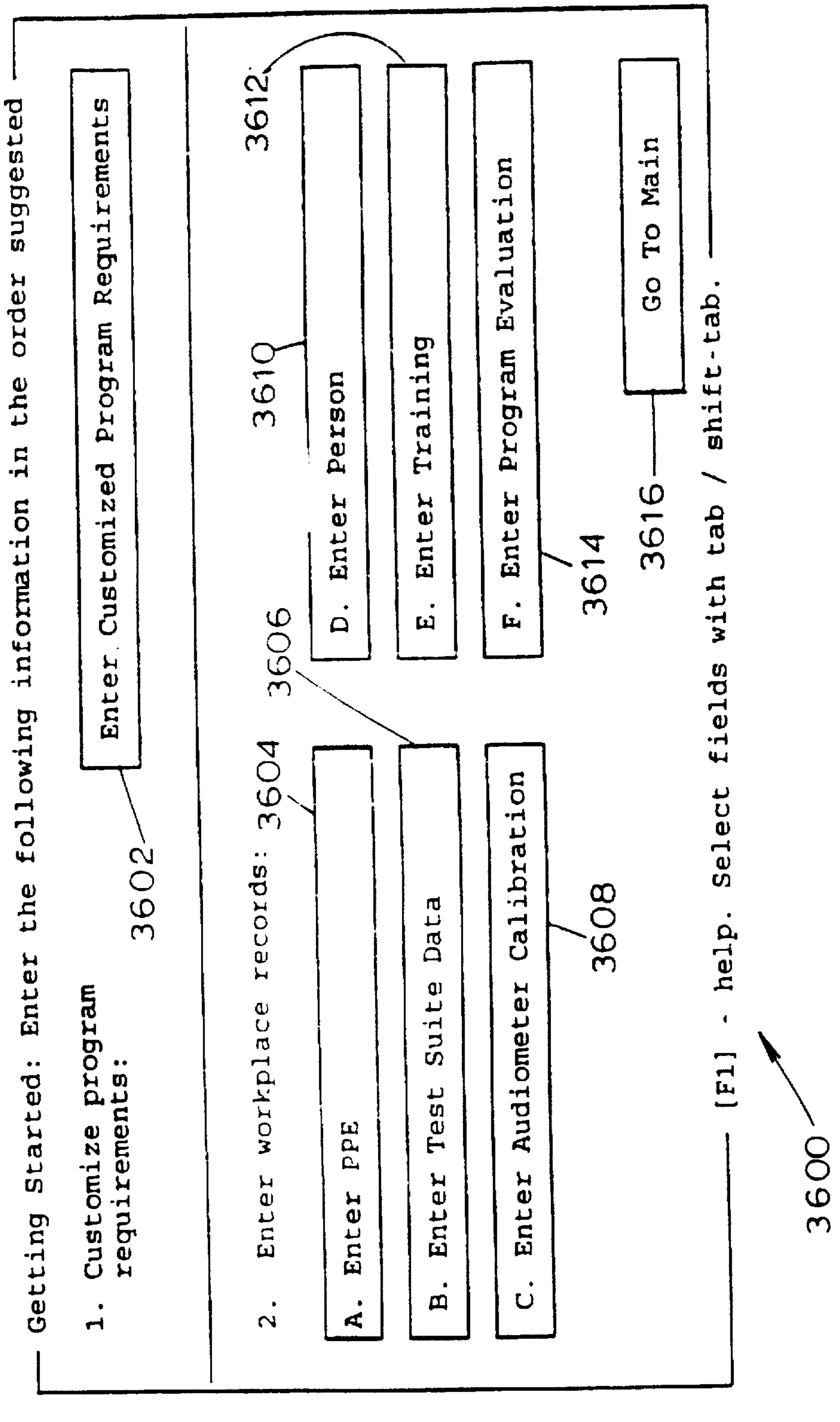
FIG. 36 is a representation of a screen display which is accessed from the screen display of FIG. 35.

When the user indicates on the screen display 3500 that it is OK to proceed with the development of a workplace hearing protection program, the hearing program 122 causes a screen display 3600 as shown in FIG. 36 to be presented to the user. The screen display 3600 includes a plurality of buttons 3602–3616 which are selectable by the user. Selection of the button 3616 returns the user to the main menu of the hearing program 122.

Selection of the button 3602 allows the user to customize the program requirements of the workplace hearing protection program to be developed, and selection of the buttons 3604–3614 permit the user to create workplace records concerning the workplace hearing protection program. Of the buttons 3604–3614, selection of the button 3604 permits the user to enter into these workplace records information concerning the personal protective equipment (PPE); in this case, hearing protectors) which might be used in the workplace hearing protection program. Selection of the button 3606 permits the user to enter into these workplace records both an identification of those areas (i.e., test suites) within a workplace in which employees are to be checked for hearing and whether the test suites met an ambient noise level standard. Selection of the button 3608 permits the user to enter into these workplace records information concerning calibration of audiometers which are used to test the hearing of employees. Selection of the button 3610 allows the user to enter into these workplace records information concerning employees. Selection of the button 3612 permits the user to enter into these workplace records information concerning employee training sessions. Selection of the button 3614 permits the user to enter into these workplace records information concerning evaluation of the workplace hearing protection program.

Figure 37:
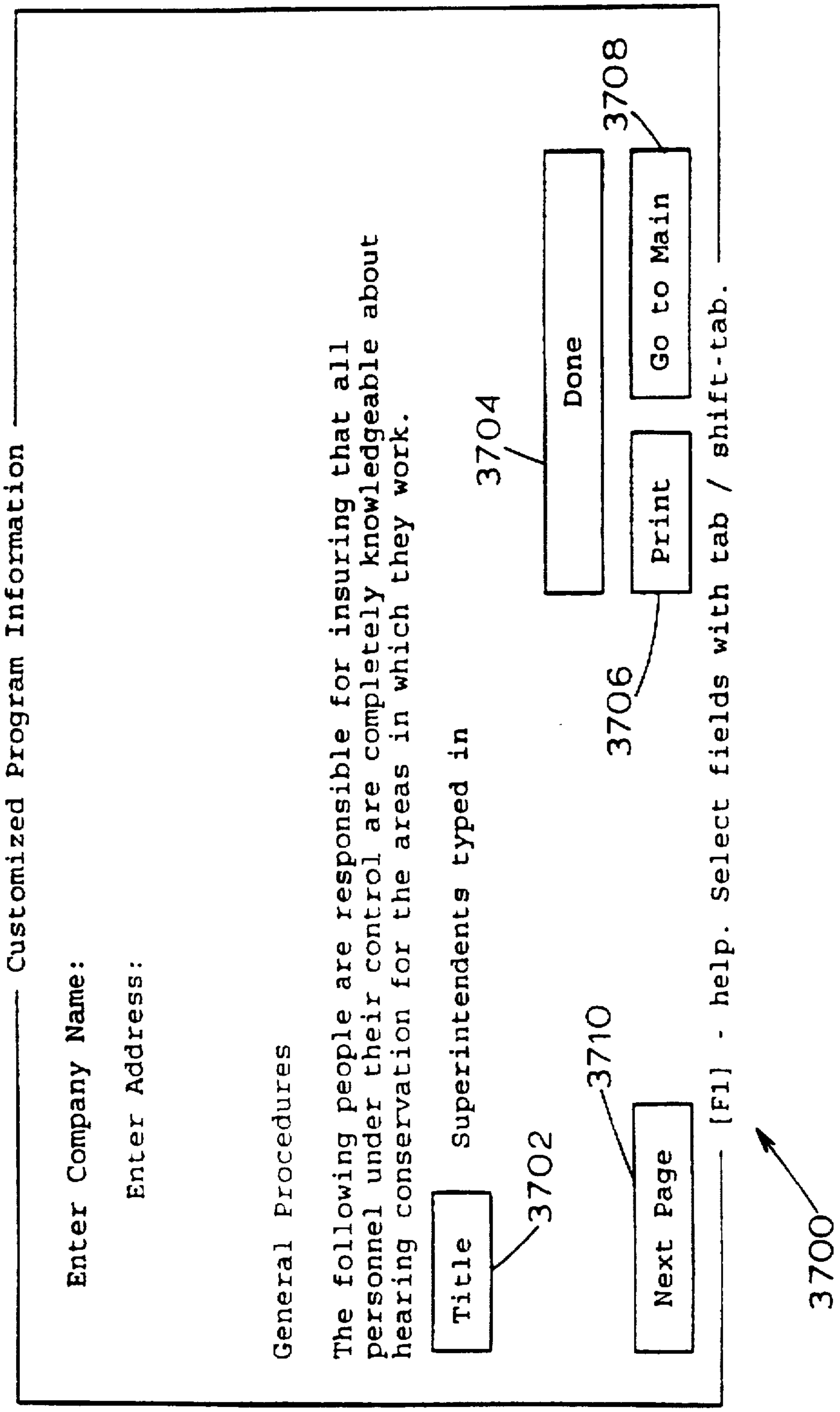
FIG. 37 is a representation of a screen display which is accessed from the screen display of FIG. 36.

Selection of the button 3602 permits the user to customize the requirements of the workplace hearing protection program. When the button 3602 is selected by the user, the user is presented with a screen display 3700 as shown in FIG. 37 to begin the process of customization. Within this screen display 3700, the user may enter the name and address of the company (i.e., employer) for which the workplace hearing protection program is being developed. The user may enter, in the region next to a button 3702, the title of the people who are responsible for ensuring that all personnel under their control are completely knowledgeable with the workplace hearing protection program requirements for the areas in which they work. Selection of the button 3702 presents the user with a list of possible titles. The user may select a title from this list or may insert any other title.

Selection of a button 3704 in the screen display 3700 permits the user to indicate that customization of the workplace hearing protection program has been completed (i.e., is done). If the button 3704 is selected, the hearing program 122 returns the user to the screen display 3600. Selection of a button 3706 allows the user to print the current screen display 3700, to print a group of screen displays, or to print all of the customization screen displays involved in the customization of the workplace hearing protection program. A button 3708 allows the user to return to the Main Menu of the hearing program 122. A button 3710 allows the user to proceed to the next page for the customization of further program requirements of the workplace hearing protection program.

Figure 38:
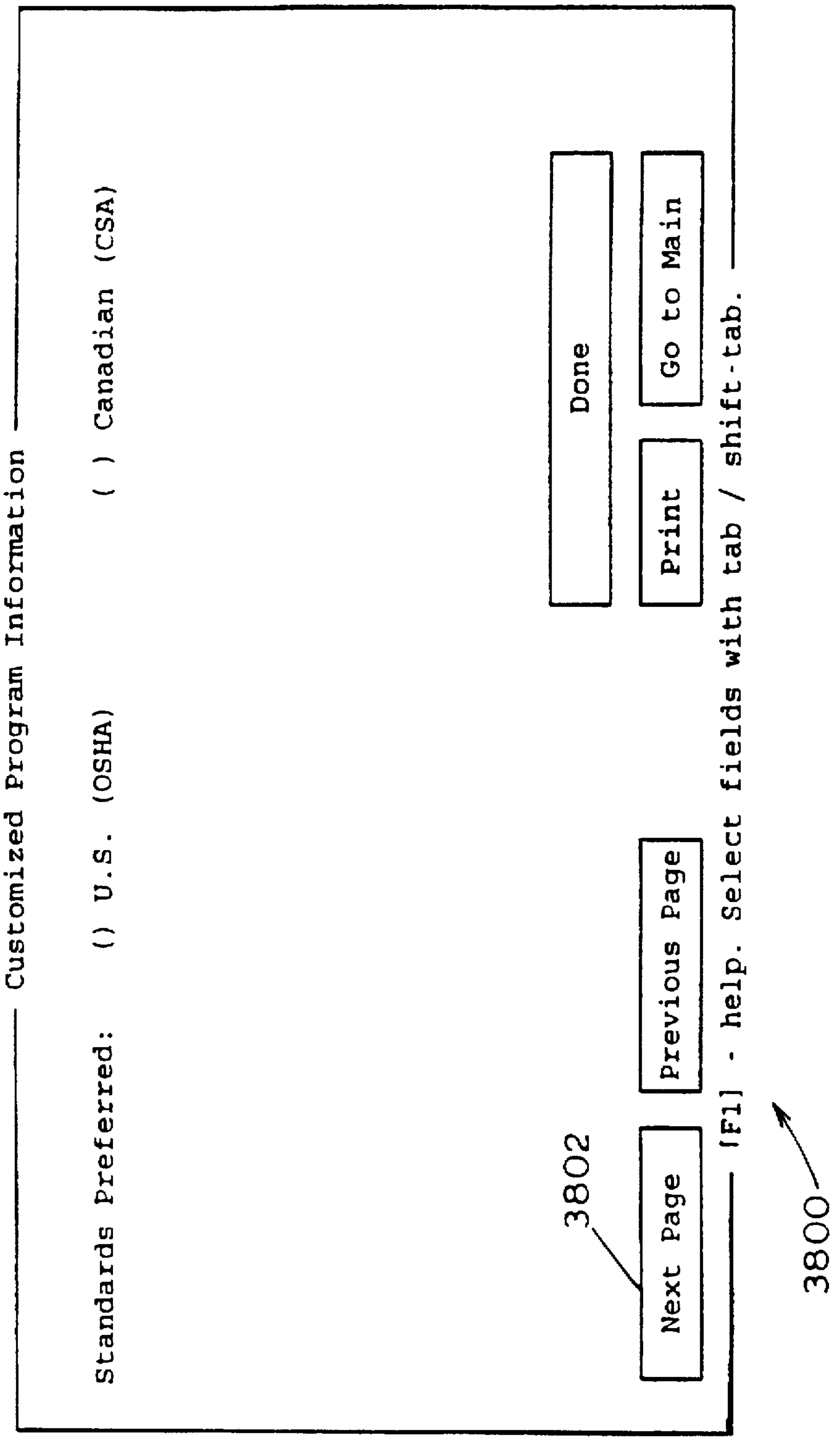
FIG. 38 is a representation of a screen display which is accessed from the screen display of FIG. 37.

After the appropriate information is entered into the screen display 3700 by the user, customization may be continued by the user by selection of the button 3710 which causes a screen display 3800 as shown in FIG. 38 to be displayed. This screen display 3800 allows the user to select the country for which the workplace hearing protection program is being developed. Thus, as indicated by the screen display 3800, the hearing program 122 contains the necessary knowledge to help the user in the development of workplace hearing protection programs which will satisfy the governmental regulations and standards of more than one country. In the specific example shown by the screen display 3800 of FIG. 38, the hearing program 122 is configured to permit the development of workplace hearing protection programs to satisfy the governmental regulations and standards of the United States of America and of Canada. Thus, if the U.S. is selected, the hearing program 122 displays knowledge to the user tailored to U.S. requirements; and, if Canada is selected, the hearing program 122 displays knowledge to the user tailored to Canadian standards.

Figure 39:
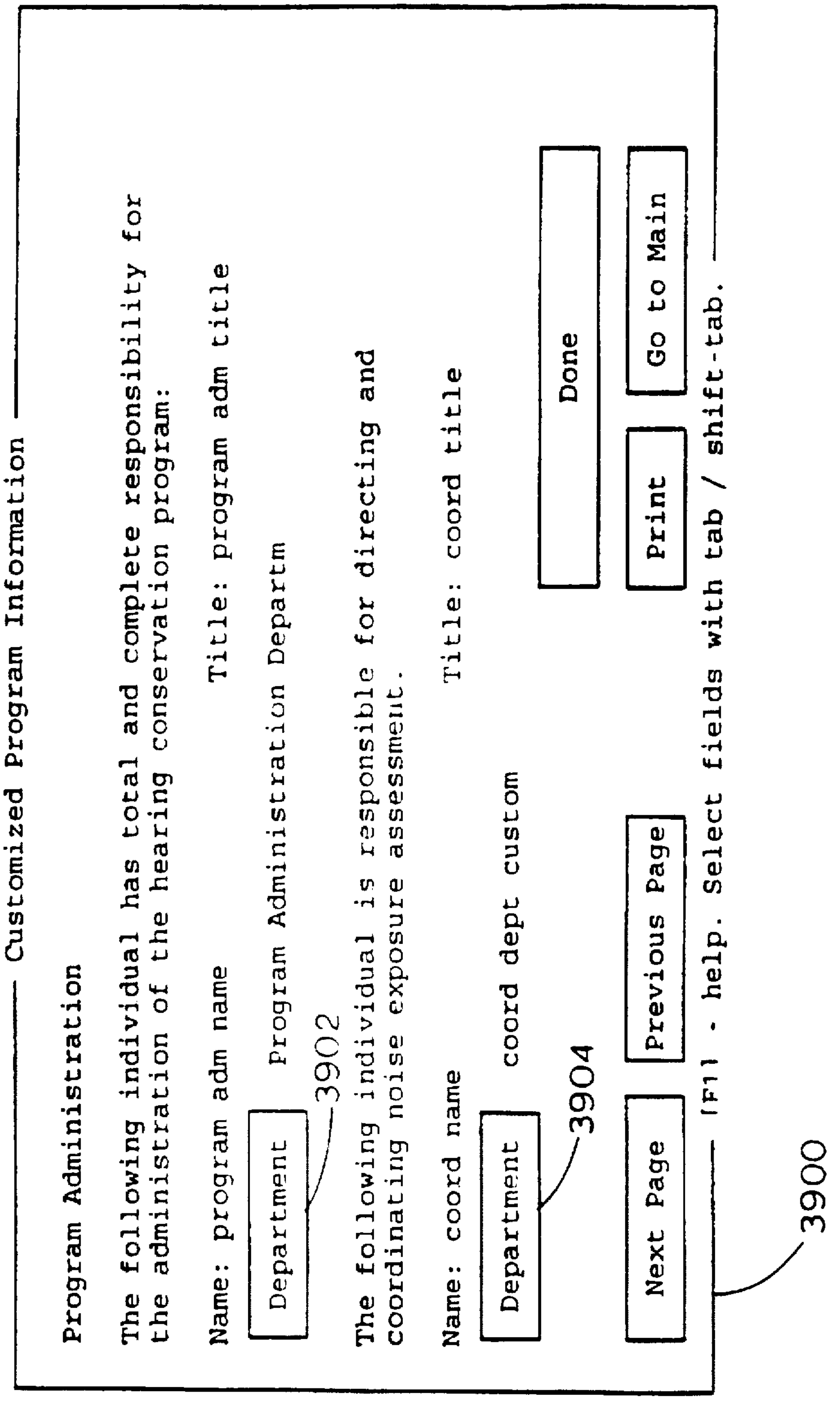
FIG. 39 is a representation of a screen display which is accessed from the screen display of FIG. 38.

After selection of the governmental regulations and standards of the particular country to govern the workplace hearing protection program, a button 3802 of the screen display 3800 may be selected to advance the customization of the workplace hearing protection program to the next screen display. The next screen display is a screen display 3900 as shown in FIG. 39. By use of the screen display 3900, the user may enter the name and title of the program administrator and the program administration department. A button 3902, when selected by the user, causes a list of departments to be displayed from which the user may select the name of the program administration department.

Also, with the assistance of the screen display 3900, the user may enter the name and title of the program coordinator and the name of the program coordination department. A button 3904, when selected by the user, causes a list of department names to be displayed from which the user may select the name of the program coordination department.

Although the next screen displays which may be accessed through execution of the hearing program 122 are not specifically shown herein, these next screen displays may include any of the following: (i) a screen display permitting the user to provide the names, titles, and departments of a person who is responsible for evaluating the health of the company employees by way of an audiological and/or otological program and a person who is responsible for directing and coordinating engineering noise controls; (ii) a screen display permitting the user to provide the names, titles, and departments of a person who is responsible for the selection all hearing protectors and a person who is responsible for the issuance of all hearing protectors; (iii) a screen display permitting the user to provide the names, titles, and departments of a person who is responsible for training and fit testing of all hearing protectors and a person who is responsible for the supervision of the use of hearing protectors; (iv) a screen display permitting the user to select the name, title, and department of a person who is responsible for ensuring that appropriate test procedures are used, that audiograms are reviewed, and that audiograms are followed up; (v) a screen display permitting the user to designate the employees and areas for which noise exposure monitoring will be conducted when employees are exposed to noise above a predetermined level; (vi) a screen display permitting the user to designate that feasible engineering or administrative controls shall be used to reduce noise levels to a selected noise level; (vii) a screen display permitting the user to designate a noise level such that audiometric tests will be provided periodically with respect to employees whose exposure exceeds the designated noise level, and to designate whether a baseline audiogram is to be performed prior to any noise exposure or within a predetermined amount of time after the employee's first exposure to noise; (viii) a screen display permitting the user to designate when a baseline audiogram is to be conducted if a mobile testing service is used; (ix) a screen display permitting the user to designate the noise level above which employees must wear hearing protectors; (x) a screen display permitting the user to designate whether the corrected NRR (noise reduction rating) should be divided by 2 in order to obtain a more accurate view of real world noise attenuation; (xi) a screen display permitting the user to designate a noise level such that employees who are exposed to noise exceeding the designated level are required to attend training programs; and, (xii) a screen display designating the length of time for which noise exposure measurements shall be kept.

As in the case of the screen displays 3700 and 3800, the screen displays subsequent to the screen displays 3700 and 3800 may have buttons allowing the user to print those items which may be printed by selection of the print button 3706 of the screen display 3700, to terminate customization (indicating that customization is done), to return to the Main Menu of the hearing program 122, to return to the previous page, and to proceed to the next page. It should be apparent that more or fewer screen displays may be provided than those described above. Selection of the done button on any of the screen displays to indicate that the customization process is completed returns the user to the screen display 3600.

After the requirements of the workplace hearing protection program have been customized, the user may continue the development of the workplace hearing protection program by selecting the button 3604 from the screen display 3600. Where the performance of jobs by employees, and where the locations of a workplace, expose the employees to hazardous noise levels, the employees are required to wear hearing protectors. Selection of the button 3604 permits the user to designate hearing protectors by location and by job within the workplace.

Figure 40:
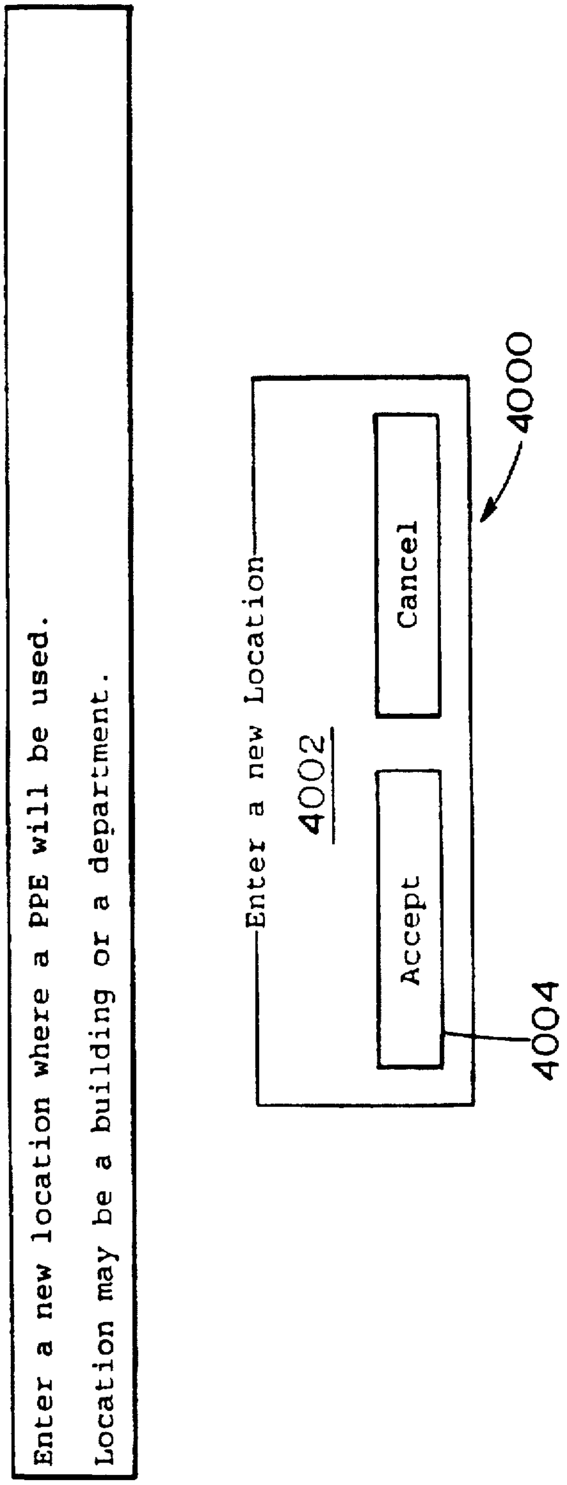
FIG. 40 is a representation of a screen display which is accessed from the screen display of FIG. 36.
Figure 41:
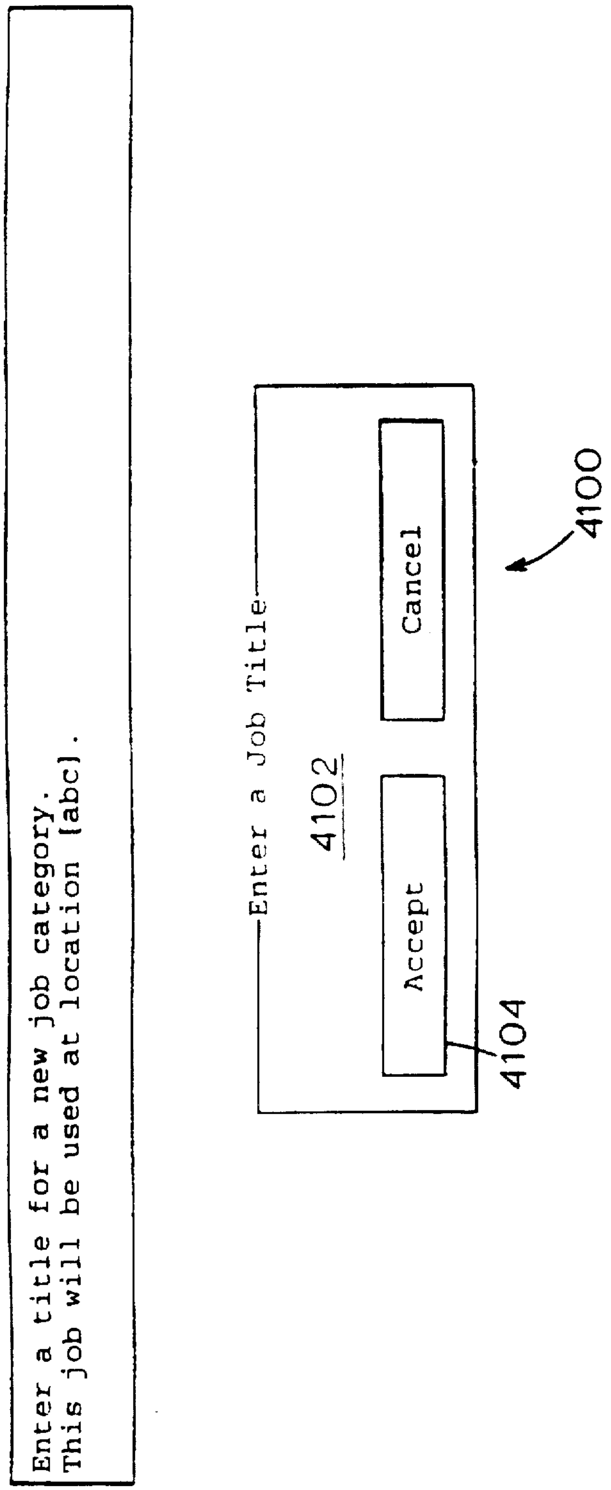
FIG. 41 is a representation of a screen display which is accessed from the screen display of FIG. 40.

Accordingly, the first time that a user selects the button 3604, a screen display 4000 as shown in FIG. 40 is presented to the user. The screen display 4000 allows the user to enter a new location of the workplace where the use of a hearing protector is required. Assuming that the user enters into a region 4002 of the screen display 4000 a new location where the use of a hearing protector is required, and assuming that the user indicates correct entry of the new location by selecting a button 4004, the user is then presented with a screen display 4100 as shown in FIG. 41.

Figure 42:
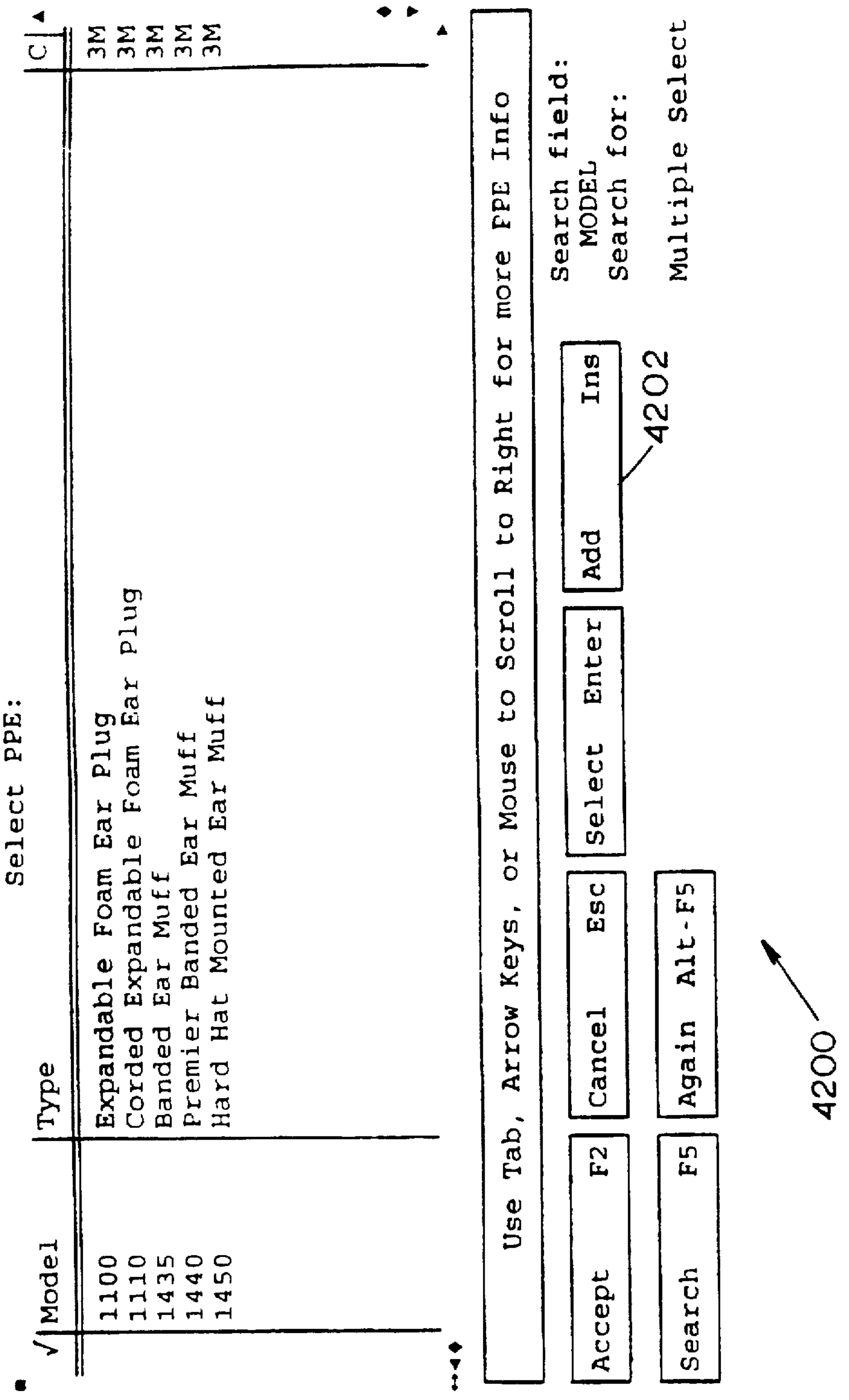
FIG. 42 is a representation of a screen display which is accessed from the screen display of FIG. 41.

The screen display 4100 allows the user to enter a job title of a job for which the use of a hearing protector is required. Assuming that the user enters into a region 4102 of the screen display 4100 a job title of a job for which the use of a hearing protector is required, and assuming that the user indicates correct entry of the job title by selecting a button 4104, the user is then presented with a screen display 4200 as shown in FIG. 42.

The screen display 4200 presents the user with a list of pre-approved hearing protectors. The user may select a hearing protector from the list of pre-approved hearing protectors presented in the screen display 4200 by highlighting the desired hearing protector, by pressing the enter key to select the highlighted hearing protector (which places a check mark in the check column), and by pressing the F2 function key.

This process of specifying a location, a job, and a hearing protector thereby associates a specified location and the specified job with the specified hearing protector. Thus, a hearing protector may be selected for an employee according to the particular job to be performed by the employee and according to the particular location at which the particular job is to be performed by the employee.

Hearing protectors may be added to the list of pre-approved hearing protectors presented by the screen display 4200 by pressing the insert key thereof. Upon pressing the insert key, the user is presented with displays asking the user to enter the manufacturer, the model number, the NRR rating, and the type of hearing protector to be added. The entered data is then added to the list of pre-approved hearing protectors presented in the screen display 4200.

Figure 43:
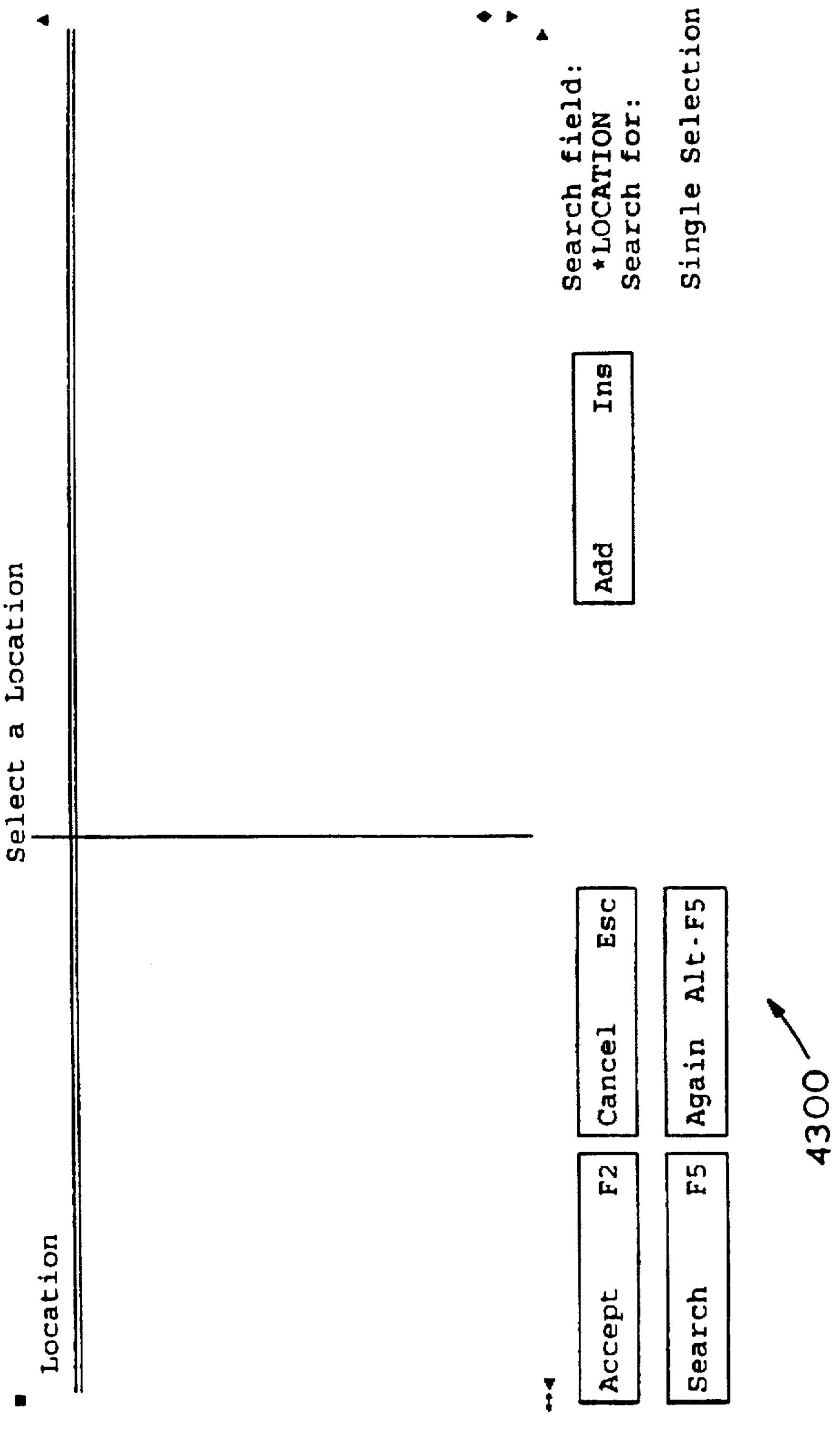
FIG. 43 is a representation of a screen display which is accessed from the screen display of FIG. 36.
Figure 44:
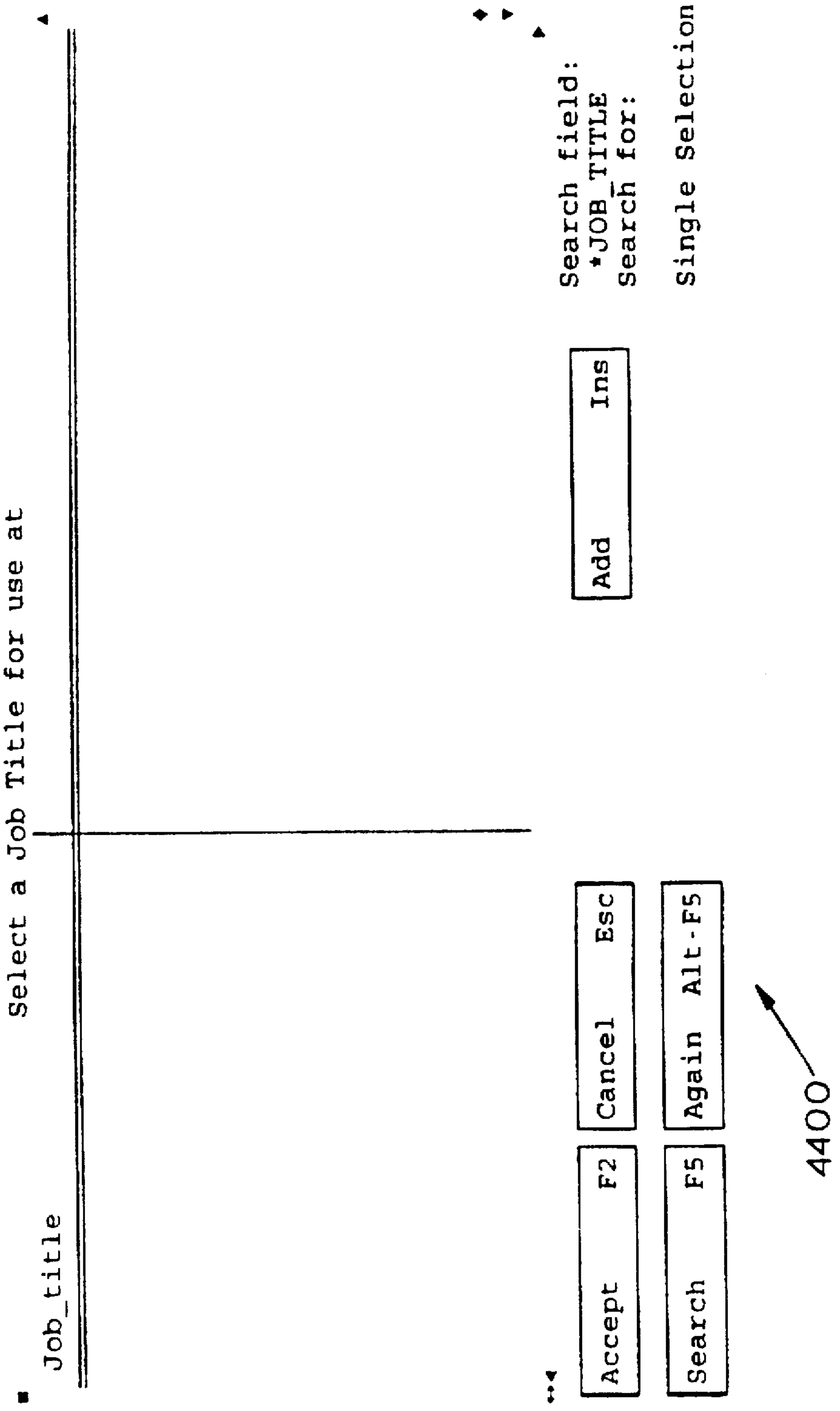
FIG. 44 is a representation of a screen display which is accessed from the screen display of FIG. 43.

Selection of a hearing protector from the screen display 4200 returns the user to the screen display 3600. Selection of the button 3604 on the screen display 3600 after the first time presents the user with a screen display 4300 as shown in FIG. 43. The screen display 4300 lists the locations previously designated for which hearing protectors may be required. A second location can be added by pressing the insert key which presents the screen display 4000 to the user. A second location can then be specified in the region 4002. If this second location is accepted, the user is presented with a screen display 4400 as shown in FIG. 44. The user may accept one of the job titles already listed in the screen display 4400 by highlighting a selected location and by pressing the F2 function key or may add job titles to the screen display 4400 by pressing the insert key. If the insert key is pressed, the screen display 4100 as shown in FIG. 41 is presented to the user.

The user may enter a new job title in the region 4102 and accept the entered job title by selecting the button 4104. If a new job title is accepted from the screen display 4100, the screen display 4200 for that location and job title combination is presented to the user. Checking a hearing protector from the list of hearing protectors presented by the screen display 4200 and accepting the checked hearing protector returns the user to the screen display 3600.

Figure 45:
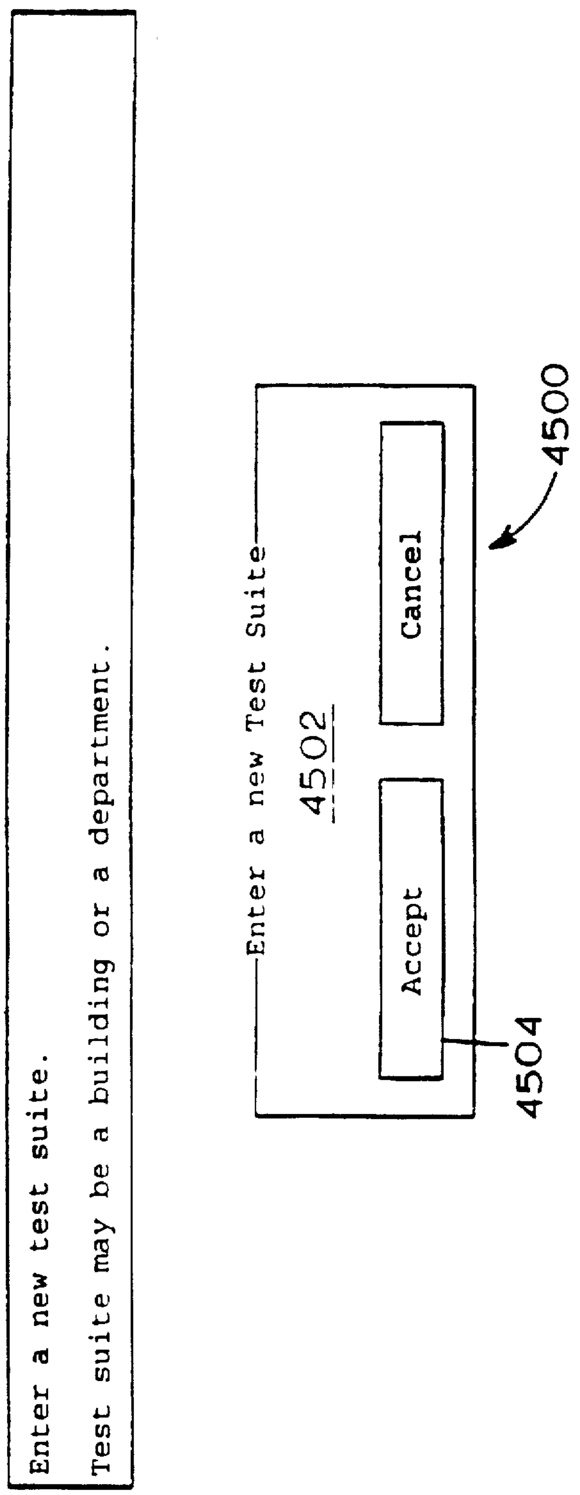
FIG. 45 is a representation of a screen display which is accessed from the screen display of FIG. 36.
Figure 46:
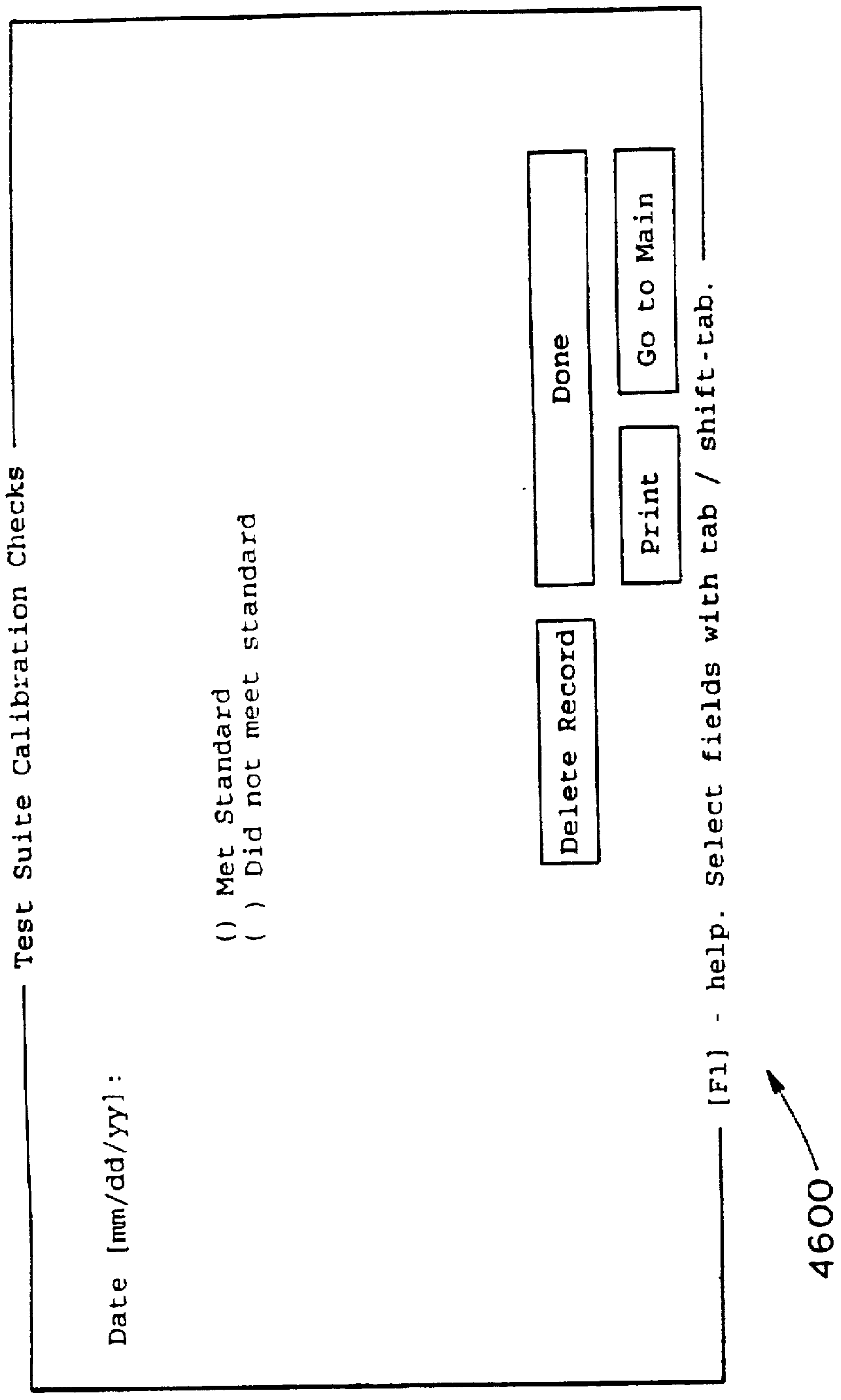
FIG. 46 is a representation of a screen display which is accessed from the screen display of FIG. 45.

Selection of the button 3606 of the screen display 3600 presents the user with a screen display 4500 as shown in FIG. 45. In the screen display 4500, the user may designate, in a region 4502, a new test suite, i.e., a sound proof room, where the hearing of employees is to be, or has been, tested. If the entered test suite is accepted by selecting a button 4504, a screen display 4600 as shown in FIG. 46 is presented to the user. The user may indicate on the screen display 4600 the date upon which a calibration check of the designated test suite was made and whether or not the calibration check met or did not meet a predetermined standard. Upon completion of the information requested by the screen display 4600 and upon selecting a done button indicating that the user is done with the screen display 4600, the user is returned to the screen display 3600.

Upon selection of the button 3608, the user is presented with a screen display similar to the screen display 4200 in which the user is requested to accept one of a number of listed audiometers. Upon selection of one of the listed audiometers, the user is presented with a screen display similar to the screen display 4600, but on which the user is requested to indicate whether the audiometer calibration check was of a biological nature or was exhaustive. When that record is complete (i.e., done), the user is returned to the screen display 3600.

Figure 47:
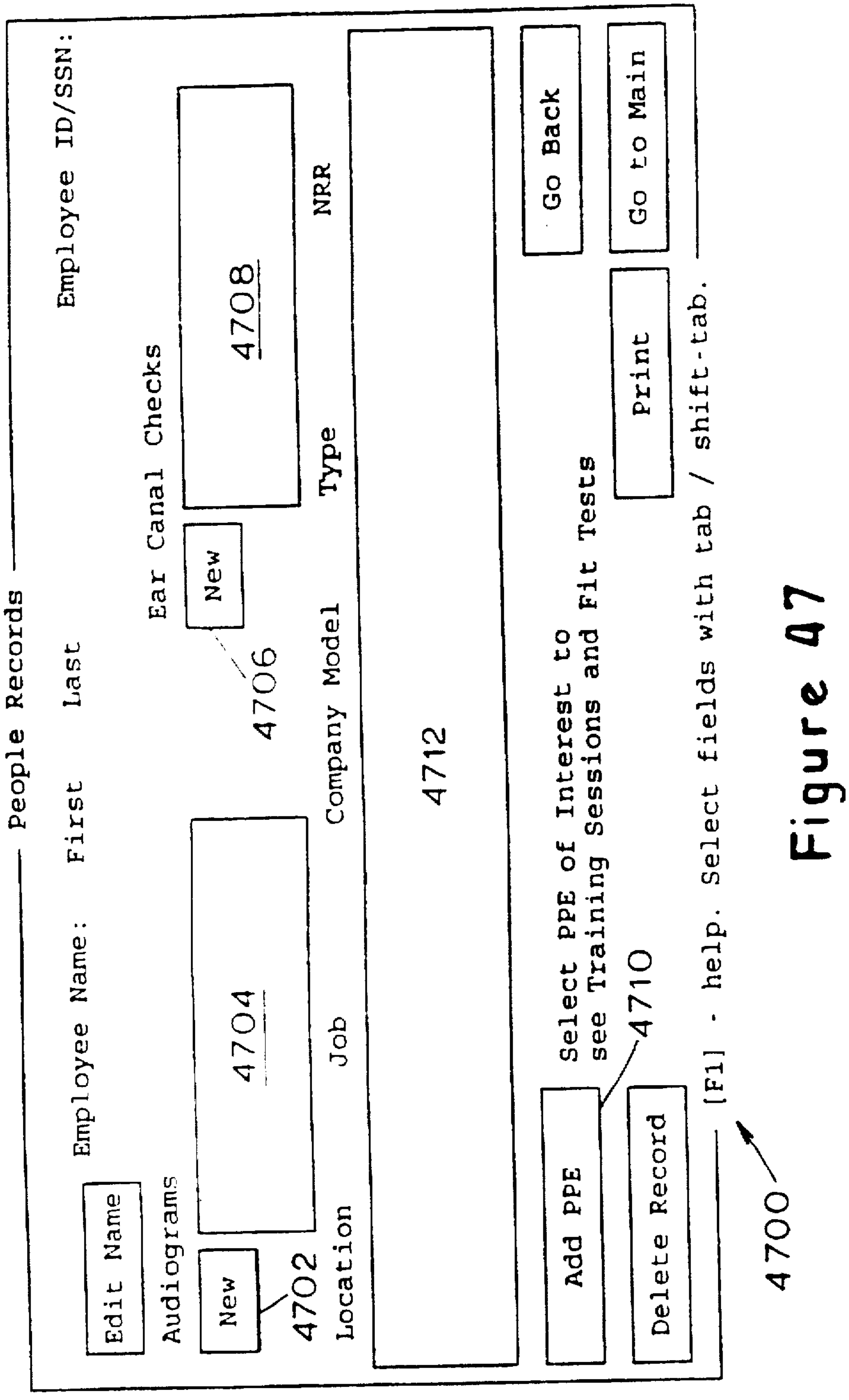
FIG. 47 is a representation of a screen display which is accessed from the screen display of FIG. 36.

Selection of the button 3610 of the screen display 3600 presents the user with a series of screens (similar to the screen display 1300) requesting the user to insert the last name of an employee, the first name of the employee, and the identification number of the employee. When all requested information is entered and accepted, the user is presented with a screen display 4700 as shown in FIG. 47. The screen display 4700 permits the user to create a record concerning the employee designated by the three prior screen displays. As shown, the screen display 4700 includes the name and employee identification for the designated employee, and allows the name of the employee to be edited.

This record provides a link between each employee and various records concerning that employee. Accordingly, this record permits access to other employee records in a hypertext function. For example, through the screen display 4700, audiograms and ear canal checks concerning an employee may be linked to an individual employee. Also, specific hearing protectors, and the location and the jobs for which they are to be used, may also be linked to an employee. Furthermore, training sessions and exposure assessment results may be linked to an employee. Thus, these different portions of the hearing program 122 are linked by a hypertext function. As discussed elsewhere herein, other portions of the hearing program 122 may be linked as well.

Figure 48:
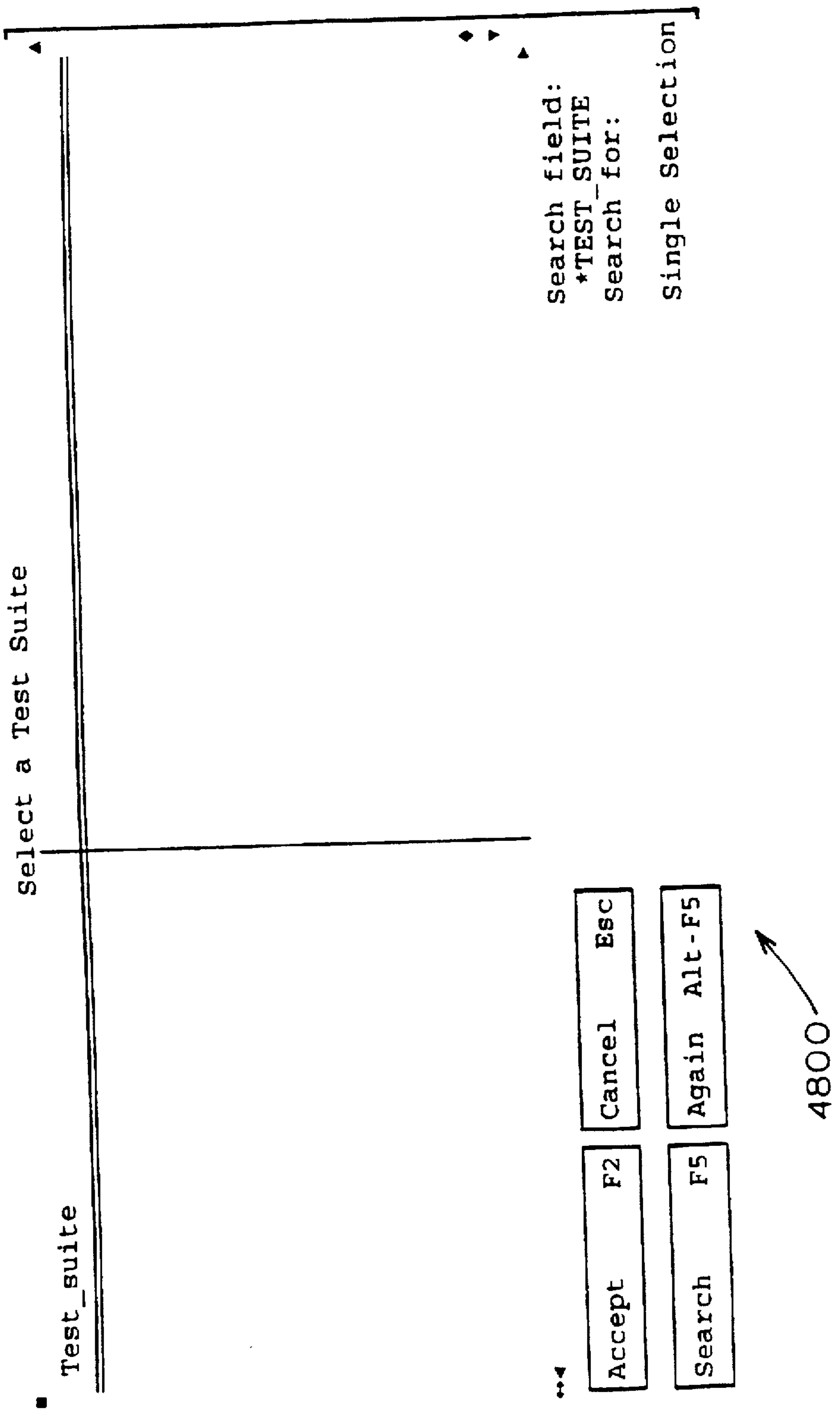
FIG. 48 is a representation of a screen display which is accessed from the screen display of FIG. 47.

During the development of the workplace hearing protection program, audiograms and ear canal checks may be filled out for each employee. Accordingly, by selecting a button 4702 of the screen display 4700, the user is asked to enter the date for an audiogram by filling in an overlay to the screen display 4700. When the user enters and accepts a date, the user is presented with a screen display 4800 as shown in FIG. 48. The user may select a test suite from the test suites listed on the screen display 4800 by highlighting a selected test suite and by pressing the F2 function key.

Figure 49:
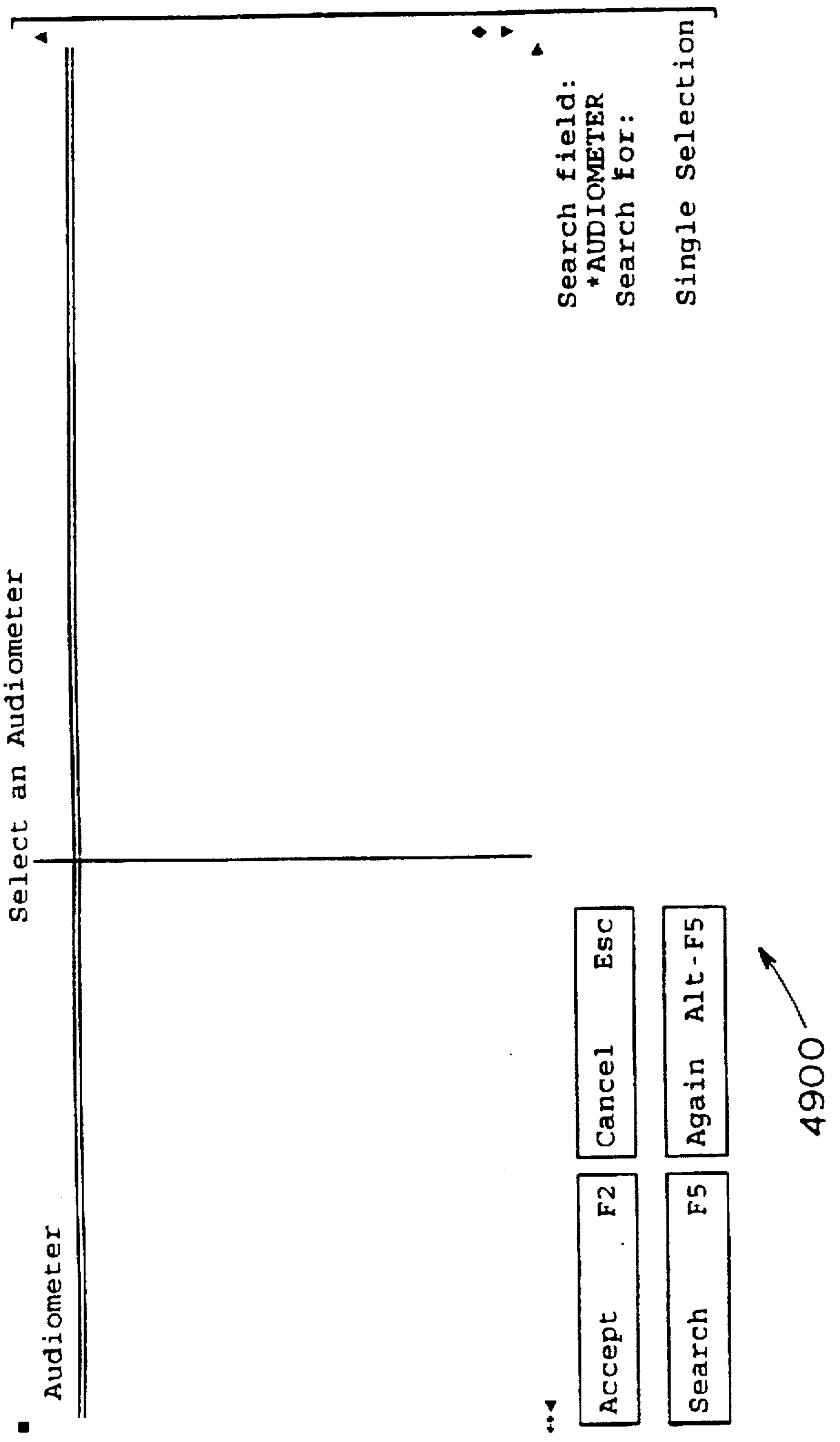
FIG. 49 is a representation of a screen display which is accessed from the screen display of FIG. 48.
Figure 50:
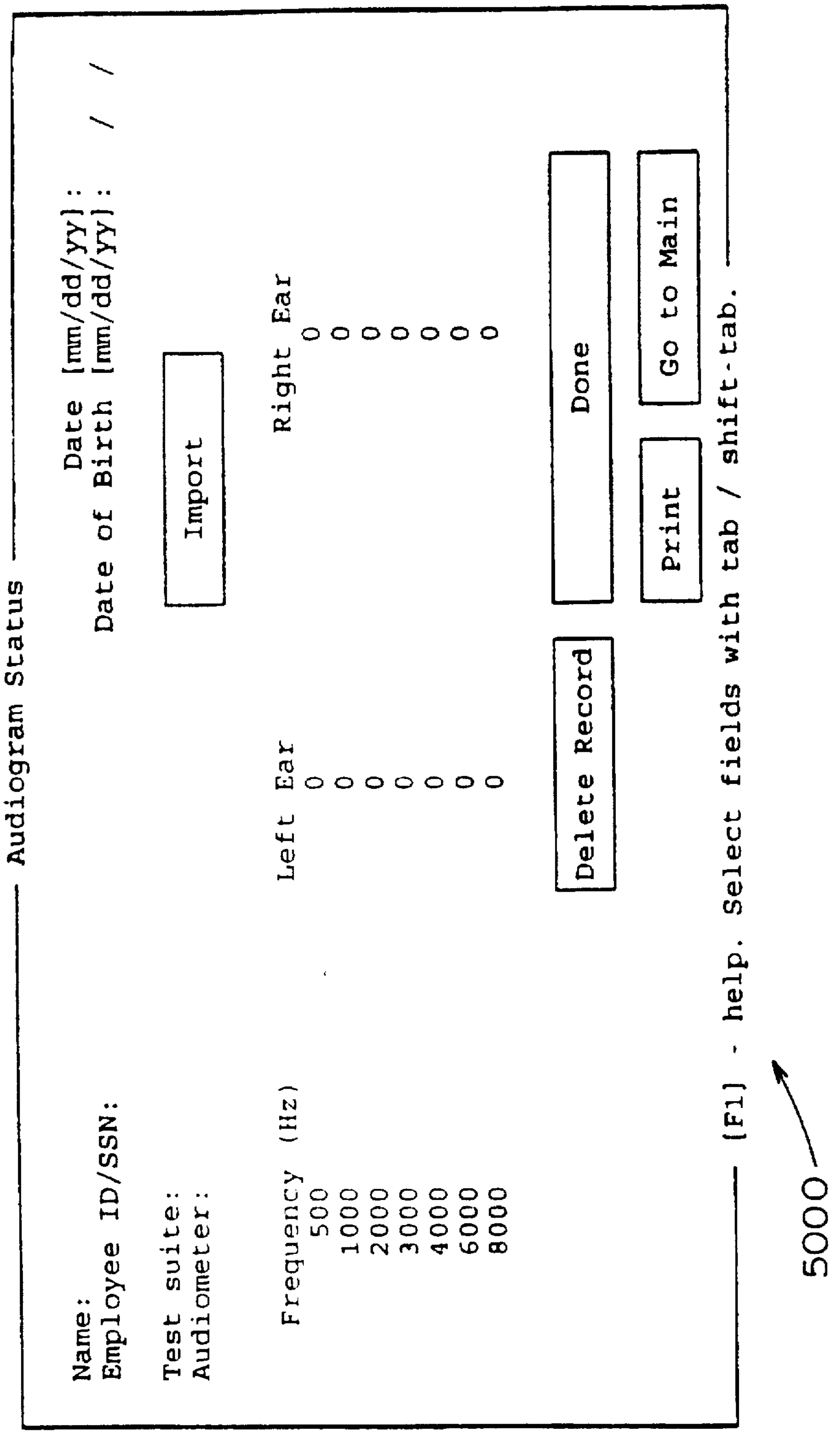
FIG. 50 is a representation of a screen display which is accessed from the screen display of FIG. 49.

Upon pressing the F2 function key, a screen display 4900 as shown in FIG. 49 is presented to the user. The user may select an audiometer from the audiometers listed on the screen display 4900 by highlighting a selected audiometer and by pressing the function key F2. Upon pressing the function key F2, the user is presented with a screen display 5000 as shown in FIG. 50.

The screen display 5000 includes the name of the name, employee's ID number, and the date of birth of the employee from the screen display 4700, the test suite selected from the screen display 4800, the audiometer selected from the screen display 4900, and an indication as to the level at which the employee was able to hear signals at various frequencies by use of the selected audiometer. After completing the audiogram presented by the screen display 5000 (after the audiogram is done), the user is returned to the screen display 4700 and the date of the audiogram appears in a region 4704 of the screen display 4700. The audiogram represented by the screen display 5000 may be accessed by selecting an audiogram from the region 4704 of the screen display 4700.

Figure 51:
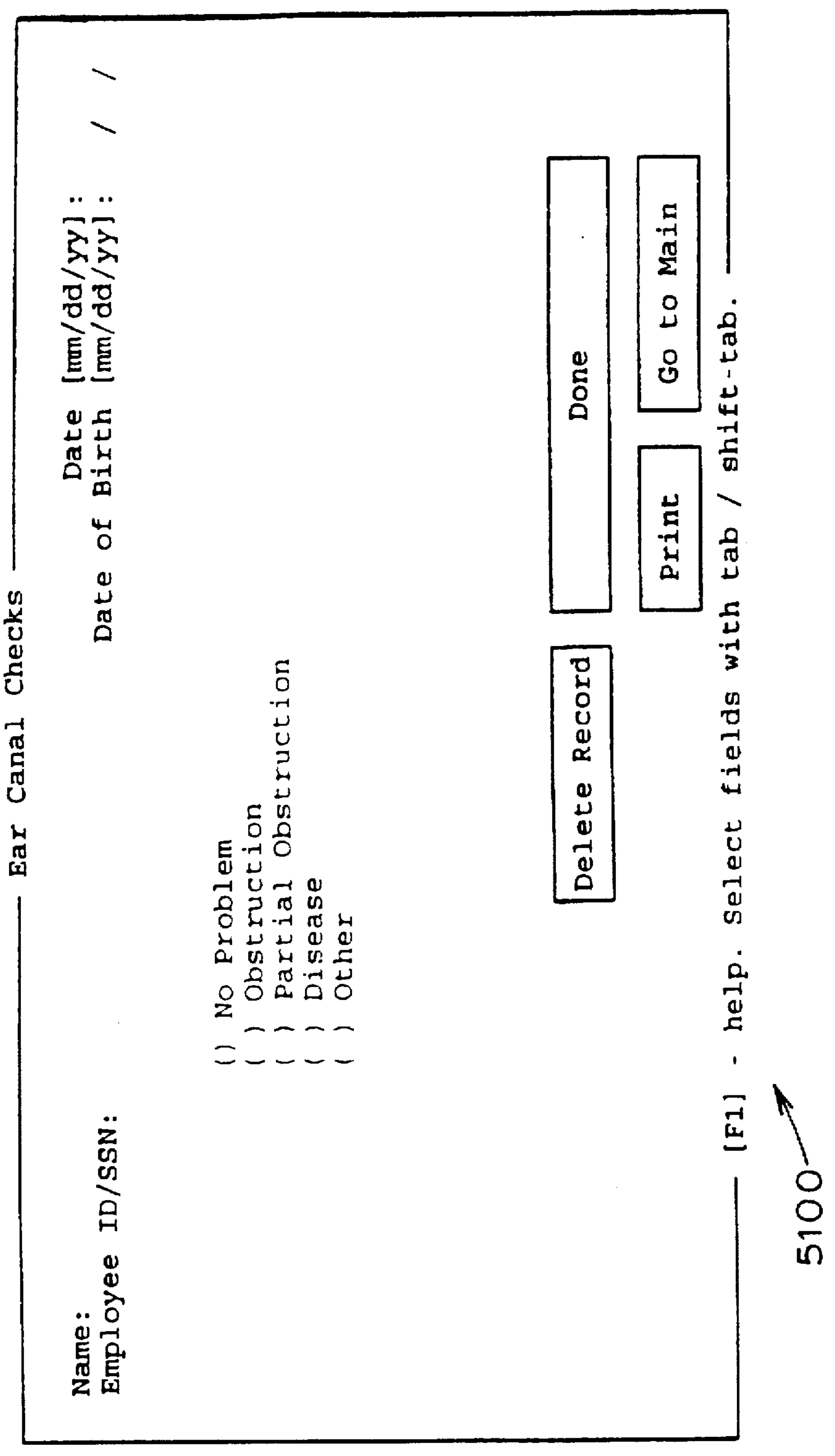
FIG. 51 is a representation of a screen display which is accessed from the screen display of FIG. 47.

By selecting a button 4706 of the screen display 4700, the user is asked to enter the date of an ear canal check which causes a screen display 5100 as shown in FIG. 51 to be presented to the user. The user may indicate the results of an ear canal check on the screen display 5100. For example, the user may indicate that the ear canal check uncovered no problem, an obstruction, a partial obstruction, disease, or any other problem designated by the user. When completion of the screen display 5100 is done, the user is returned to the screen display 4700 and the date of the ear canal check for the designated employee appears in a region 4708 of the screen display 4700.

During the development of the workplace hearing protection program, hearing protectors may be added for the employee indicated by the screen display 4700. Accordingly, by selecting a button 4710, a screen display similar to the screen display 1500 shown in FIG. 15 is presented to the user. This screen display (not shown) contains the information created by use of the button 3604 from the screen display 3600. More specifically, this screen display includes the location where a hearing protector is to be used by the designated employee, the type of job which makes it necessary for the employee to wear a hearing protector, and the hearing protector to be used designated by manufacturer, model number, and type. A hearing protector may be selected from this list by highlighting a selected hearing protector and by pressing the function key F2 which places the selected information in a region 4712 of the screen display 4700.

Each hearing protector to be worn by an employee, therefore, has a location and a job attached to it. The user selects a unique location-job-hearing protector combination which then associates a particular hearing protector for a particular job and location with the identified employee. Multiple hearing protectors may be assigned to a person and presented in the region 4712. A personnel record of an employee may be removed by selecting a delete button on the screen display 4700. Also, the user may also access training sessions and exposure assessment results for the employee by highlighting a hearing protector in the region 4712 and then pressing the enter key.

Figure 52:
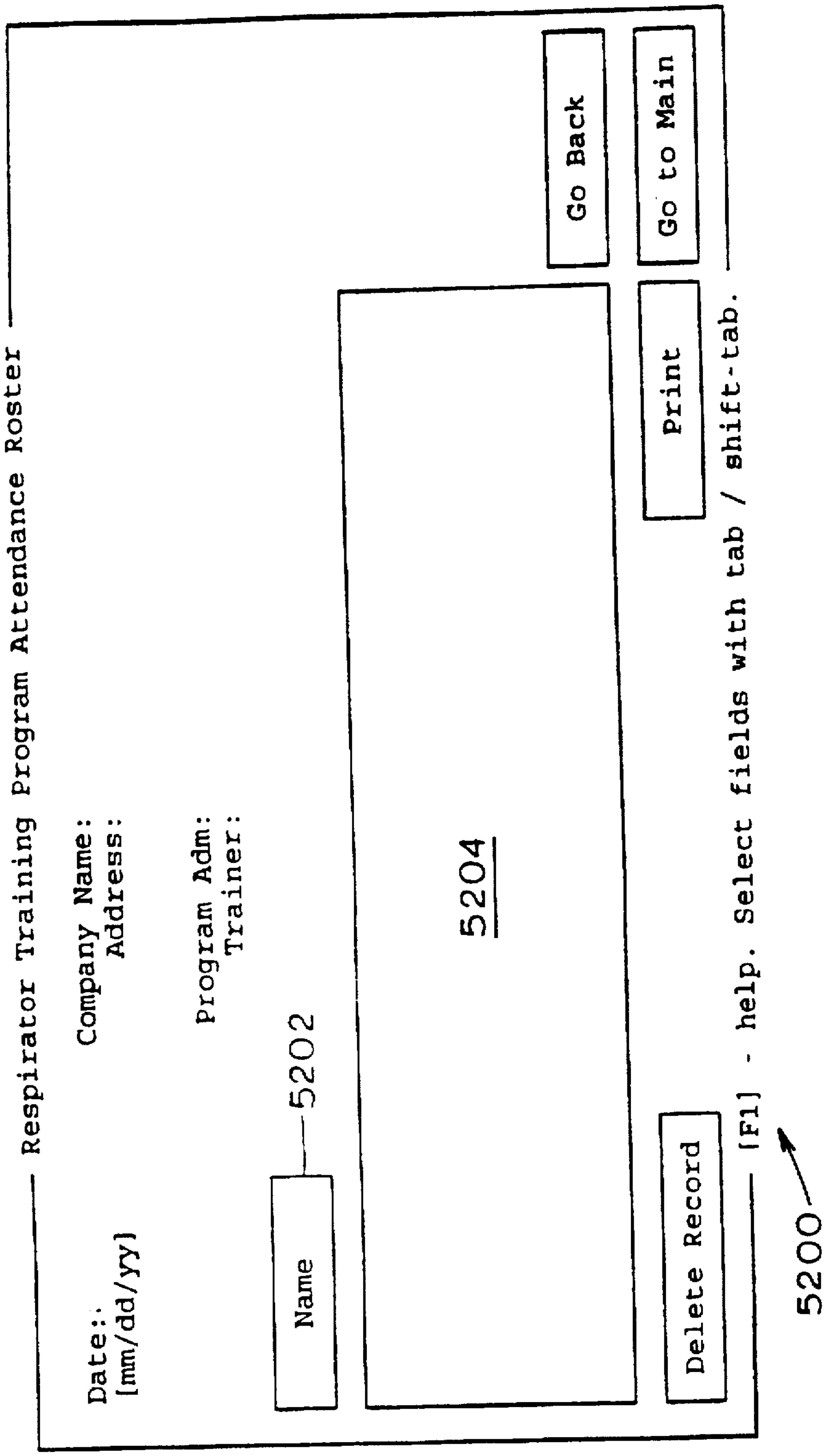
FIG. 52 is a representation of a screen display which is accessed from the screen display of FIG. 36.

If the user selects the button 3612 shown in FIG. 36, the user is first asked to enter and accept a date for a training class. Then, the user is presented with a screen display 5200 as shown in FIG. 52. The screen display 5200 permits the user to enter a roster of those employees who are to attend the training session. The screen display 5200 includes the name and address of the company and the name of the program administrator, which are inserted automatically from the customized requirements. The user must insert the name of the trainer. Selection of a button 5202 presents the user with a list of employee names. If the user selects an employee name from this list, the selected employee name is inserted into a scrollable region 5204 of the screen display 5200.

Selection of the button 3614 of the screen display 3600 presents the user with a screen requiring the user to enter and accept a date for a program evaluation record. Upon entering and accepting the date, the user is presented with a form which may be filled out by the user to create a record of an evaluation of the workplace hearing protection program. This form may include, for example, a questionnaire to be completed by the user in evaluating the requirements, procedures, controls, training sessions, and/or the like of the workplace hearing protection program. In addition, this form may create a summary of the evaluation.

Figure 53:
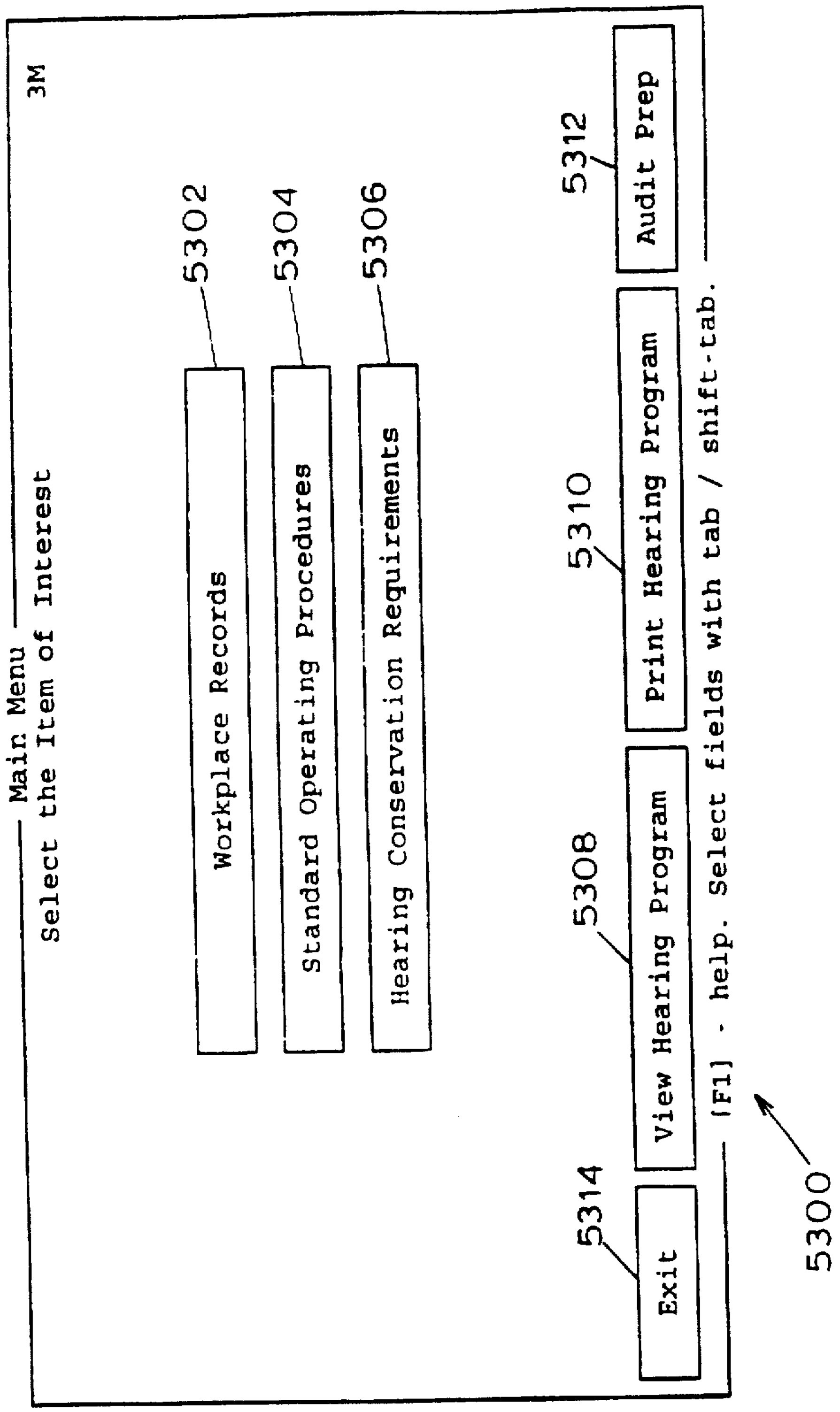
FIG. 53 is a representation of a screen display of a main menu which is accessed from the screen displays of FIGS. 36–39, 46, 47, 50, 51, and 52.
Figure 54:
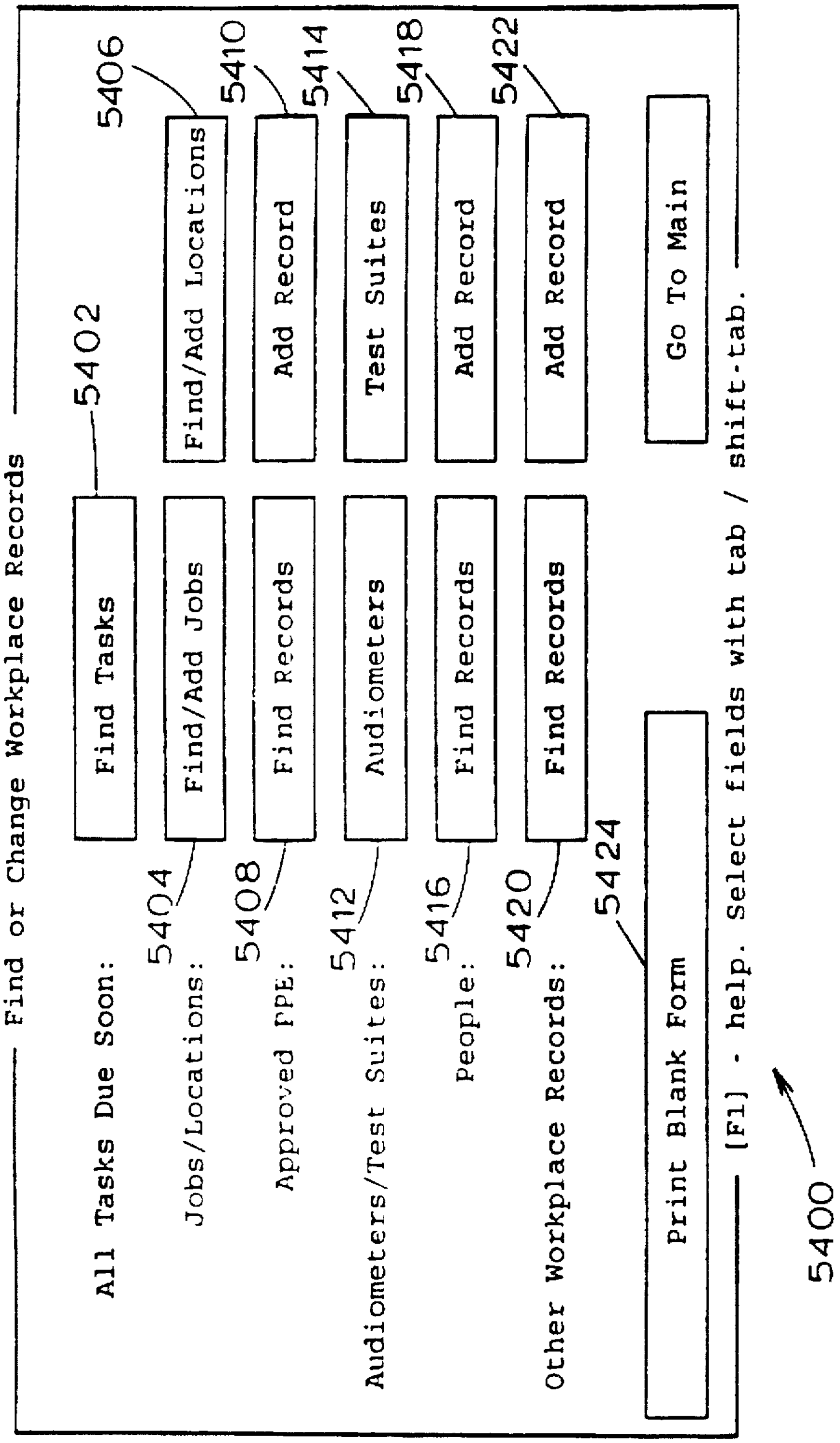
FIG. 54 is a representation of a screen display which is accessed from the screen display of FIG. 53.

After development of the workplace hearing protection program is done, a screen display 5300 as shown in FIG. 53 presents the Main Menu of the hearing program 122 to the user. As indicated above, this Main Menu is also presented to the user from the screen display 300 if the user indicates on the screen display 200 that the user does not wish help in getting started, i.e., the user has already developed the workplace hearing protection program. A user may also maintain the workplace hearing protection program through the Main Menu of the hearing program 122.

The screen display 5300 includes a button 5302 which, when selected, presents the user with a screen display 5400 so that the user may find and/or add workplace records. The screen display 5400 will be discussed below. The screen display 5300 also includes a button 5304 which allows a user to read and/or print the standard operating procedures involved in the workplace hearing protection program, a button 5306 which allows the user to read/customize/print the program requirements of the workplace hearing protection program, a button 5308 which allows the user to view knowledge related to the workplace hearing protection program in a manual format, a button 5310 which allows the user to print the workplace hearing protection program, a button 5312 which provides assistance to a user in preparing for an audit such as may be conducted by a government auditor, and an exit button 5314 which returns the user to the screen display 300.

If the button 5302 of the screen display 5300 shown in FIG. 53 is selected, the screen display 5400 is presented to the user. The screen display 5400 has a button 5402 which allows a user of the data processing system 100 to find those tasks which must be accomplished within a specified amount of time, a button 5404 which allows the user to find/add records related to the jobs for which hearing protectors are required, a button 5406 which allows the user to find/add records related to the locations at which hearing protectors are required, a button 5408 which allows the user to find records related to approved hearing protectors, a button 5410 which allows a user to add records related to approved hearing protectors, a button 5412 which allows the user to find records related to audiometers, a button 5414 which allows the user to find records related to test suites, a button 5416 which allows the user to find records of employees, a button 5418 which allows the user to add records for employees, a button 5420 which allows a user to find other workplace records, a button 5422 which allows a user to add other workplace records, and a button 5424 which allows the user to view and print form templates.

When the button 5402 is selected, a screen display similar to the screen display 2000 as shown in FIG. 20 is presented to the user in order to allow the user to specify a search time period within which tasks may be due. By inserting the number of days into a region similar to the region 2002 of the screen display 2000, the user asks the hearing program 122 to find any tasks due between the current date and the date at the end of the period specified by the number of days entered into the region similar to the region 2002. Any tasks which are due within the specified period of time are displayed to the user. The user can review the tasks which are scheduled to be done within the specified period of time. If no tasks are due within the period of time specified by the user, the hearing program 122 returns the user to the screen display 5400.

Figure 55:
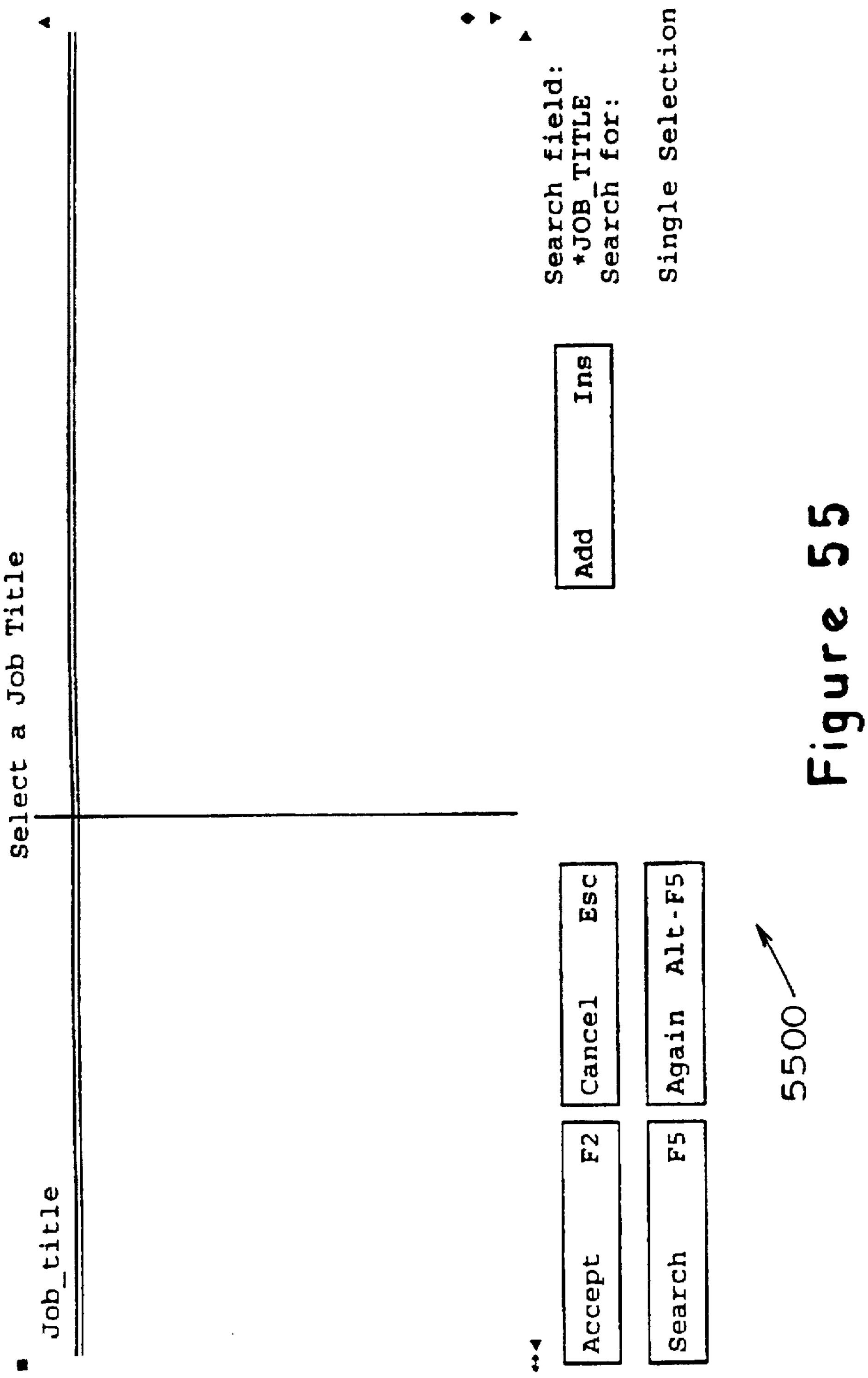
FIG. 55 is a representation of a screen display which is accessed from the screen display of FIG. 54.

When the button 5404 is selected from the screen display 5400, the hearing program 122 allows the user to find and/or add records related to the jobs for which hearing protectors are required in much the same way that records are added during the program development phase (i.e., getting started) described above. Accordingly, the user is presented with a screen display 5500 as shown in FIG. 55 from which the user may find a job by pressing the F5 function key, may add jobs to the jobs listed in the screen display 5500 by pressing the insert key, and/or may accept one of the listed jobs by highlighting a selected job and by pressing the F2 function key.

Figure 56:
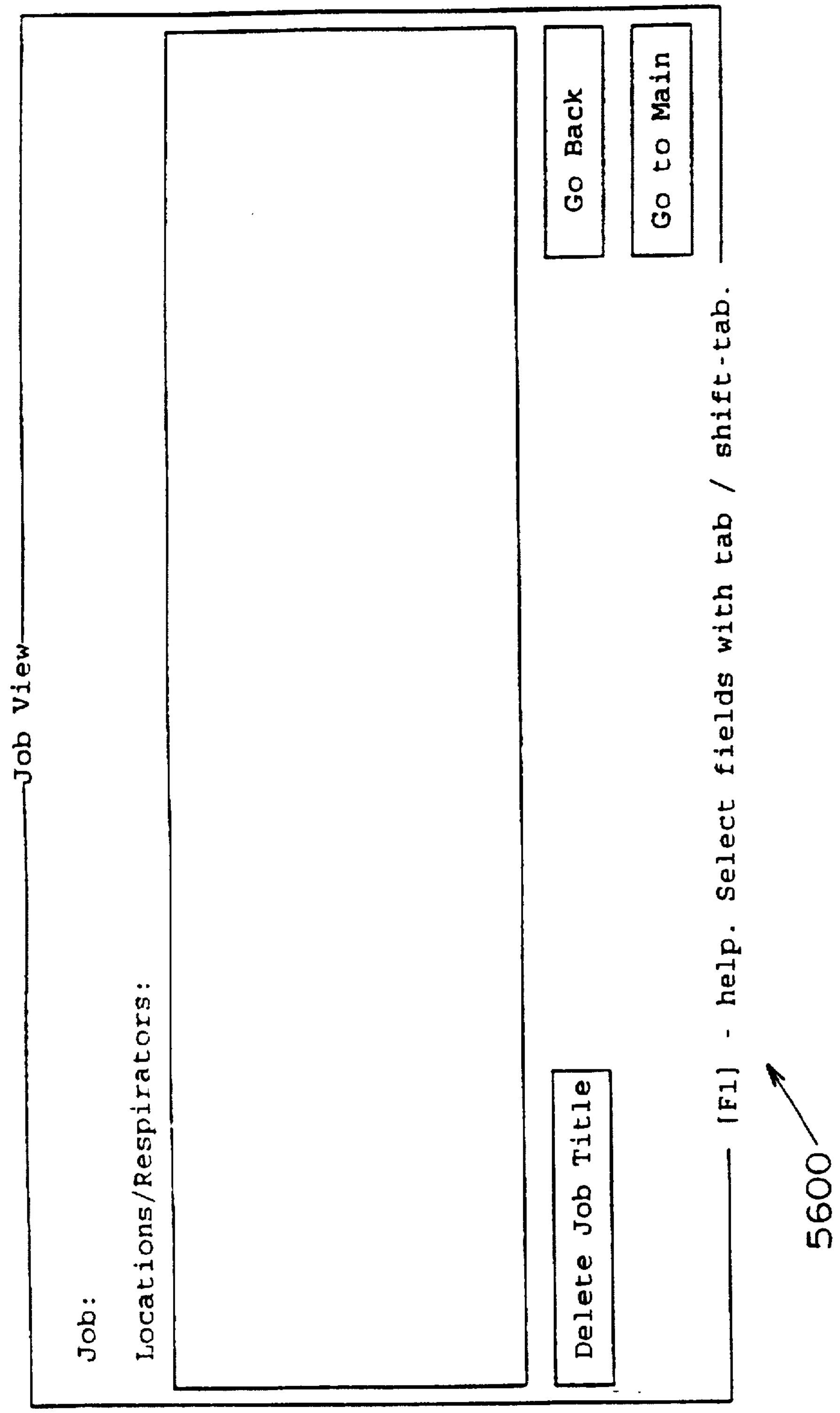
FIG. 56 is a representation of a screen display which is accessed from the screen display of FIG. 55.

Upon pressing the F2 function key, a screen display 5600 as shown in FIG. 56 is presented to the user. This screen display 5600 displays the accepted hearing protectors which are to be used at each location for the job designated therein. A job title may be deleted from the screen display 5600. From the screen display 5600, the user can either return to the Main Menu of the hearing program 122 or return to the screen display 5400.

When the button 5406 is selected from the screen display 5400, the hearing program 122 allows the user to find and/or add records related to the locations at which hearing protectors are required in much the same way that such records are added during the program development phase (i.e., getting started) described above. Accordingly, the user is presented with the screen display 4300 as shown in FIG. 43 from which the user may find a location by pressing the F5 function key, may add locations to the locations listed in the screen display 4300 by pressing the insert key, and/or may accept one of the listed locations by highlighting a selected location and by pressing the F2 function key.

The user may search for, and thereby access, a list of approved hearing protectors by selection of the button 5408 from the screen display 5400. If there are no existing records with respect to approved hearing protectors, the hearing program 122 requests the user to enter a new record and then presents to the user the screen display 4300 from which the user is to select a location for which an approved hearing protector is to be used. After selecting a location, the user is presented with a screen display 4400 in order to select a job title to be associated with the approved hearing protector. After selecting the job title, the user is presented with the screen display 4200 from which the user may select from a list of approved hearing protectors to be associated with the location and job title previously specified.

Figure 57:
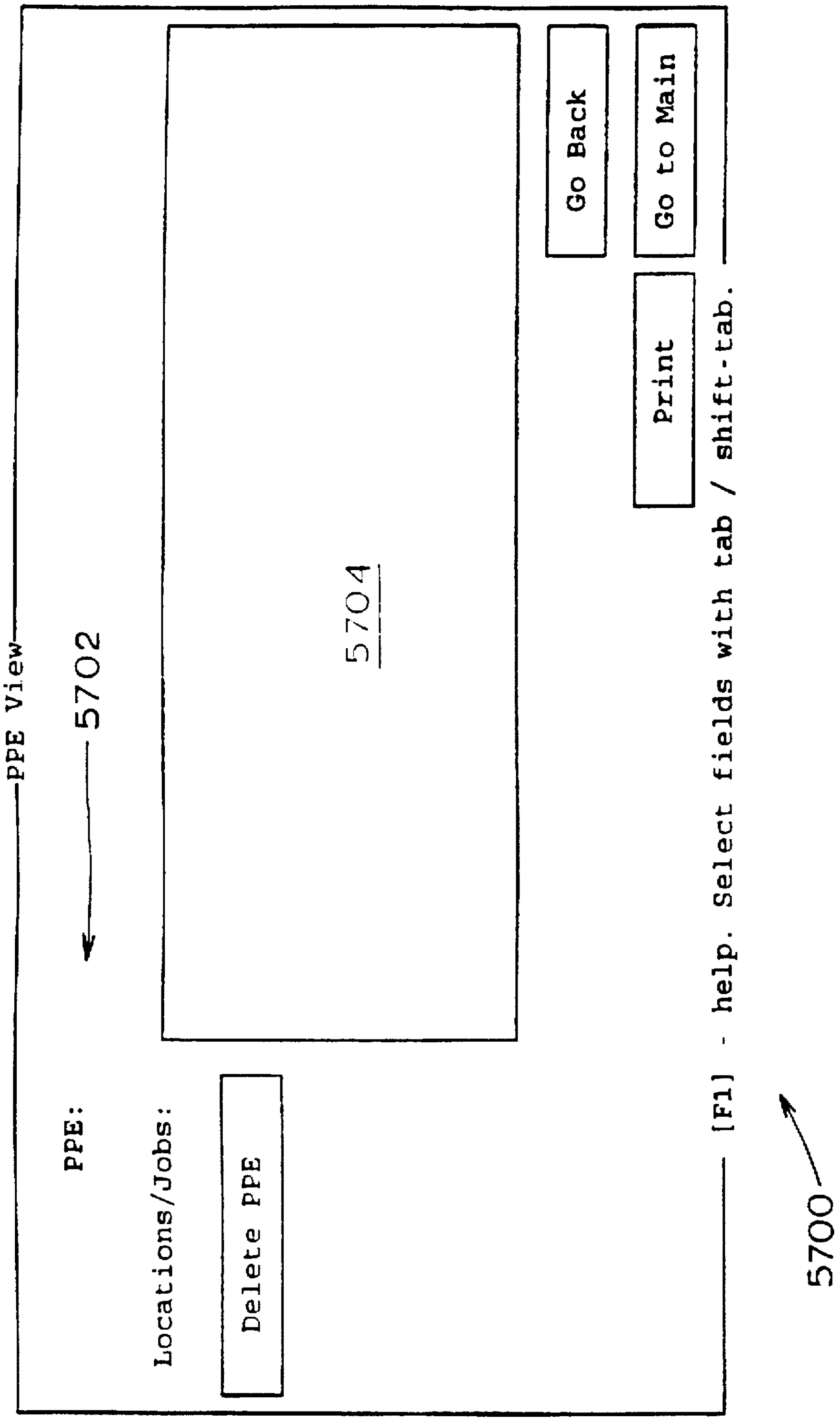
FIG. 57 is a representation of a screen display which is accessed from the screen display of FIG. 54.

Upon selection of an approved hearing protector, the user is presented with a screen display 5700 as shown in FIG. 57. The approved hearing protector appears in a region 5702 of the screen display 5700, and the locations and job titles for which the approved hearing protector is to be used appear in a region 5704 of the screen display 5700. From the screen display 5700, the user may return to the Main Menu of the hearing program 122 or go back to the screen display 5400.

If there are existing records which link approved hearing protectors with job titles and locations, selection of the button 5408 presents a screen display similar to the screen display 4200 to the user. (The screen display accessed from the button 5408 differs from the screen display 4200 in that the screen display accessed from the button has four columns for the name of manufacturer, the model number, the type, and the NRR of the listed hearing protectors). If the user accepts a hearing protector from the list of hearing protectors presented in this screen display, the user is then presented with the screen display 5700.

Selection of the button 5410 presents the user with the screen display 4300. Selection of a location listed in the screen display 4300 presents the user with the screen display 4400. Selection of a job title from the screen display 4400 presents the user with the screen display 4200 from which the user may select a hearing protector. Selection of a hearing protector from the screen display 4200 returns the user to the screen display 5400. Accordingly, approved hearing protectors can be added by location and job title.

Figure 58:
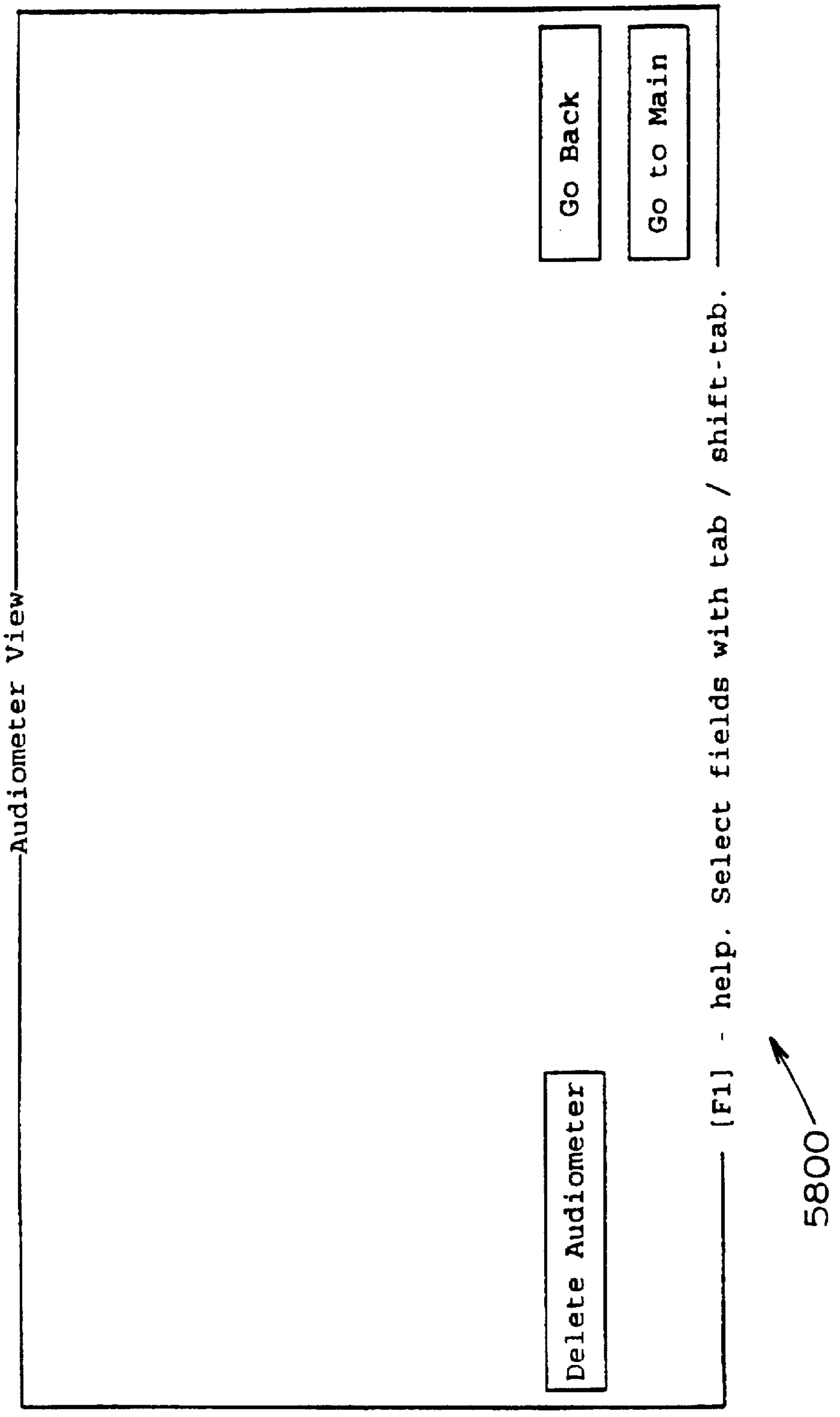
FIG. 58 is a representation of a screen display which is accessed from the screen display of FIG. 54.
Figure 59:
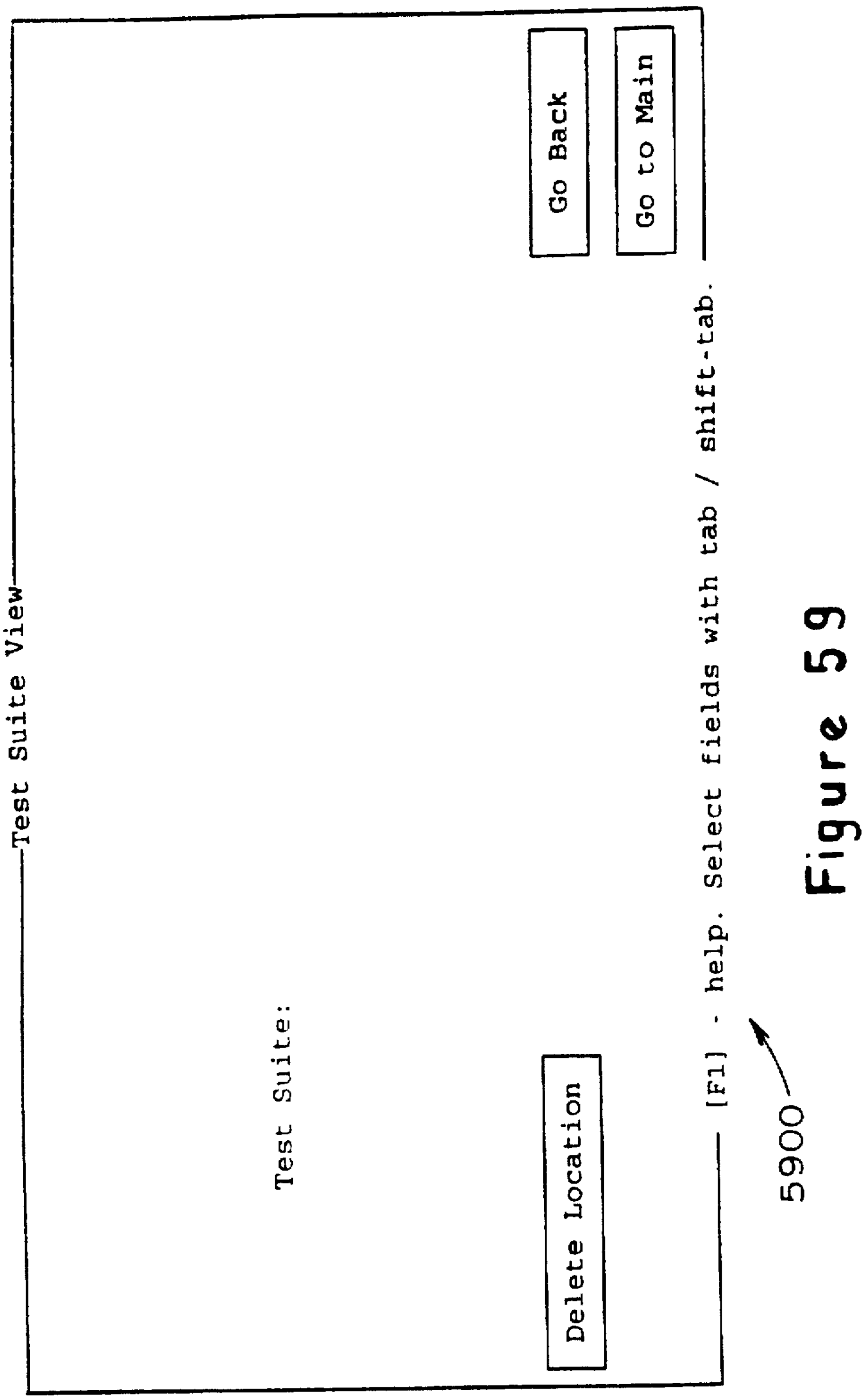
FIG. 59 is a representation of a screen display which is accessed from the screen display of FIG. 54.

Selection of the button 5412 from the screen display 5400 presents the user with the screen display 4900 from which the user may select an audiometer. Selection of an audiometer from the screen display 4900 presents the user with a screen display 5800 as shown in FIG. 58. This screen display lists the audiometers which are used to test the hearing of the employees. As indicated, audiometers are added to this list by use of the screen display 4900 and may be deleted from this list by a delete button on the screen display 5800.

The button 5414 from the screen display 5400 presents the user with the screen display 4800 from which the user may select a test suite. Selection of a test suite from this list presents the user with a screen display 5900 which lists the test suites in which the hearing of employees is to be tested. Test suites may be deleted from this list by a delete button shown on the screen display 5900.

Figure 60:
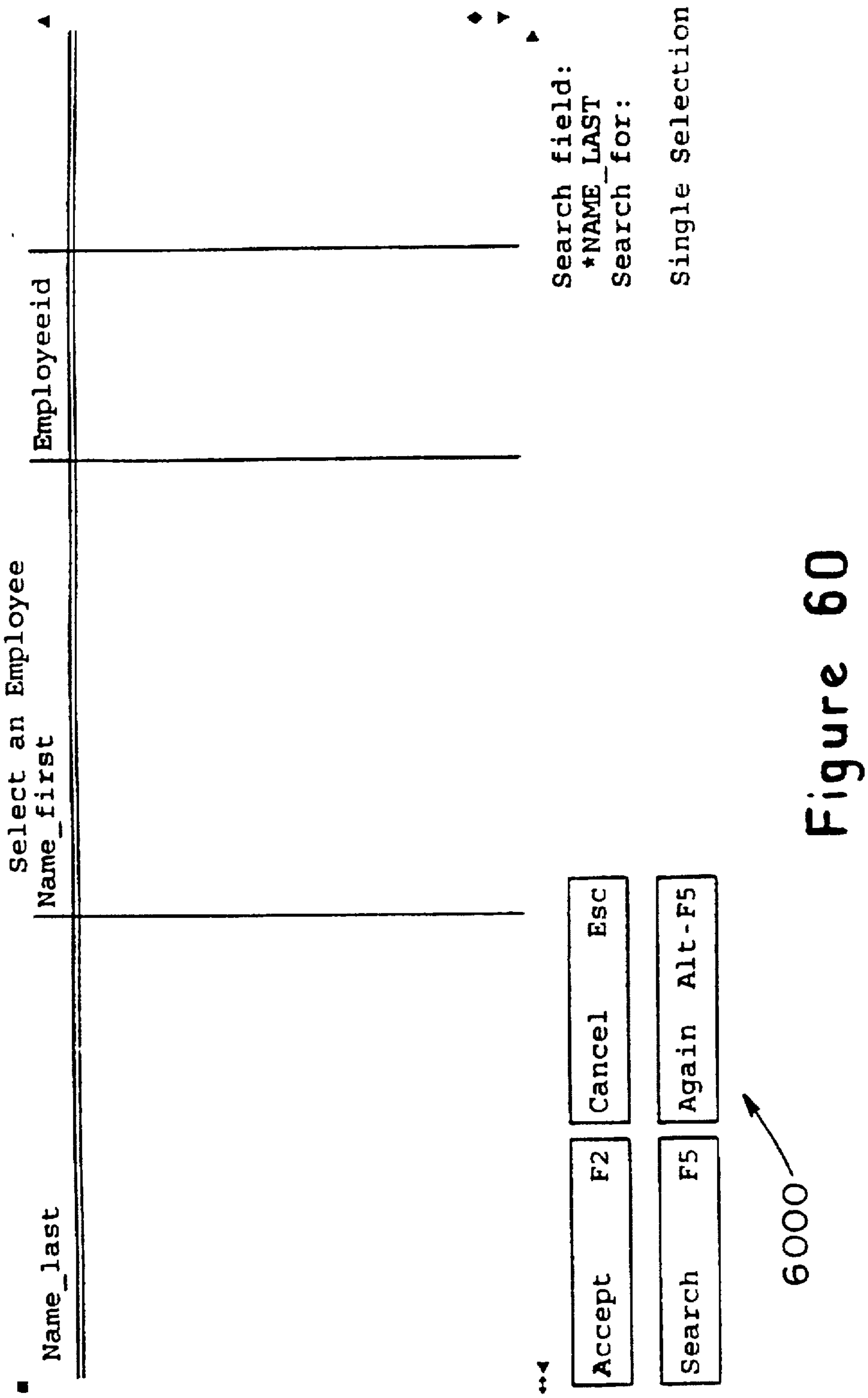
FIG. 60 is a representation of a screen display which is accessed from the screen display of FIG. 54.

Selection of the button 5416 from the screen display 5400 presents the user with a screen display 6000 as shown in FIG. 60. The screen display 6000 presents the user with a list of employees by last name, first name, and employee ID. The user may select an employee from this list or may search for other employees by use of the F5 function key. Selection of an employee from this list presents the user with the screen display 4700 permitting the user to perform all of the functions discussed above in relation to the screen display 4700.

Selection of the button 5418 from the screen display 5400 presents the user with a series of screen displays in which the user is asked to enter and accept the last name of an employee, to enter and accept the first name of the employee, and to enter and accept the employee ID number. Following the entering and accepting of this information, the user is presented with the screen display 4700. Thus, the user may add additional people records to the database of the workplace hearing protection program.

Selection of the button 5420 permits the user to find other workplace records such as those relating to program evaluations, training sessions, audiometer calibrations, test suite data, and the like. Similarly, selection of the button 5422 from the screen display 5500 permits the user to add other workplace records such as those relating to program evaluations, training sessions, audiometer calibrations, test suite data, and the like.

Selection of the button 5424 from the screen display 5400 allows the user to view and print form templates similar to those discussed in connection with the screen display 2700 as shown in FIG. 27. In the case of the hearing program 122, however, the form templates are tailored toward hearing protection as opposed to respiratory protection.

Figure 61:
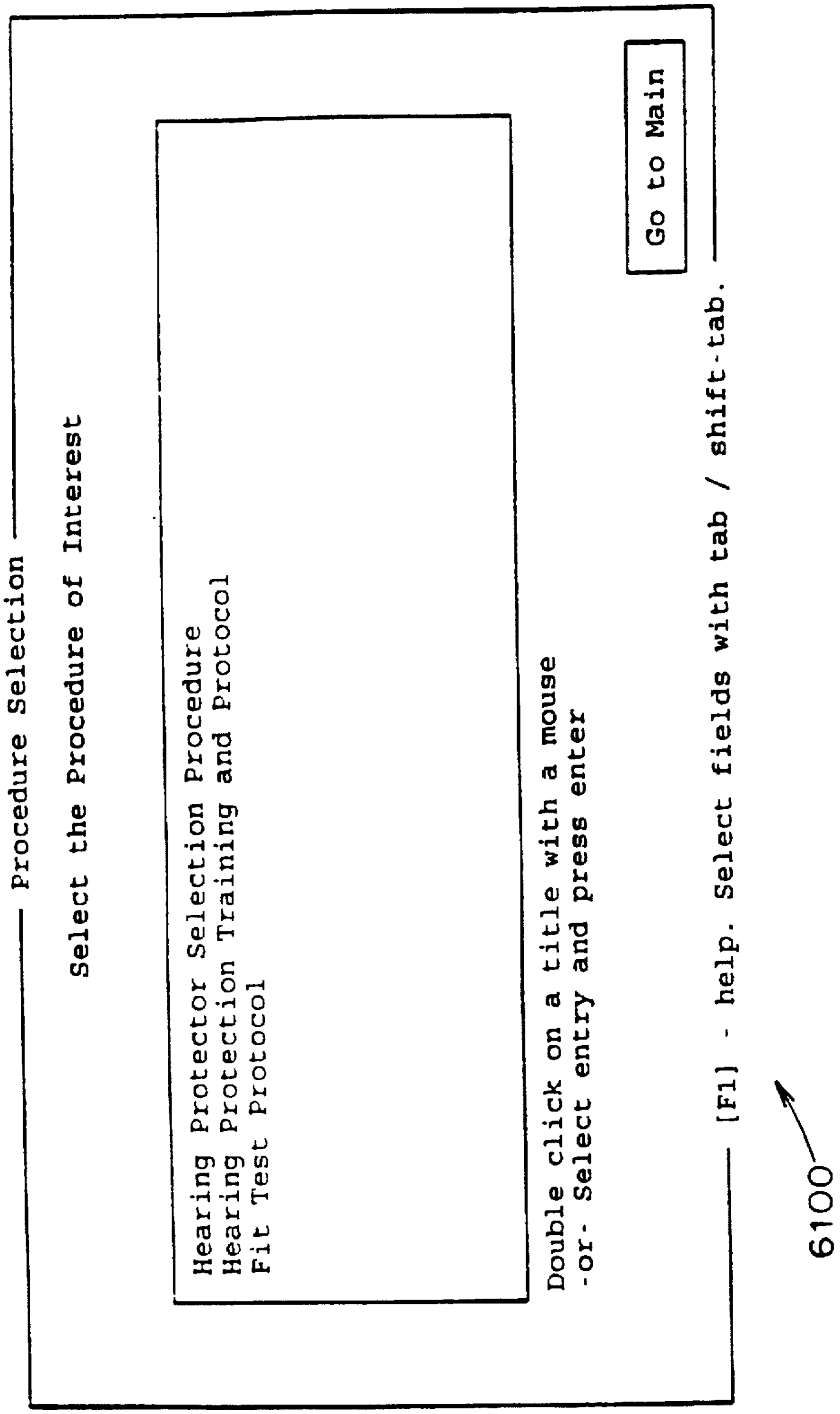
FIG. 61 is a representation of a screen display which is accessed from the screen display of FIG. 53.
Figure 62:
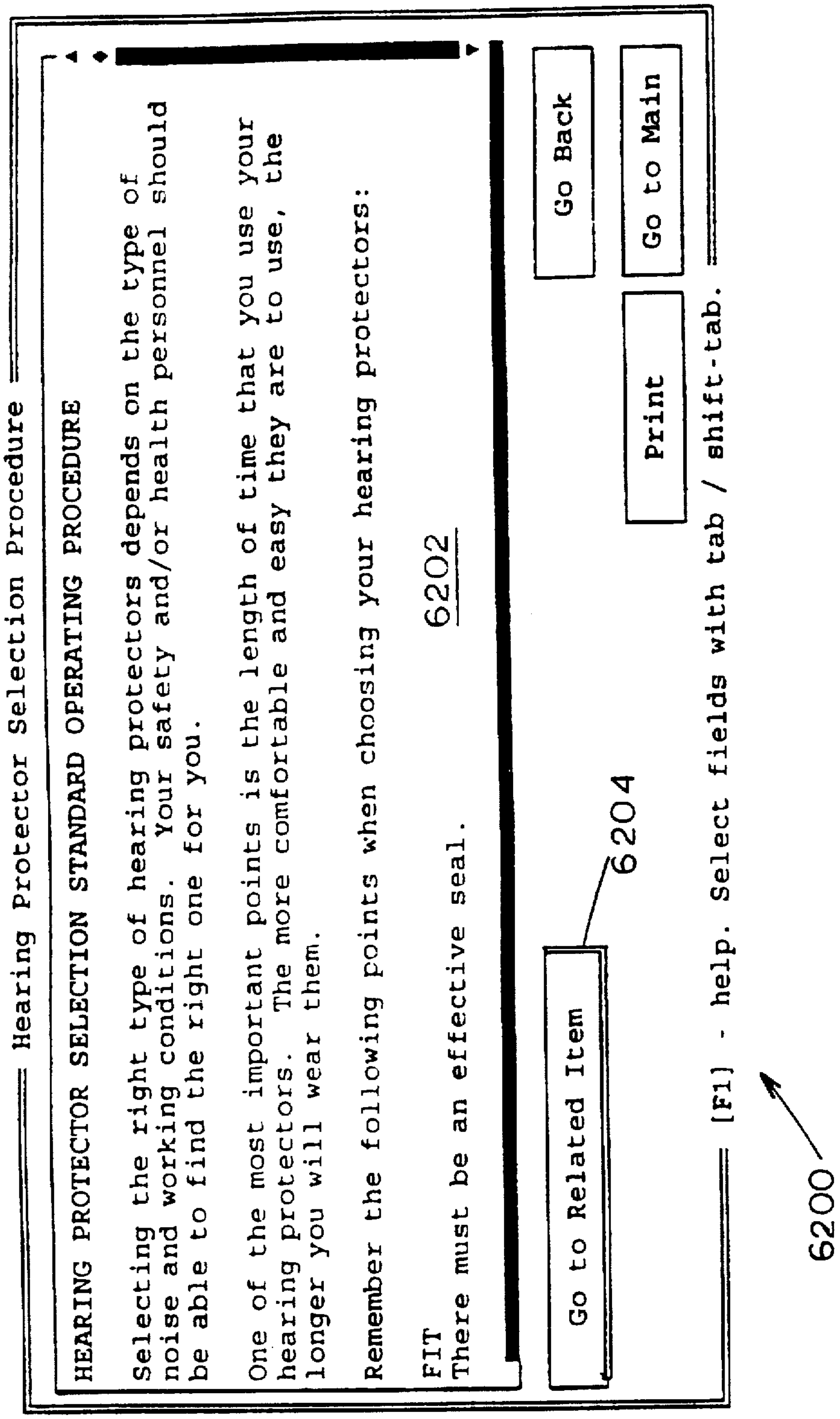
FIG. 62 is a representation of a screen display which is accessed from the screen display of FIG. 61.

Selection of the button 5304 from the screen display 5300 as shown in FIG. 53 permits the user to read/print the standard operating procedures which are incorporated into the hearing program 122. Selection of the button 5304 presents the user with a screen display 6100 as shown in FIG. 61. From this screen display, the user may view standard operating procedures relating to such aspects of a workplace hearing protection program as the procedures which may be used in the selection of hearing protectors, the training and protocol related to hearing protection, and a protocol relating to fit testing. These procedures (i.e., knowledge) may be stored in manual form and may be taken from approved industry recognized procedures, from governmentally recognized procedures relating to the desired topics, and/or from the like.

As indicated by the screen display 6100, the standard operating procedures may be accessed from the screen display 6100. For example, if the standard operating procedure relating to selection of hearing protectors is accessed, this procedure may be similar to those disclosed in a screen display 6200. The screen display 6200 includes a scrollable window 6202 wherein the standard operating procedure may be read. The screen display 6200 includes button 6204 which, when activated, presents an overlay to permit the user, through a link or hypertext function, to access forms and records related to the procedure.

Figure 63:
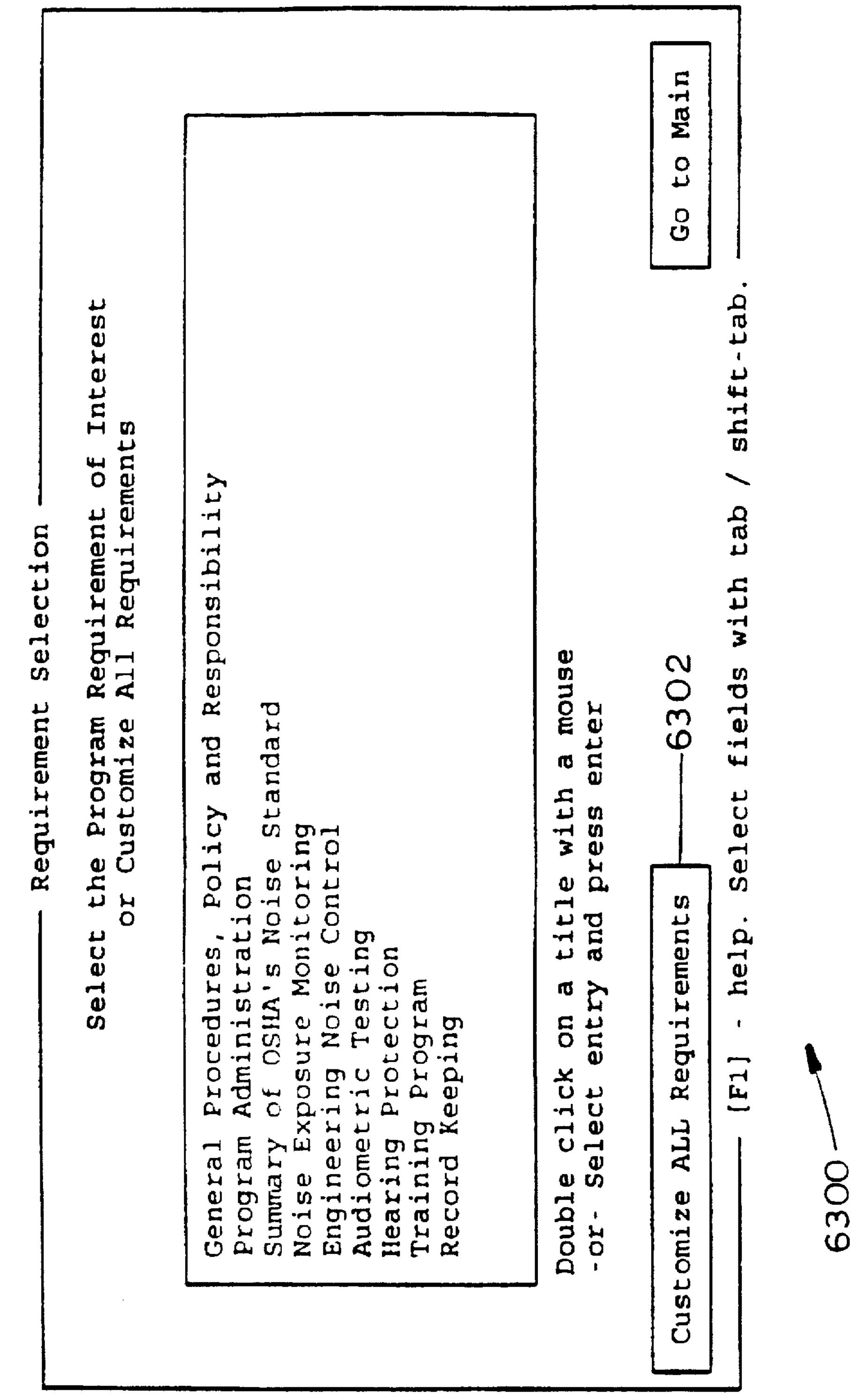
FIG. 63 is a representation of a screen display which is accessed from the screen display of FIG. 53.

Hearing program requirements may be accessed through selection of the button 5306 from the screen display 5300. Selection of the button 5306 presents a screen display 6300 as shown in FIG. 63. This screen display allows the user to view requirements related to the workplace hearing protection program. These requirements may include the program's general procedures, program administration, a summary of OSHA's noise standards, noise exposure monitoring, and the like. In addition, all requirements may be customized by selection of a button 6302. As discussed above, customization may allow the user to enter the company name of the employer relating to the workplace hearing protection program, the address of the company, the name and titles of individuals responsible for the various implementation of the requirements, and the like.

As in the case of the respirator program 120, the button 5308 may be selected from the screen display 5300 in order to view the workplace hearing protection program, the button 5310 may be selected to print a copy of the workplace hearing protection program, and the button 5312 may be selected to assist the user in preparing for an audit.

Figure 64:
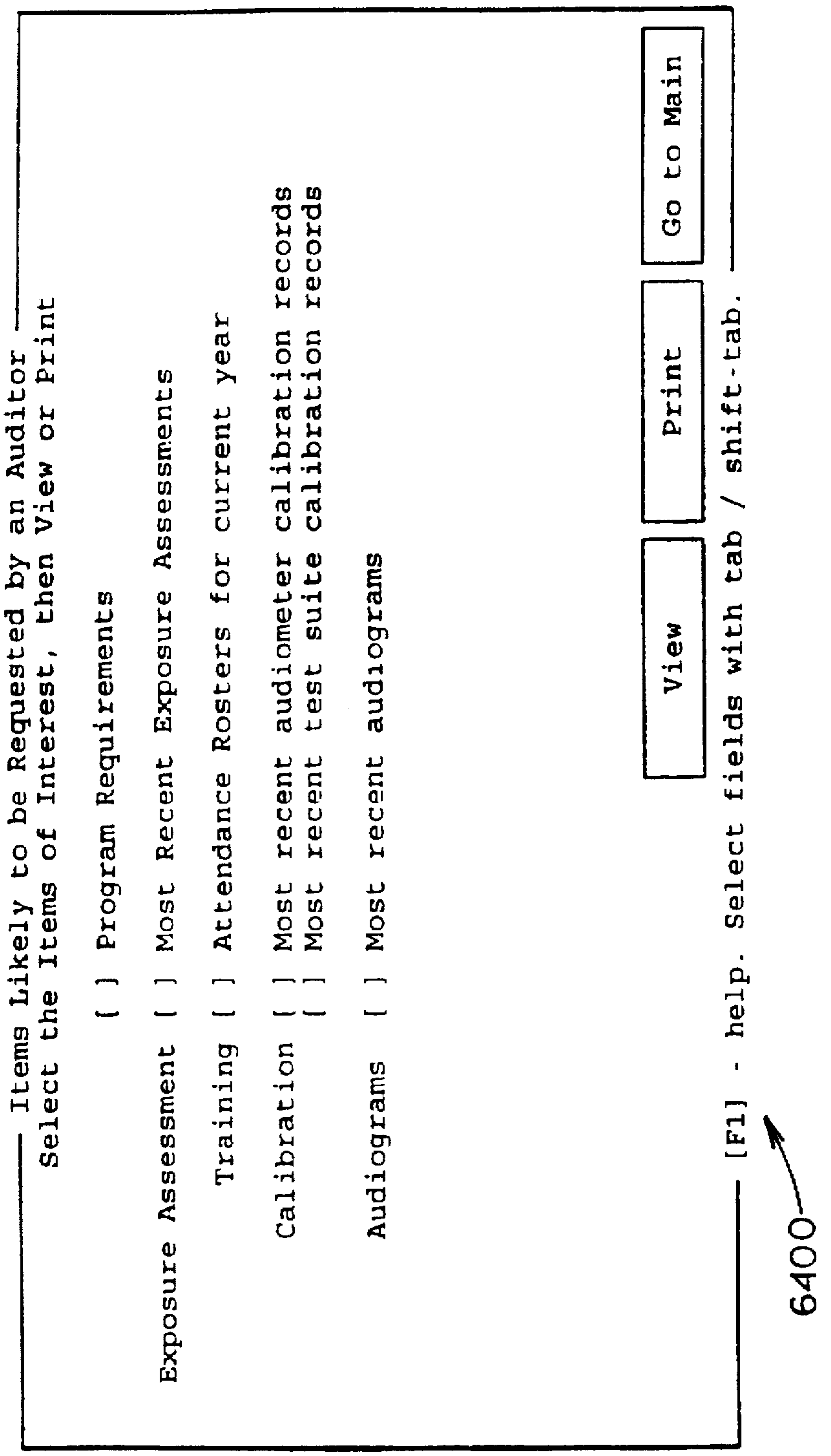
FIG. 64 is a representation of a screen display which is accessed from the screen display of FIG. 53.

When the button 5312 is selected, a screen display 6400 as shown in FIG. 64 is presented to the user. From this screen display, the user is reminded of the information likely to be required by an auditor. This information may include, for example, program requirements related to the workplace hearing protection program as developed by the user and as contained in the hearing program 122, records relating to the most recent exposure assessments, attendance rosters of training sessions for the current year, most recent audiometer and test suite calibration records, and most recent audiograms. The user may view and/or print any of this information, as desired, by selecting the item and by selecting a view and/or print button.

The flow chart of the respirator program 120 and the hearing program 122 is shown in FIGS. 65–80. Since the flow of relevant portions of the respirator program 120 and of the hearing program 122 have been described in detail above in connection with FIGS. 2–64, the flow chart shown in FIGS. 65–80 will be only briefly described hereinafter When the respirator program 120 and the hearing program 122 are first entered, a block of code 6502 causes the welcome screen display 200 to be displayed. If, as indicated by a block 6504, the user elects not to continue, the respirator program 120 and the hearing program 122 are exited. However, if the user elects to continue execution of the respirator program 120 and the hearing program 122, and if the user desires help in getting started as determined by a block 6506, a block 6508 causes the screen display 300 to be displayed. The screen display 300 gives the user the choice of entering the respirator program 120 or the hearing program 122.

Figure 66:
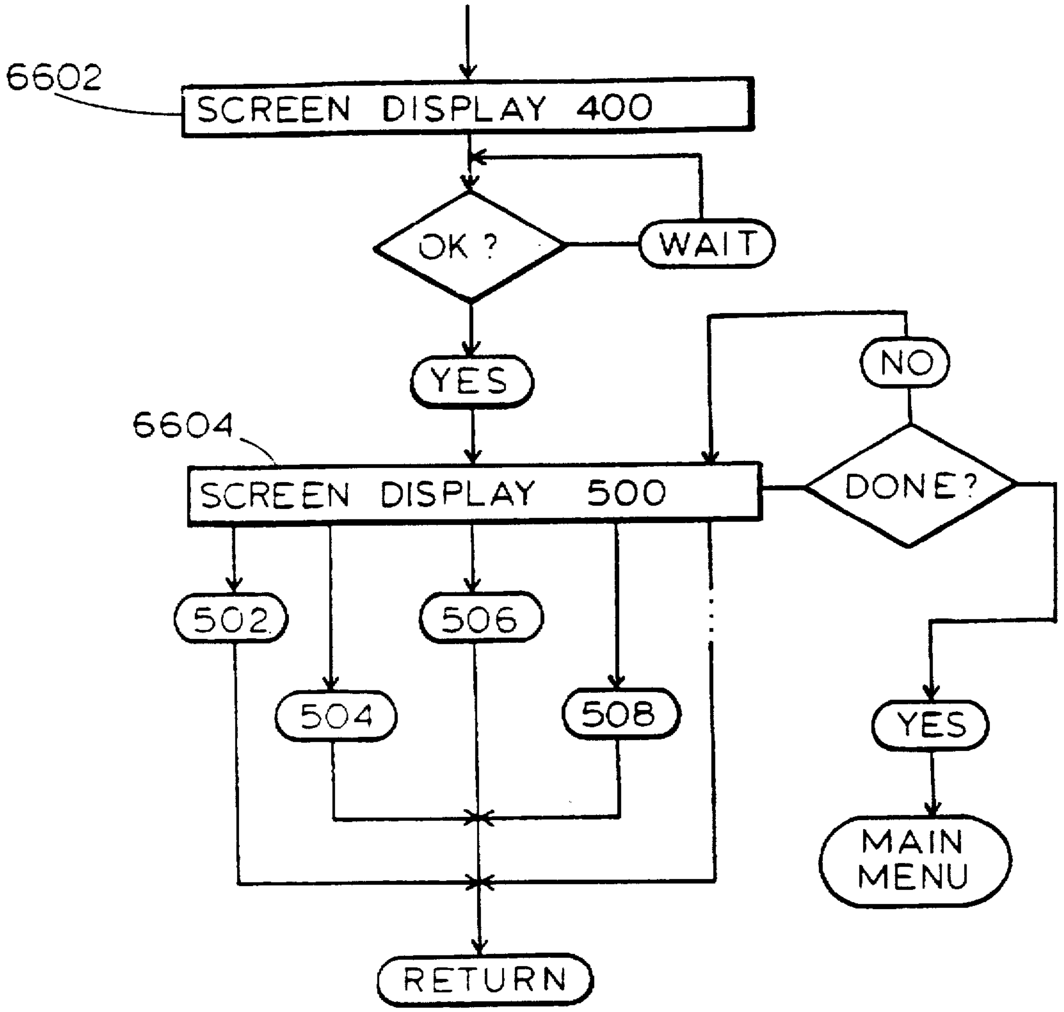

If the respirator program 120 is selected, a block 6602 causes the screen display 400 to be displayed, as shown in FIG. 66. As the user reads the screen display 400, the respirator program 120 remains in a wait mode. When the user indicates that it is OK to proceed with the development of a workplace respiratory protection program, a block 6604 causes the screen display 500 to be displayed.

Figure 67:
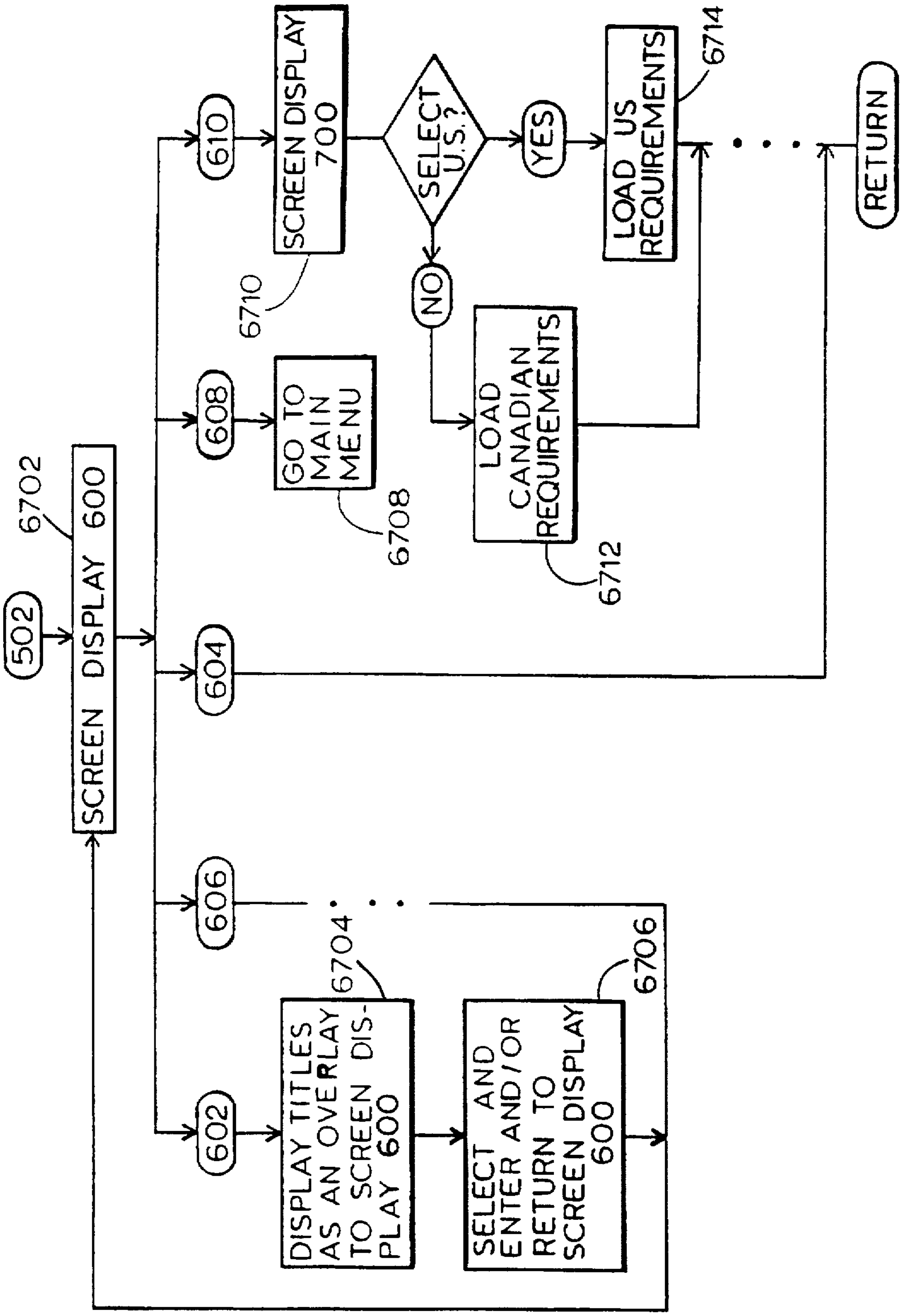

If the user selects the button 502 from the screen display 500, a block 6702 as shown in FIG. 67 causes the screen display 600 to be displayed in order to begin the process of customization. The user may enter, into this screen display 600, the name and address of the company (i.e., employer) for which the workplace respiratory protection program is being developed. If the user selects the button 602 of the screen display 600, a block 6704 causes representative titles to appear, and a block 6706 permits the user to select one of these titles for the named persons.

If the button 604 is selected, the respirator program 120 returns the user to the screen display 500. If the button 606 is selected, the respirator program 120 causes printing of the current screen display 600, a group of screen displays, or all of the customization screen displays involved in the customization of the workplace respiratory protection program. If the button 608 is selected, a block 6708 returns the user to the Main Menu of the screen display 1700. If the button 610 is selected, a block 6710 causes the screen display 700 to be displayed so that the user can enter further customization information. If the user elects to develop the workplace respiratory protection program for Canada, for example, a block 6712 loads Canadian requirements so that the knowledge provided to the user by the respirator program 120 during the development and maintenance of the workplace respiratory protection program is tailored to Canadian requirements. On the other hand, if the user elects to develop the workplace respiratory protection program for the U.S., for example, a block 6714 loads the U.S. requirements so that the knowledge provided to the user by the respirator program 120 during the development and maintenance of the workplace respiratory protection program is tailored to U.S. requirements. Customization may be continued until the user indicates that the customization process is done after which the respirator program 120 returns the user to the screen display 500.

Figure 68:
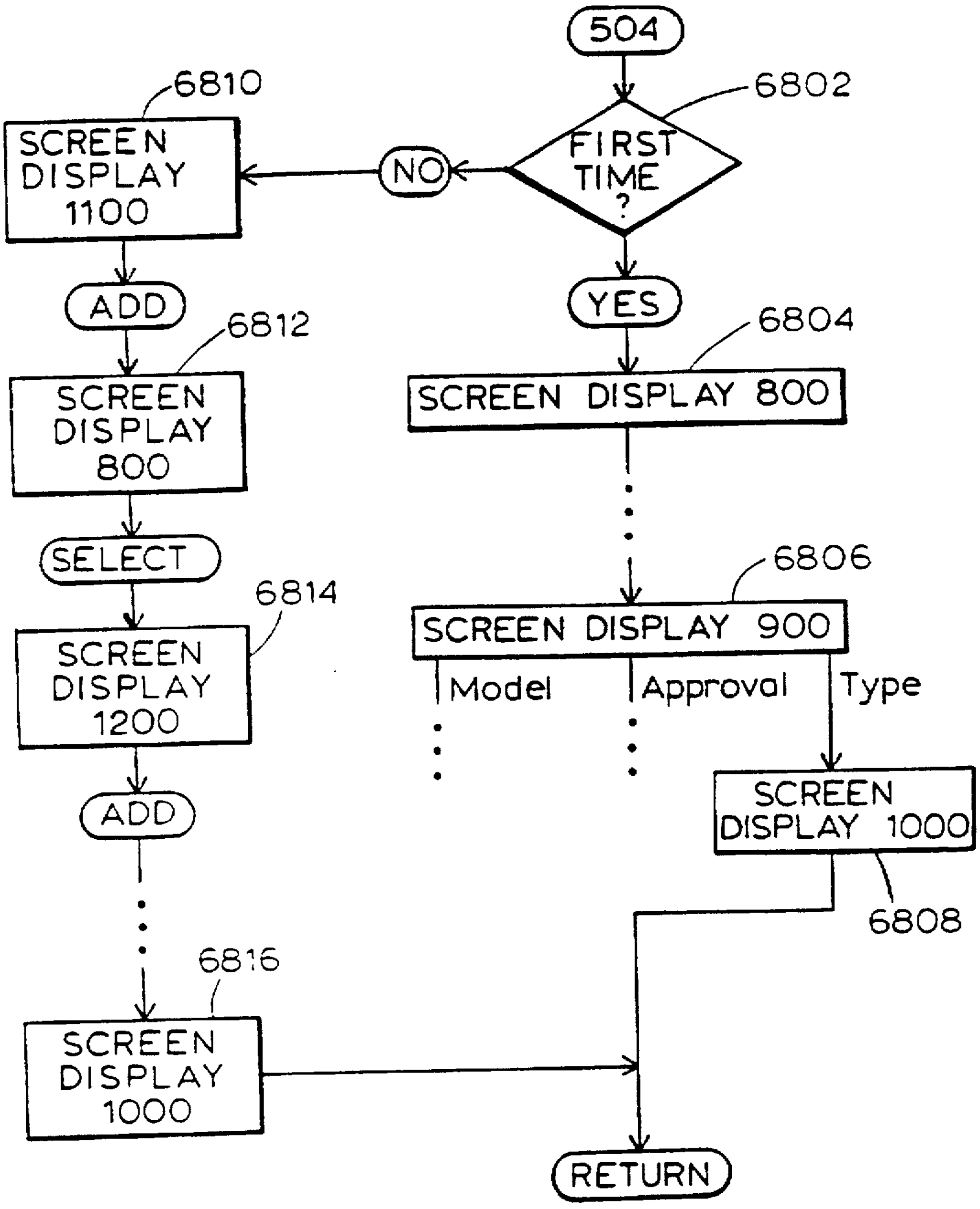

If the button 504 is selected from the screen display 500, a block 6802 as shown in FIG. 68 determines whether a respirator is being selected for the first time. If so, a block 6804 causes the screen display 800 to be displayed to the user. Following completion of the screen display 800 and any subsequent screen displays as described above, a block 6806 causes the screen display 900 to be presented to the user.

If the user requests that the respirators be sorted by type, a block 6808 causes the screen display 1000 to be presented to the user. After the user selects a respirator from the screen display 1000, the respirator program 120 returns the user to the screen display 500.

On the other hand, if a respirator is not being selected for the first time, a block 6810 causes the screen display 1100 to be displayed to the user so that additional respirators may be selected. If the user elects to add a location in which a respirator can be used, a block 6812 causes the screen display 800 to be displayed to the user so that the user may specify the location to be added. After selection of a location, a block 6814 causes the screen display 1200 to be displayed to the user. This process of selecting a new respirator is continued until a block 6816 causes the screen display 1000 to be displayed which permits the user to select the new respirator. After the new respirator is selected, the respirator program 120 returns the user to the screen display 500.

Figure 69:
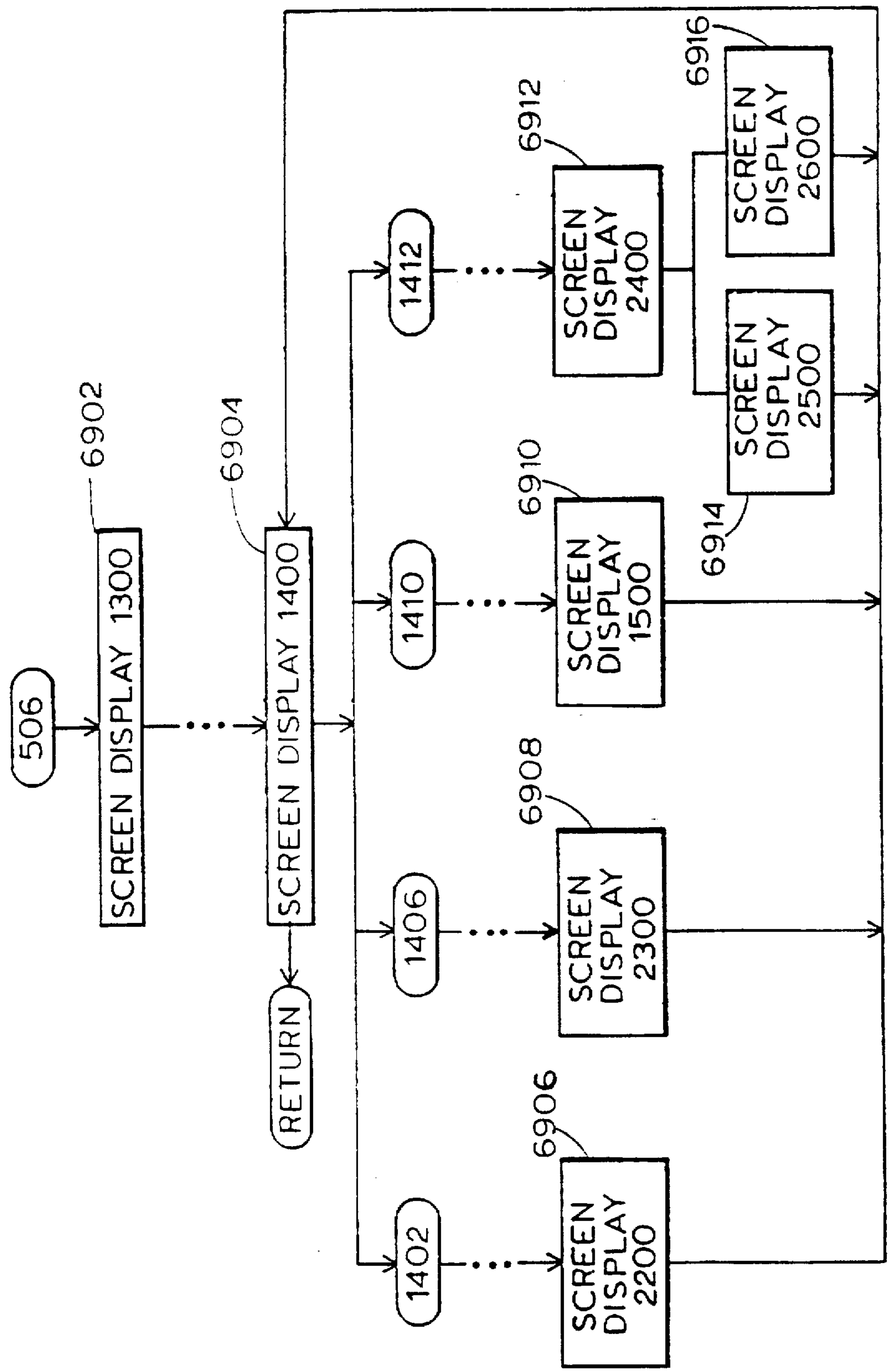

If the button 506 is selected from the screen display 500, a block 6902 as shown in FIG. 69 causes the screen display 1300 to be displayed to the user. After the user enters the name and identification of an employee, a block 6904 causes the screen display 1400 to be displayed to the user so that the user may create a record concerning the identified employee.

Accordingly, if the button 1402 is selected, a block 6906 causes the screen display 2200 to be displayed so that the user can fill out a medical questionnaire about the employee. If the button 1406 is selected, a block 6908 causes the screen display 2300 to be displayed so that the user can fill out a medical clearance form for the employee. If the button 1410 is selected, a block 6910 causes the screen display 1500 to be displayed so that the user may select respirators for the employee. If the button 1412 is selected, a block 6912 causes the screen display 2400 to be displayed so that the user may view and/or add fit tests and view training sessions for the employee. If the user elects to add fit tests from the screen display 2400, a block 6914 causes the screen display 2500 to be displayed to the user, and a block 6916 causes the screen display 2600 to be displayed to the user. After completion of the screen display 1400, the respirator program 120 returns the user to the screen display 500.

Figure 70:
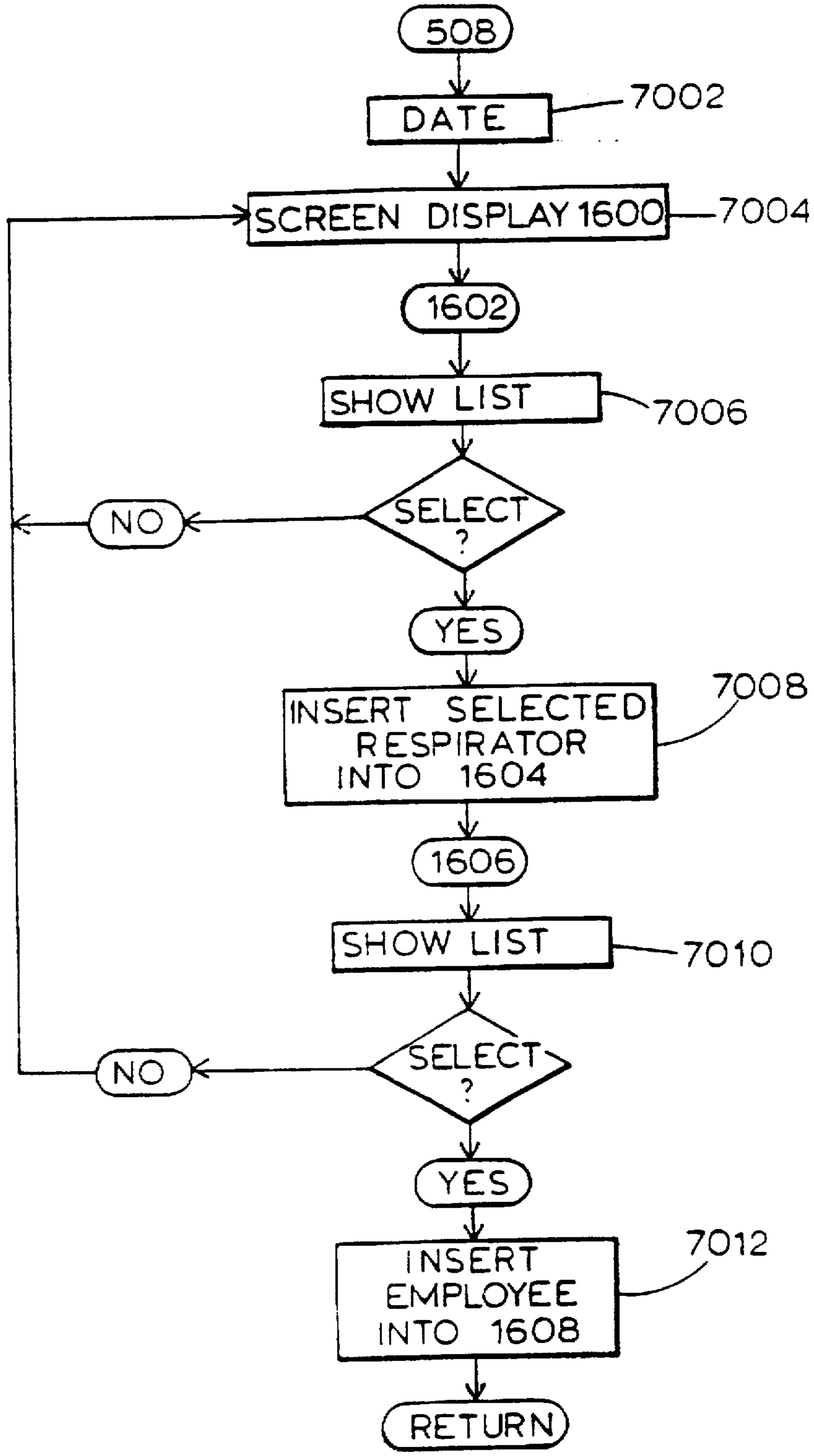

If the button 508 is selected from the screen display 500, a block 7002 as shown in FIG. 70 causes a screen display to be displayed in which the user is asked to insert a date on which a respirator training session is to be conducted. Thereafter, a block 7004 causes the screen display 1600 to be displayed to the user. When the button 1602 is selected by the user, a block 7006 causes a list of respirators to be displayed to the user. If the user selects a respirator from this list, a block 7008 causes the selected respirator to be inserted into the region 1604 of the screen display 1600.

When the button 1606 is selected, a block 7010 causes a list of employees to be displayed to the user. If the user selects an employee from this list, a block 7012 causes the name of the selected employee to be inserted into the scrollable region 1608 of the screen display 1600. Thereafter, as shown in FIG. 70, the respirator program 120 returns the user to the screen display 500.

Figure 65:
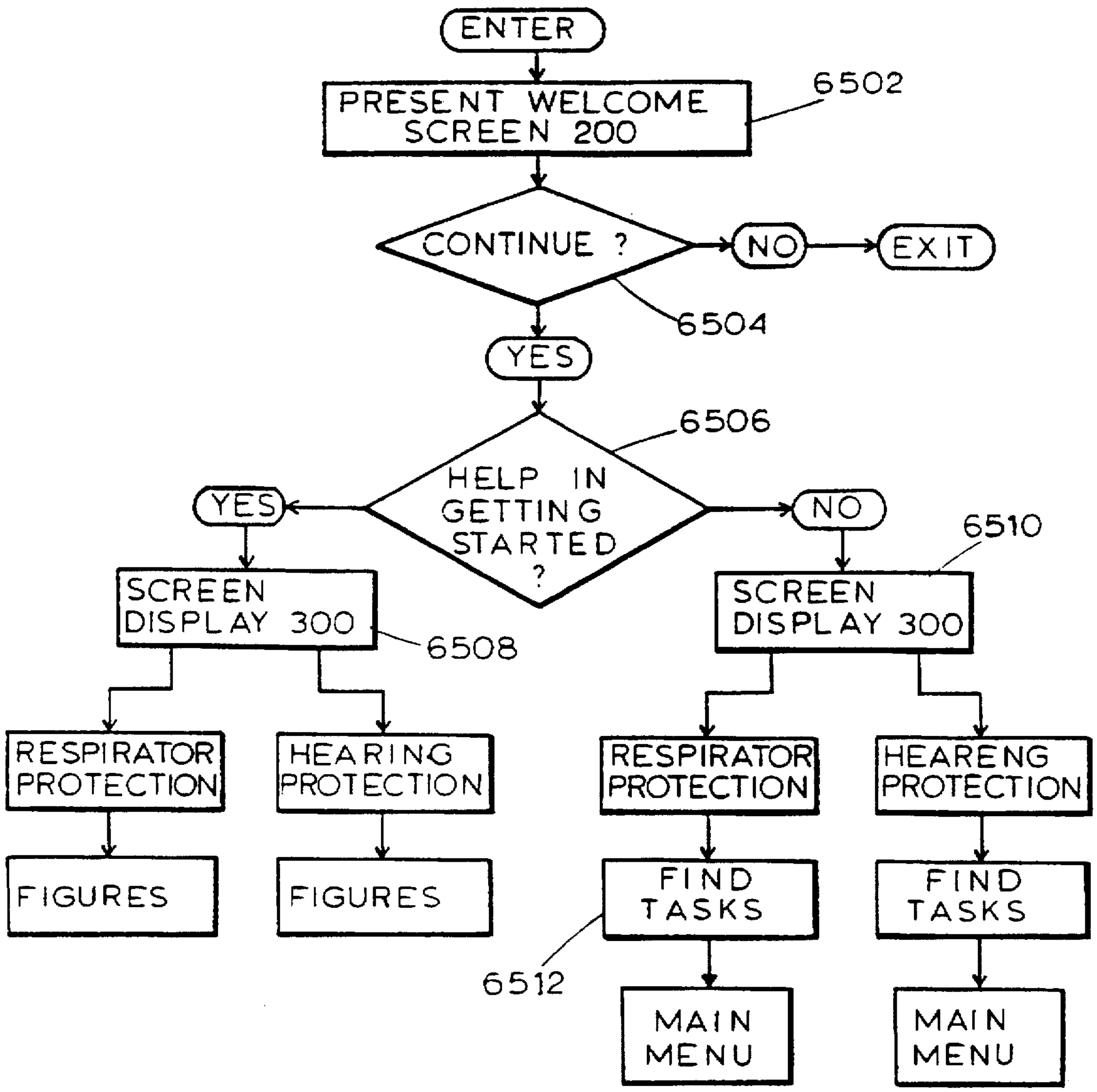
FIGS. 65–80 show a flow chart of the multiple protection program according to the present invention; and, FIG. 81 is a diagram showing the software architecture of the present invention.

As shown in FIG. 65, if the user declines help in getting started (e.g., the user has already initially developed the workplace respiratory protection program), a block 6510 causes the screen display 300 to be displayed. The screen display 300 gives the user the choice of entering the respirator program 120 or the hearing program 122.

If the respirator program 120 is selected, a block 6512 causes the screen display 1800 to be displayed to the user to remind the user of any tasks which must be done. Thereafter, the Main Menu of the hearing program 122 is entered.

Figure 71:
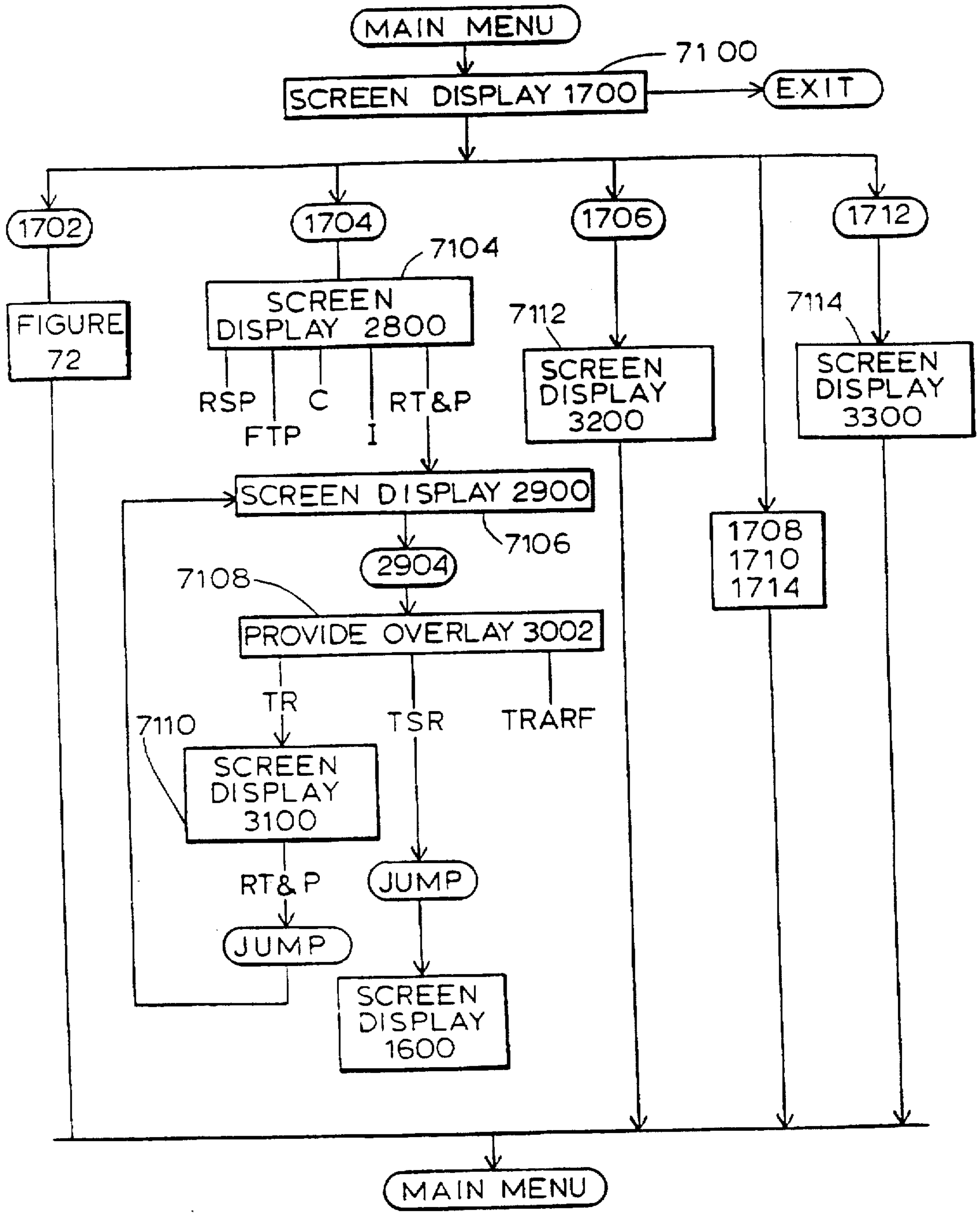
Figure 72:
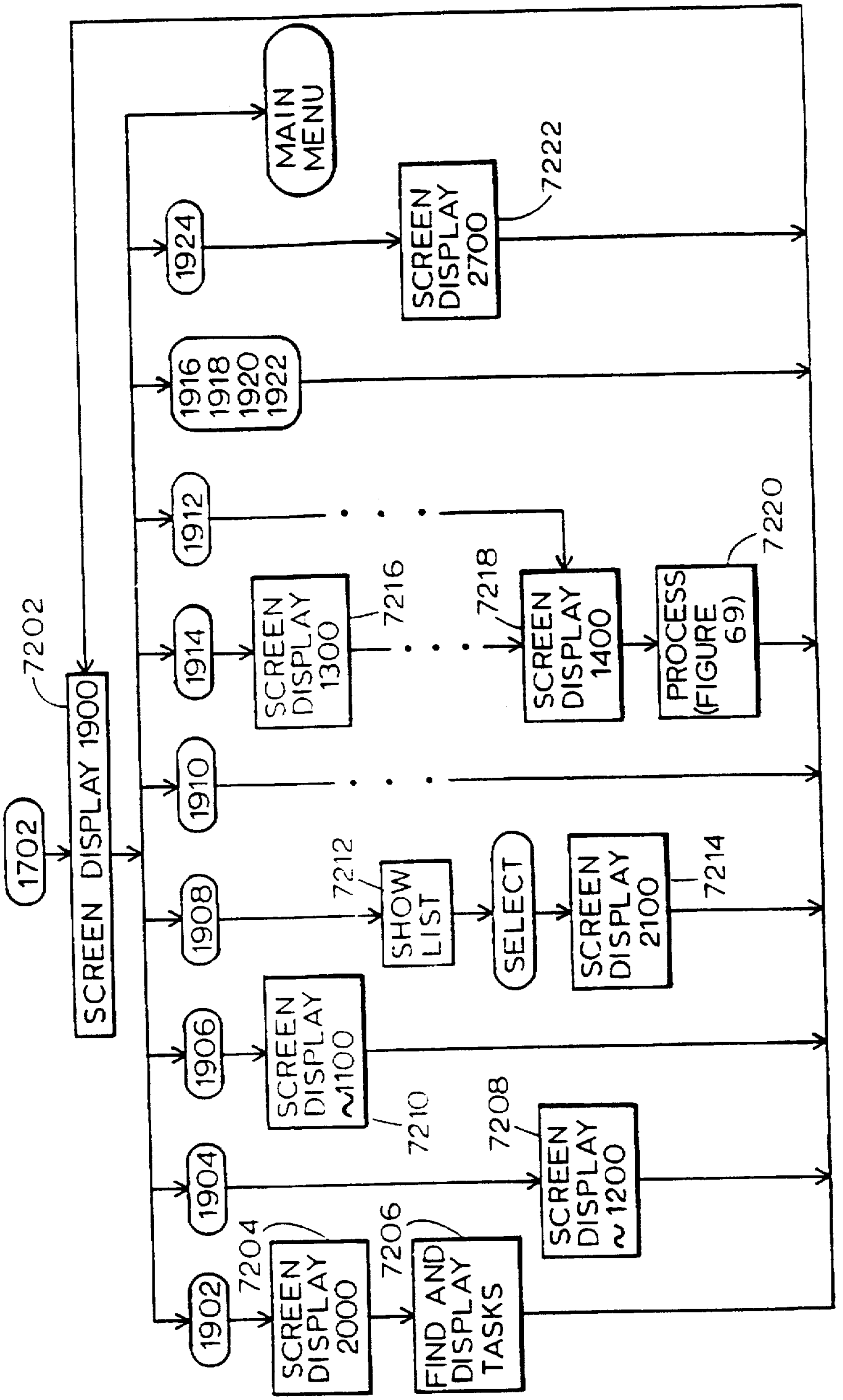

When the Main Menu of the respirator program 120 is entered, a block 7100 as shown in FIG. 71 causes the screen display 1700 to be displayed to the user. If the button 1702 is selected from the screen display 1700, a block 7202 as shown in FIG. 72 causes the screen display 1900 to be displayed to the user. If the user selects the button 1902 from the screen display 1900, a block 7204 causes the screen display 2000 to be displayed to the user. By use of the screen display 2000, the user may specify a search time period within which tasks may be due. After the user inserts the number of days into the screen display 2000, a block 7206 finds any tasks due between the current date and the date at the end of the time period specified by the number of days entered into the screen display 2000 by the user and displays those tasks.

Figure 12:
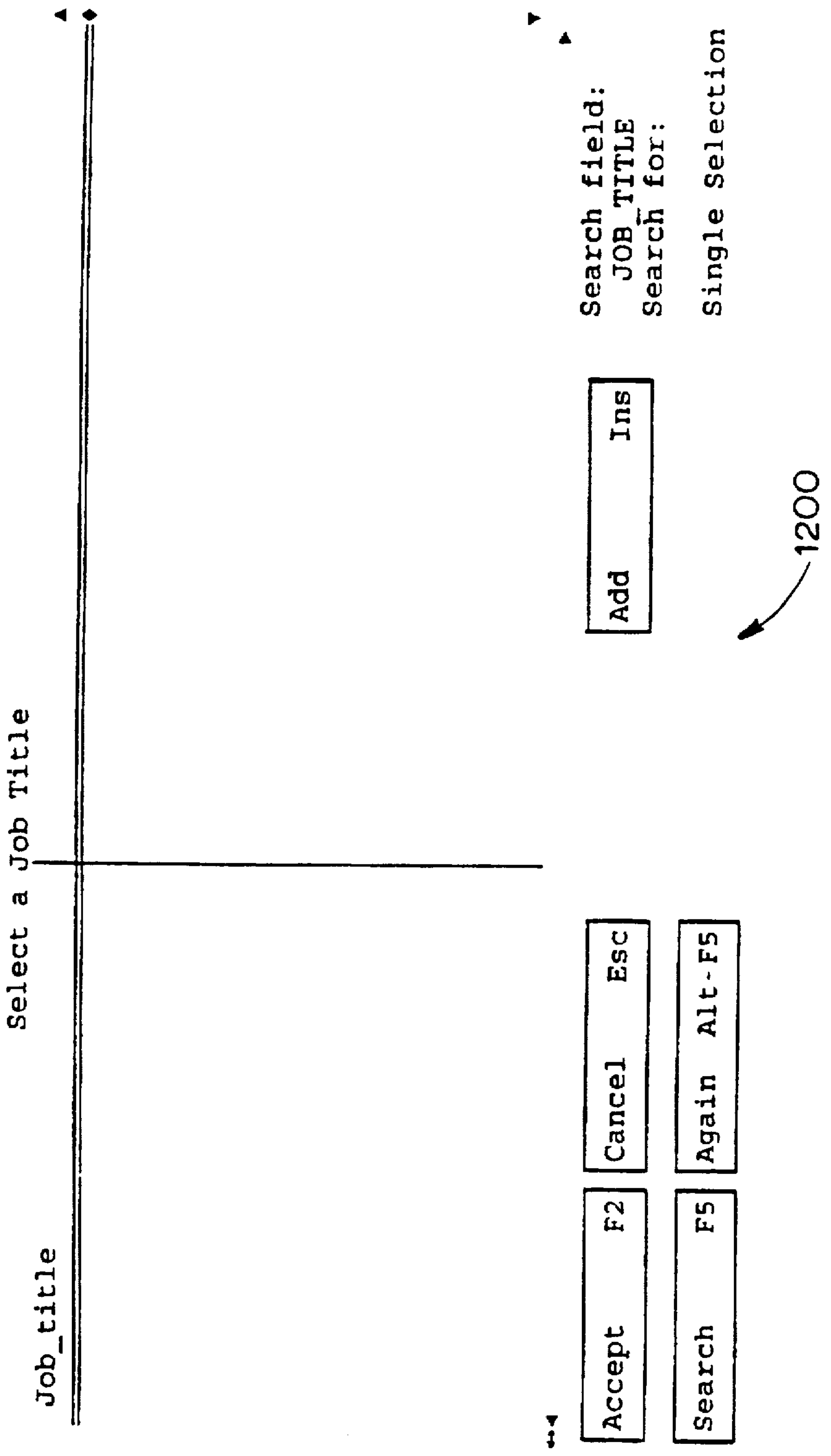
FIG. 12 is a representation of a screen display which is accessed from the screen display of FIG. 11.

If the user selects the button 1904 from the screen display 1900, a block 7208 causes a screen display similar to the screen display 1200 in FIG. 12 to be displayed to the user. By use of this screen display, the user can find current jobs by job title or add new job titles to the current list of jobs.

If the user selects the button 1906 from the screen display 1900, a block 7210 causes a screen display similar to the screen display 1100 in FIG. 11 to be displayed to the user. By use of this screen display, the user can find current locations or add new locations to the current list of locations.

If the user selects the button 1908 from the screen display 1900, a block 7212 causes a list of approved respirators to be displayed to the user. When the user selects a respirator from this list, a block 7214 causes the screen display 2100 to be displayed to the user.

If the user selects the button 1914 from the screen display 1900, a block 7216 causes the screen display 1300 to be displayed to the user. After the user enters the name and identification of an employee, a block 7218 causes the screen display 1400 to be displayed to the user so that the user may enter additional information concerning the employee. A block 7220 then causes that part of FIG. 69 related to the screen display 1400 to be performed.

The user may search for, and thereby access, existing employee records, such as the employee record shown by the screen display 1400 of FIG. 14. This search is initiated by selecting the button 1912 of the screen display 1900. Selecting the button 1912 presents a screen display which provides the user with a list of employees. Following selection of one of the employees on the list, the blocks 7218 and 7220 are performed.

Selecting the button 1910 allows the user to add respirators by location and by job to the list of approved respirators. Selection of the button 1916 allows the user to view the attendance roster for a selected training session. Selecting the button 1918 allows the user to enter employee names in a roster of those employees who are to attend an upcoming training session, and the user may select the respirator for which the training session is to be conducted. Selection of the buttons 1920 and 1922 allow the user to find and to add other workplace records If the user selects the button 1924, a block 7222 causes the screen display 2700 to be displayed to the user. Accordingly, the attendance roster form template, an exposure assessment form template, a respirator selection documentation form template, the qualitative and quantitative fit test form templates, the medical questionnaire form template, the request for medical clearance form template, a breathing air quality test form template, and a respirator program evaluation form template may be viewed and/or printed.

If the user selects the button 1704 from the screen display 1700, a block 7104 causes the screen display 2800 to be displayed to the user. If the standard operating procedures relating to respiratory training and protocol are selected, for example, a block 7106 causes the screen display 2900 to be displayed to the user so that the user may read the standard operating procedures of the workplace respiratory protection program. If the user selects the Go To Related button from the screen display 2900, a block 7108 provides an overlay on the screen display 2900 so that the user, through a link or hypertext function, can access training requirements (TR), training program attendance roster forms (TRARF), and training session records (TSR). If the user selects training requirements, for example, a block 7110 causes the screen display 3100 to be displayed to the user. If the user selects the Go To Related button of the screen display 3100 and selects respirator training and protocol from the resulting overlay, the respirator program 120 jumps through the hypertext link to the screen display 2900 so that the user can view the respirator training and protocol requirements. On the other hand, if the user selects training sessions records from the overlay 3002, the user is presented with a display 3400 as shown in FIG. 34 from which, by the user selecting a training session from a list of training sessions, the respirator program 120 jumps through a hypertext link to the screen display 1600 so that the user can view training sessions records.

If the user selects the button 1706 from the screen display 1700, a block 7112 causes the screen display 3200 to be displayed to the user. This screen display allows the user to view requirements related to the workplace respiratory protection program such as the program's general procedures, program administration, medical evaluation, work area monitoring, respirator selection, procedures relating to the storage of respirators and the evaluation of the workplace respiratory protection program, and the like.

Selection of the button 1708 allows the user to page through information and knowledge in the form of a manual. Selection of the button 1710 allows the user to print the respiratory program which the user may view by selection of the button 1708. If the button 1712 is selected, a block 7114 causes the screen display 3300 to be displayed to the user. From this screen display, the user is reminded of the information likely to be required by an auditor.

Figure 73:
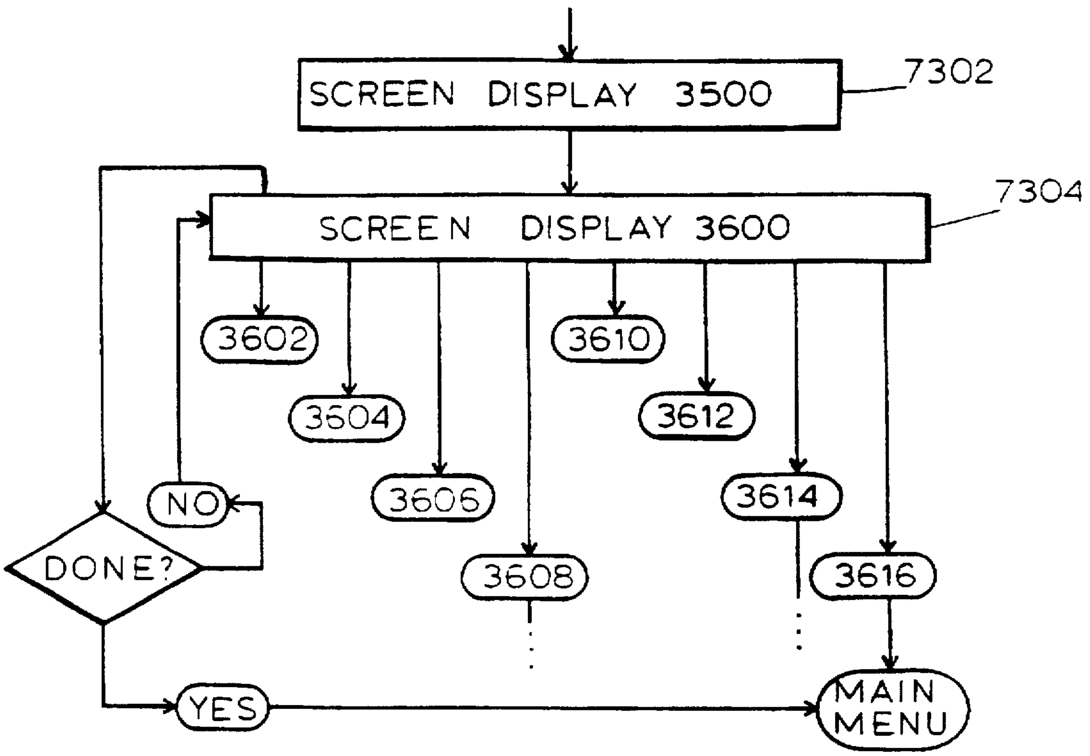

If the hearing program 122 is selected from the screen display 300 (see FIG. 65), a block 7302 of FIG. 73 causes the screen display 3500 to be displayed. As the user reads the screen display 3500, the hearing program 122 may remain in a wait mode. When the user indicates that it is OK to proceed with the development of a workplace hearing protection program, a block 7304 causes the screen display 3600 to be displayed.

Figure 74:
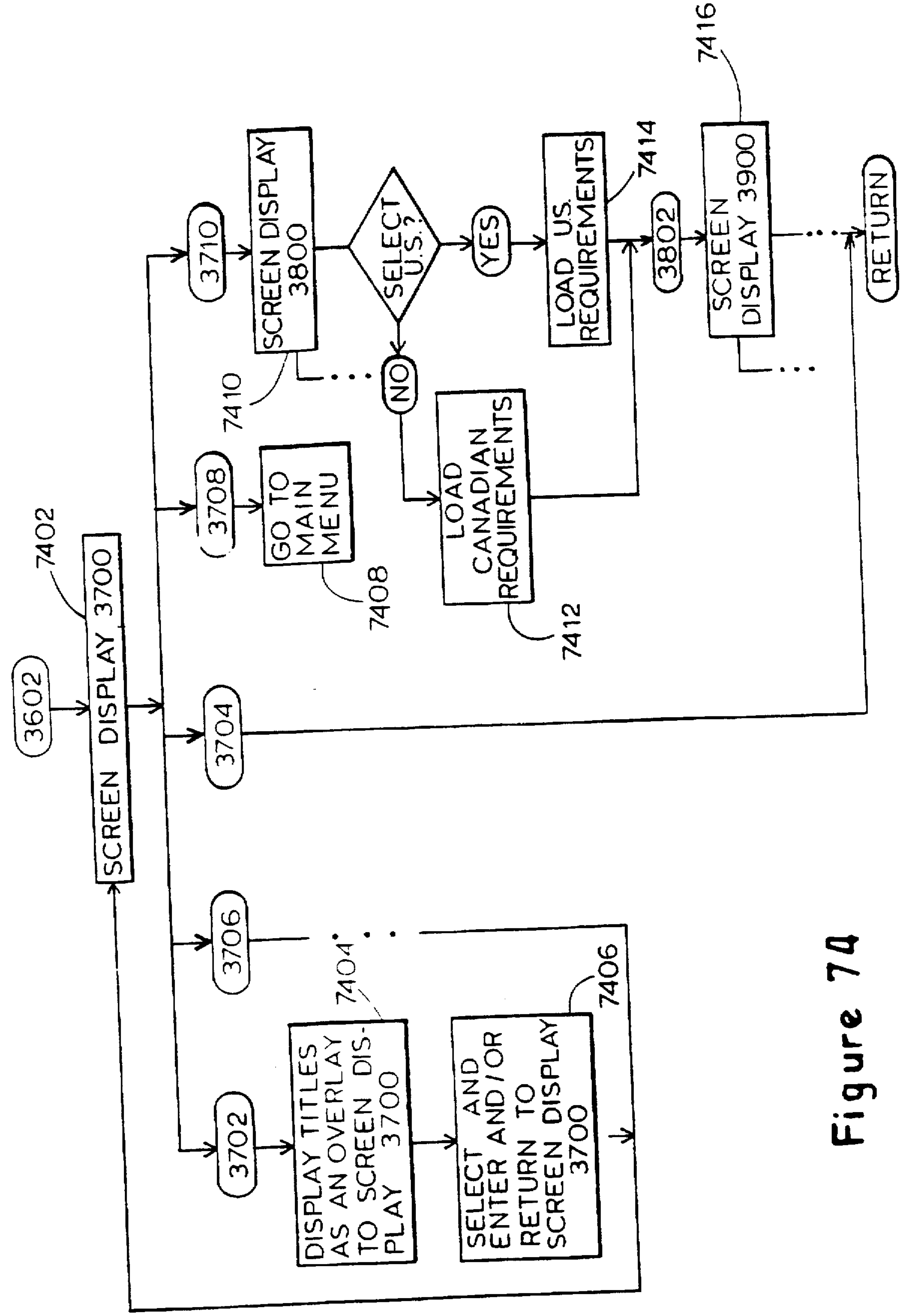

If the user selects the button 3602 from the screen display 3600, a block 7402 as shown in FIG. 74 causes the screen display 3700 to be displayed in order to begin the process of customization. The user may enter, into this screen display 3700, the name and address of the company (i.e., employer) for which the workplace hearing protection program is being developed. If the user selects the button 3702 of the screen display 3700, a block 7404 causes representative titles to appear, and a block 7406 permits the user to select one of these titles for the named persons.

If the button 3704 is selected, the hearing program 122 returns the user to the screen display 3600. If the button 3706 is selected, the hearing program 122 causes printing of the current screen display 3700, a group of screen displays, or all of the customization screen displays involved in the customization of the workplace hearing protection program. If the button 3708 is selected, a block 7408 returns the user to the Main Menu in the screen display 5300. If the button 3710 is selected, a block 7410 causes the screen display 3800 to be displayed so that the user can enter further customization information. If the user elects to develop the workplace hearing protection program for Canada, for example, a block 7412 loads Canadian requirements so that the knowledge provided to the user by the hearing program 122 during the development and maintenance of the workplace hearing protection program is tailored to Canadian requirements. On the other hand, if the user elects to develop the workplace hearing protection program for the U.S., for example, a block 7414 loads the U.S. requirements so that the knowledge provided to the user by the hearing program 122 during the development and maintenance of the workplace hearing protection program is tailored to U.S. requirements. Customization may be continued by selection of the button 3802. If the button 3802 is selected, a block 7416 causes the screen display 3900 to be displayed so that the user can enter further customization information as described above.

Figure 75:
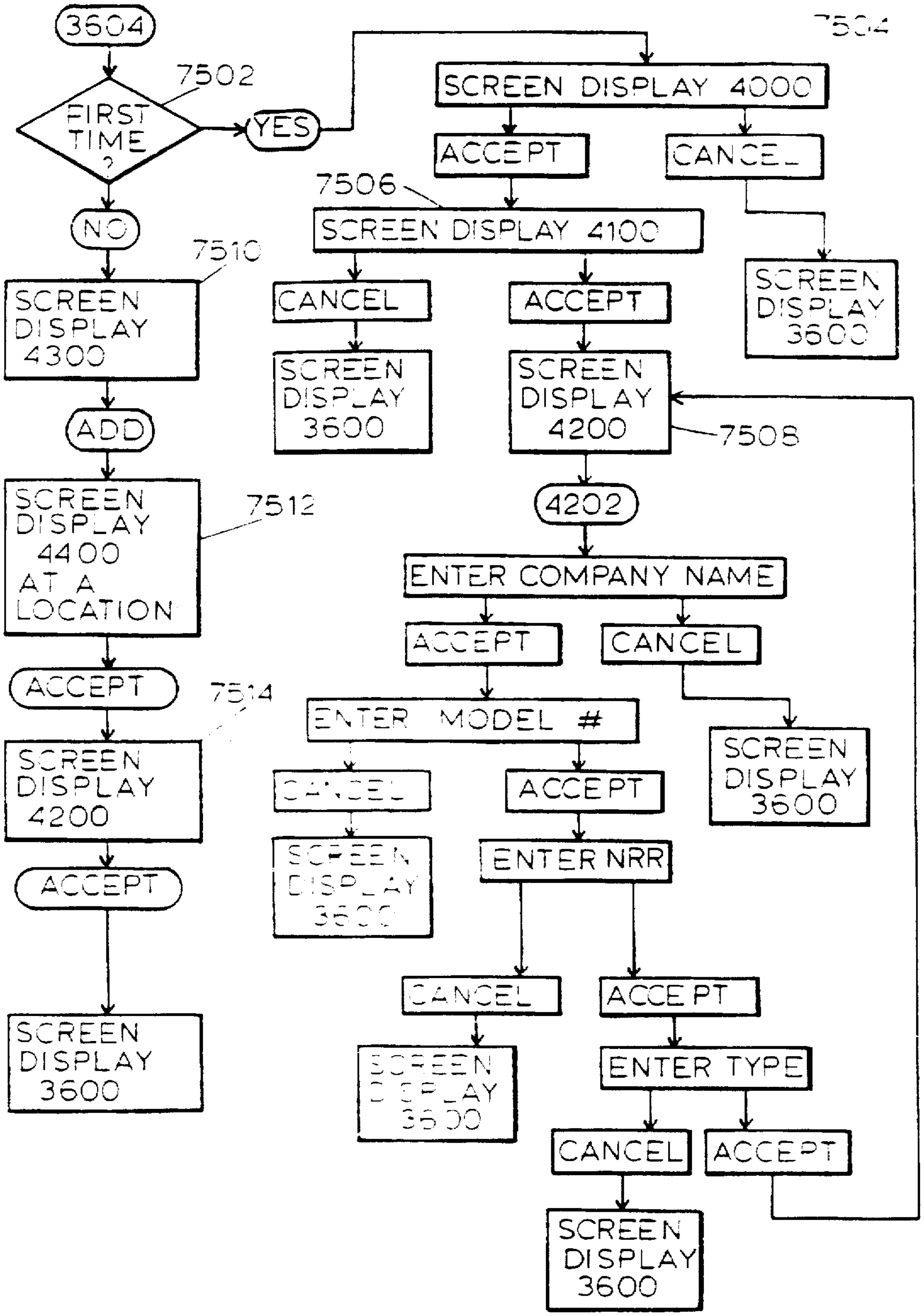

If the button 3604 is selected from the screen display 3600, a block 7502 as shown in FIG. 75 determines whether a hearing protector is being selected for the first time. If so, a block 7504 causes the screen display 4000 to be displayed to the user. Following completion of the screen display 4000, a block 7506 causes the screen display 4100 to be displayed to the user. Following completion of the screen display 4100, a block 7508 causes the screen display 4200 to be presented to the user.

As shown in FIG. 75, hearing protectors may be added to the list of pre-approved hearing protectors presented by the screen display 4200 by entering the name of the company (i.e., manufacturer) of the hearing protector to be added, the model number of the hearing protector to be added, the NRR rating of the hearing protector to be added, and the type of hearing protector to be added. The entered data is then added to the list of pre-approved hearing protectors presented in the screen display 4200.

On the other hand, if a hearing protector is not being selected for the first time, a block 7510 causes the screen display 4300 to be displayed to the user so that additional hearing protectors may be selected. If the user elects to add a location in which a hearing protector can be used, a block 7512 causes the screen display 4400 to be displayed to the user so that the user may specify the job title for which the hearing protector is to be used. After selection of a job title, a block 7514 causes the screen display 4200 to be displayed to the user which permits the user to select the new hearing protector. After the new hearing protector is selected, the hearing program 122 returns the user to the screen display 3600.

Figure 76:
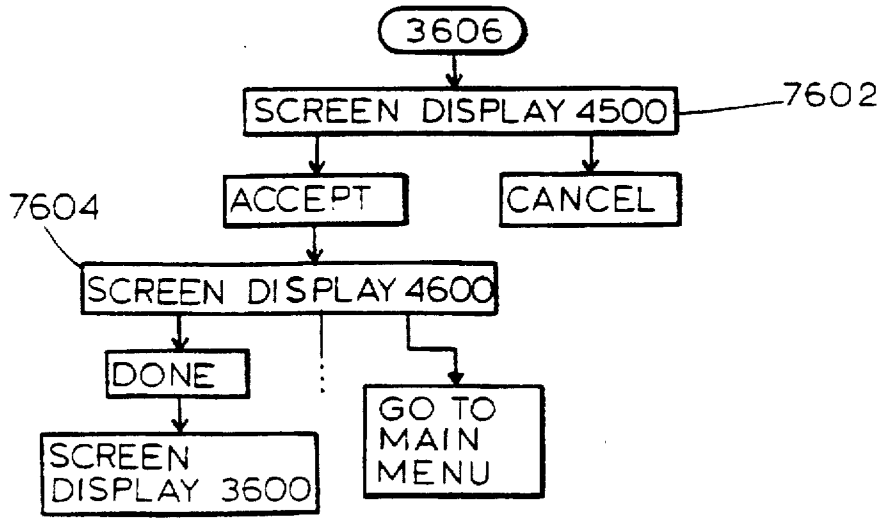

If the button 3606 is selected from the screen display 3600, a block 7602 as shown in FIG. 76 causes the screen display 4500 to be displayed to the user. After the user enters the test suite, a block 7604 causes the screen display 4600 to be displayed to the user so that the user may create a record concerning test suite calibration checks.

Figure 77:
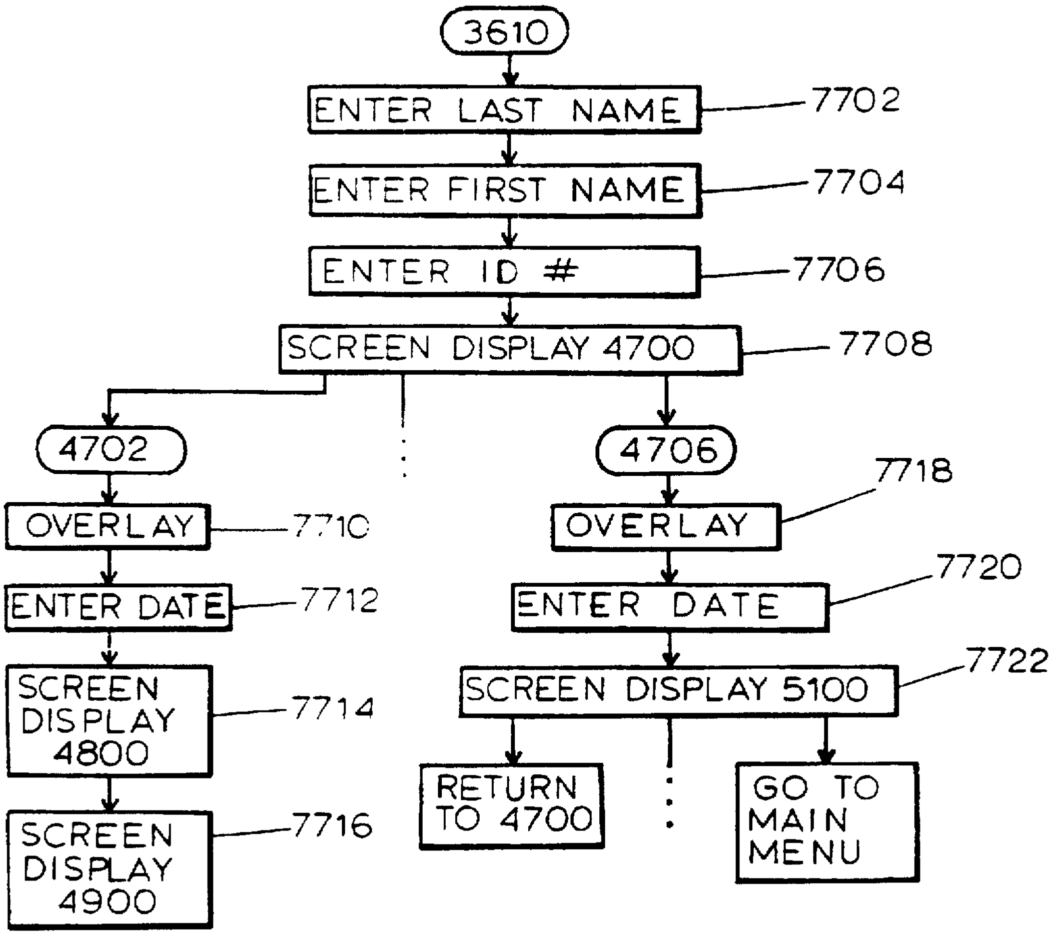

If the button 3610 is selected from the screen display 3600, a block 7702 as shown in FIG. 77 permits the user to enter the last name of an employee for whom a record is to be made, a block 7704 permits the user to enter the first name of the employee for whom the record is to be made, and a block 7706 permits the user to enter the identification number of the employee for whom the record is to be made. Thereafter, a block 7708 causes the screen display 4700 to be displayed to the user.

Accordingly, if the button 4702 is selected, a block 7710 causes an overlay to the screen display 4700 to appear. A block 7712 permits the user to enter the date for an audiogram into the overlay. When the user enters and accepts a date, a block 7714 causes the screen display 4800 to be displayed. After the user selects a test suite from the test suites listed on the screen display 4800, a block 7716 causes the screen display 4900 to be displayed, and so on.

If the button 4706 is selected, a block 7718 causes an overlay to the screen display 4700 to appear. A block 7720 permits the user to enter the date for an audiogram into the overlay When the user enters and accepts a date, a block 7722 causes the screen display 5100 to be displayed. From the screen display 5100, the user may go to the Main Menu of the hearing program 122 or is returned to the screen display 4700.

Also, although not specifically shown in FIG. 77, the hearing program 122 causes multiple hearing protectors, which are assigned to a person, to be presented in the region 4712. The user may also access training sessions and exposure assessment results for the employee by highlighting a hearing protector in the region 4712 and then pressing the enter key.

Figure 78:
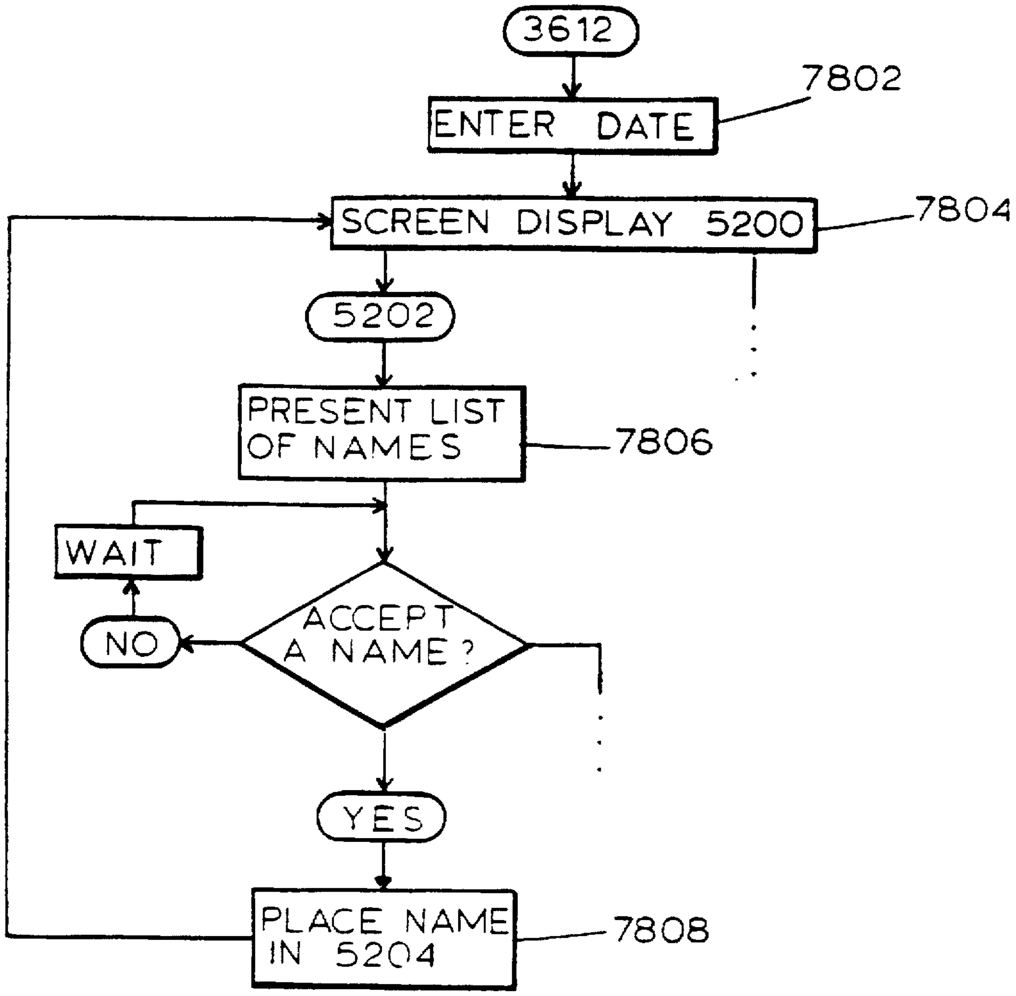

If the button 3612 is selected from the screen display 3600, a block 7802 as shown in FIG. 78 causes a screen display to be displayed in which the user is asked to insert a date on which a hearing protector training session is to be conducted. Thereafter, a block 7804 causes the screen display 5200 to be displayed to the user. When the button 5202 is selected by the user, a block 7806 causes a list of employee names to be presented to the user. If the user selects an employee name from this list, a block 7808 causes the selected employee name to be inserted into the scrollable region 5204 of the screen display 5200.

Figure 79:
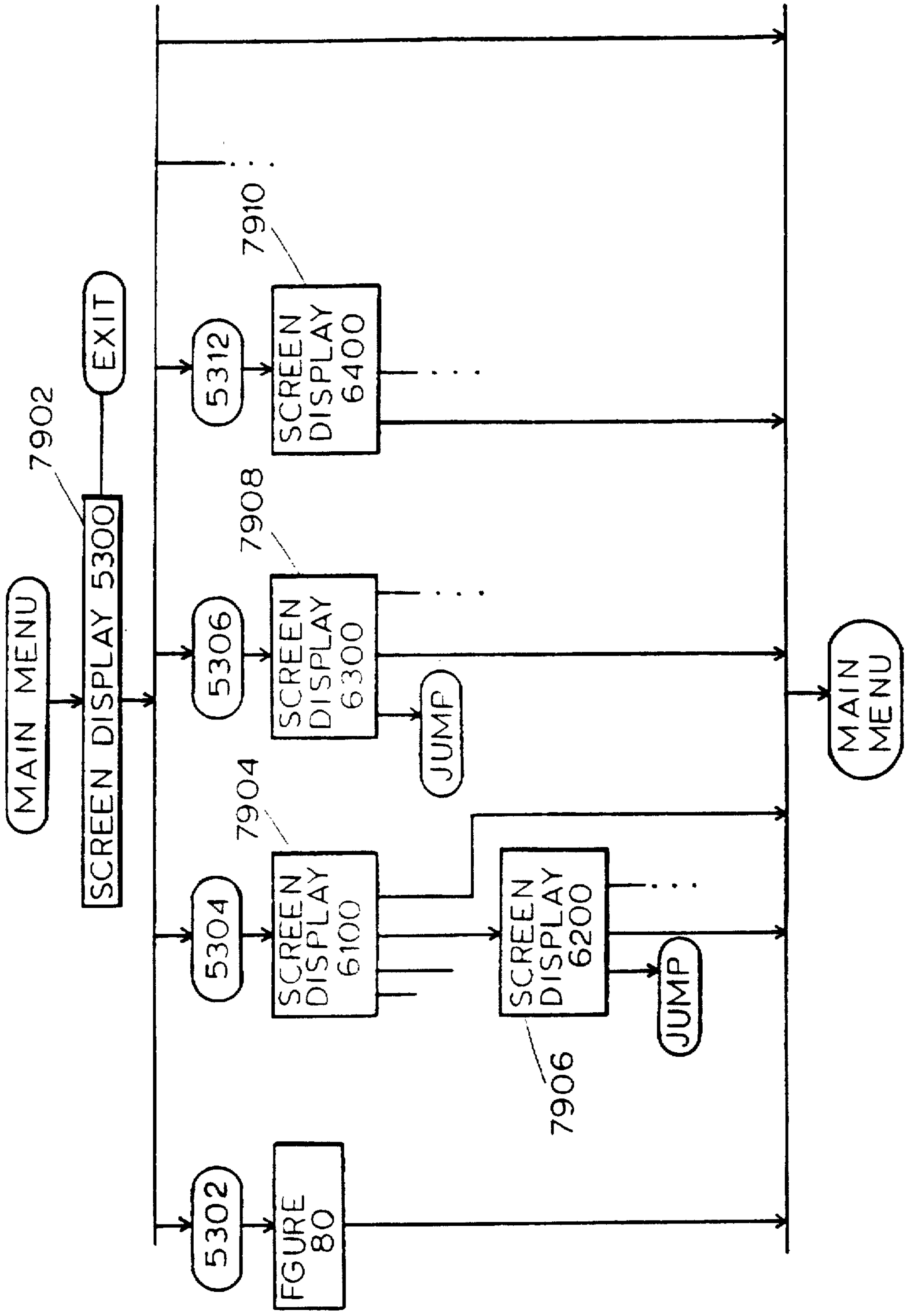
Figure 80:
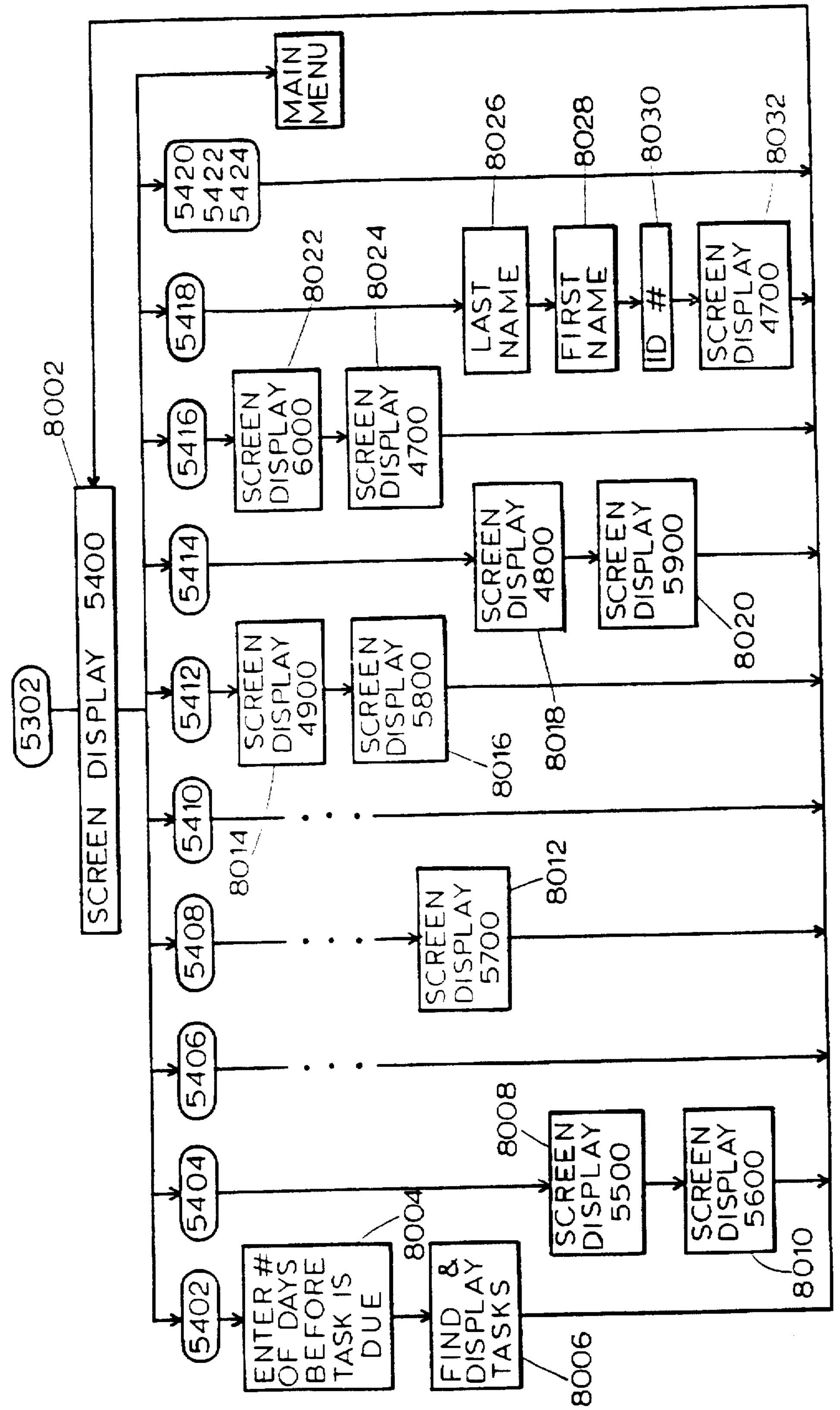

When the Main Menu of the hearing program 122 is entered, a block 7902 as shown in FIG. 79 causes the screen display 5300 to be displayed to the user. If the button 5302 is selected from the screen display 5300, a block 8002 as shown in FIG. 80 causes the screen display 5400 to be displayed to the user. If the user selects the button 5402 from the screen display 5400, a block 8004 causes a screen display similar to the screen display 2000 to be displayed to the user. By use of this screen display, the user may specify a search time period within which tasks may be due. After the user inserts the number of days into this screen display, a block 8006 finds any tasks due between the current date and the date at the end of the time period specified by the user and displays those tasks.

If the user selects the button 5404 from the screen display 5400, a block 8008 causes the screen display 5500 to be displayed to the user. From the screen display 5500, the user may find a job, may add jobs to the jobs listed in the screen display 5500, and/or may accept one of the listed jobs. Upon accepting a job, a block 8010 causes the screen display 5600 to be presented to the user.

If the user selects the button 5406 from the screen display 5400, the hearing program 122 allows the user to find and/or add records related to the locations at which hearing protectors are required as described above.

If the user selects the button 5408 from the screen display 5400, the user may search for, and thereby access, a list of approved hearing protectors. If there are no existing records with respect to approved hearing protectors, the hearing program 122 requests the user to enter a new record and then presents to the user the screen display 4300 from which the user is to select a location for which an approved hearing protector is to be used. After selecting a location, the user is presented with the screen display 4400 in order to select a job title to be associated with the approved hearing protector. After selecting the job title, the user is presented with the screen display 4200 from which the user may select from a list of approved hearing protectors to be associated with the location and job title previously specified. Upon selection of an approved hearing protector, a block 8012 causes the screen display 5700 to be presented to the user.

If the user selects the button 5412 from the screen display 5400, a block 8014 causes the screen display 4900 to be presented to the user. If the user selects an audiometer from the screen display 4900, a block 8016 causes the screen display 5800 to be presented to the user. This screen display lists the audiometers which are used to test the hearing of the employees. Audiometers are added to this list by use of the screen display 4900 and may be deleted from this list by a delete button on the screen display 5800.

If the user selects the button 5414 from the screen display 5400, a block 8018 causes the screen display 4800 to be displayed to the user. If the user selects a test suite from the screen display 4800, a block 8020 causes the screen display 5900 to be presented to the user.

The user may search for, and thereby access, existing employee records such as the employee record shown by the screen display 4700 of FIG. 47. This search is initiated by selecting the button 5416 of the screen display 5400. If the button 5416 is selected, a block 8022 causes the screen display 6000 to be presented to the user. If the user selects an employee from the screen display 6000, a block 8024 causes the screen display 4700 to be presented to the user following which the relevant blocks of FIG. 77 may be performed.

The user may add to existing employee records, such as the employee record shown by the screen display 4700 of FIG. 47. This operation is initiated by selecting the button 5418 of the screen display 5400. If the button 5418 is selected, a block 8026 permits the user to enter the last name of an employee for whom a record is to be made, a block 8028 permits the user to enter the first name of the employee for whom the record is to be made, and a block 8030 permits the user to enter the identification number of the employee for whom the record is to be made. Thereafter, a block 8032 causes the screen display 4700 to be displayed to the user following which the relevant blocks of FIG. 77 may be performed.

Selecting the button 5410 allows the user to add hearing protectors by location and by job to the list of approved hearing protectors. Selection of the buttons 5420 and 5422 allow the user to find and to add other workplace records Selection of the button 5424 allows the user to view and print form templates.

If the user selects the button 5304 from the screen display 5300, a block 7904 as shown in FIG. 79 causes the screen display 6100 to be displayed to the user. If the procedures for the selection of hearing protectors are selected, for example, a block 7906 causes the screen display 6200 to be displayed to the user so that the user may read the standard operating procedures of the workplace hearing protection program. If the user selects the Go To Related button from the screen display 6200, an overlay is presented to permit the use through a link or hypertext function to access (i.e., jump to) forms and records related to the procedure.

If the user selects the button 5306 from the screen display 5300, a block 7908 causes the screen display 6300 to be displayed to the user. This screen display allows the user to view requirements related to the workplace hearing protection program such as the program's general procedures, program administration, a summary of OSHA's noise standards, noise exposure monitoring, and the like. In addition, all requirements may be customized by selection of a button 6302 which jumps the hearing program 122 to the customization routines.

If the button 5312 is selected, a block 7910 causes the screen display 6400 to be displayed to the user. From this screen display, the user is reminded of the information likely to be required by an auditor.

Figure 81:
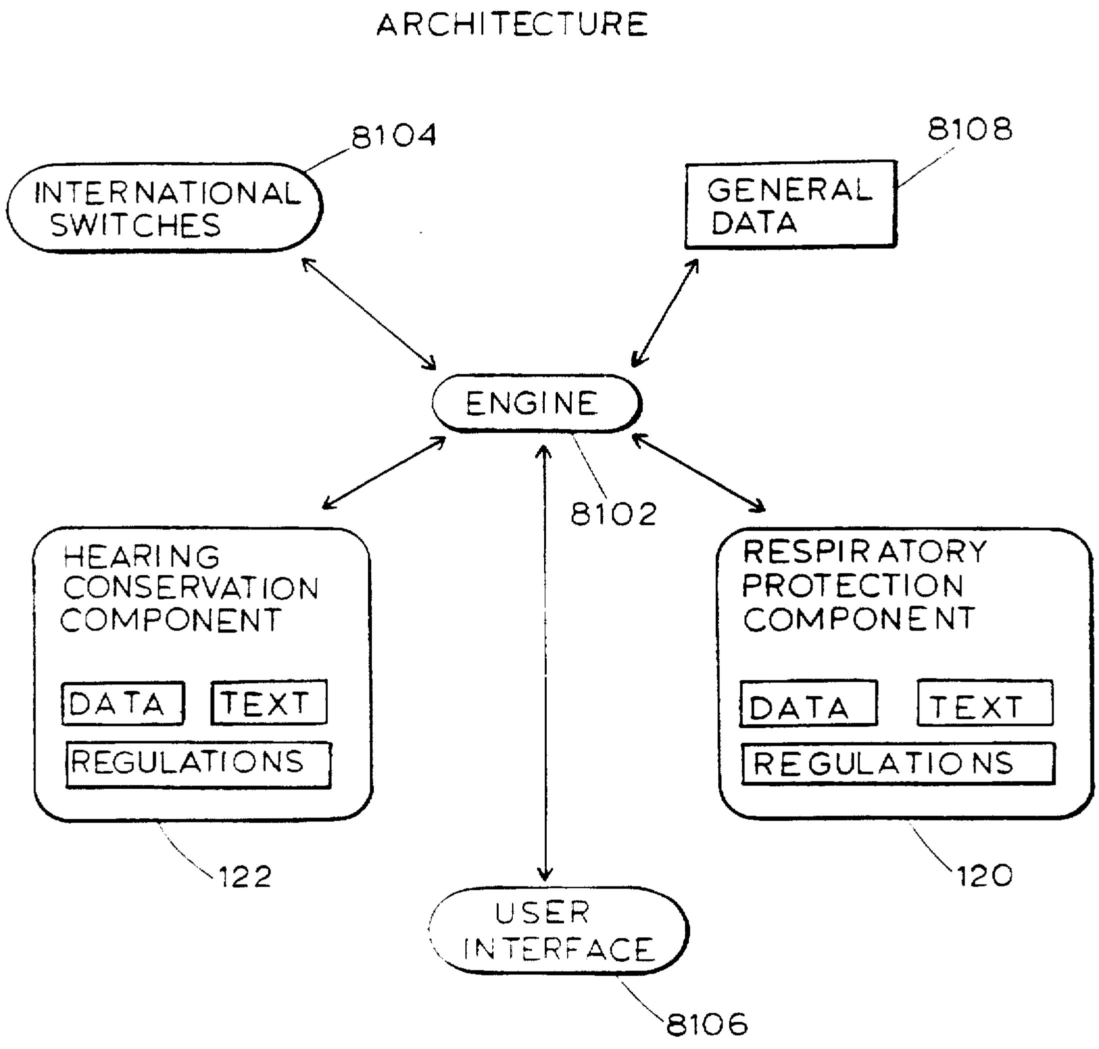

As shown in FIG. 81, the workplace protection set 118 may be arranged in an architecture which permits its separate workplace protection programs to be driven by a common engine 8102. Thus, the separate workplace protection programs can be executed together or they can be easily separated should an employer choose to purchase less than all of the programs in the workplace protection set 118.

For example, the respirator program 120 and the hearing program 122 are arranged to be driven by the engine 8102. International switches 8104 allow the user to switch between the regulations and/or standards of different countries, a user interface 8106 causes the screen displays to be presented to the user and responds to the user's instructions by accepting data and commands, and general data 8108, which are common to both the respirator program 120 and the hearing program 122, are stored in an appropriate database.

As shown in at least some of the screen displays, the Main Menus of the respirator program 120 and the hearing program 122 may be accessed directly from many of the screen displays. Also, the escape key or other key may be used to return to the screen display from which the current screen display was accessed. Moreover, a key such as the function key F1 may be used to display help information concerning any screen display currently being displayed. The present invention provides multiple views of the same data. For example, respirators selected by job and by location may be displayed in the screen displays 1400, 1500, and 2600. The screen displays shown herein are by way of example only. Other screen displays which implement the present invention are possible. Other alternatives and modifications will occur to those skilled in the art. All such alternatives and modifications are covered by the present invention.

We claim:

1. A method of customizing a workplace hearing protection program, the method comprising the steps, performed by a data processing system, of:

(a) executing first program code in order to display forms on a computer display, wherein the forms are useful in a customization of the workplace hearing protection program; and, (b) executing second program code to prompt customization of workplace hearing protection requirements of the workplace hearing protection program based upon the displayed forms.

2. The method of claim 1 further comprising the step of executing third program code to display standard operating procedures relating to the workplace hearing protection program.

3. The method of claim 1 wherein the step of executing the second program code comprises the step of accessing a database which includes knowledge helpful in the customization of the workplace hearing protection requirements.

4. The method of claim 3 wherein the knowledge includes restrictions on the customization of the workplace hearing protection requirements.

5. The method of claim 3 wherein the knowledge includes likely optional entries.

6. The method of claim 3 wherein the knowledge is dependent upon countries for which the workplace hearing protection program is developed.

7. The method of claim 3 wherein the knowledge is dependent upon categories of hearing protectors which may be included in the workplace hearing protection program.

8. The method of claim 1 wherein the step of executing the second program code comprises the step of displaying alerts relating to tasks to be done, and wherein the alerts may be customized by execution of the second program code.

9. The method of claim 1 wherein the step of executing the second program code comprises the step of executing program code to permit customization of all of the workplace hearing protection requirements.

10. The method of claim 1 wherein the step of executing the second program code comprises the step of executing program code to permit customization of all, or of only selected portions, of the workplace hearing protection requirements.

11. The method of claim 1 wherein the step of executing the second program code comprises the step of executing program code to permit customization of only selected portions of the workplace hearing protection requirements.

12. A method of developing a workplace hearing protection program and of preparing for an audit thereof, the method comprising the steps, performed by a data processing system, of:

(a) executing first program code to display first screens which prompt the development of a workplace hearing protection program that complies with governmental hearing protection regulations;

(b) executing second program code to display second screens which assist a user in preparing for an audit of the workplace hearing protection program; and, (c) executing third program code to receive data entered by a user into the first screens and to store the entered data in a database of the data processing system, wherein the data relates to the workplace hearing protection program.

13. The method of claim 12 wherein the step of executing the second program code comprises the step of executing program code to provide knowledge most likely to be requested by an auditor.

14. The method of claim 13 wherein the step of executing program code to provide knowledge most likely to be requested by an auditor comprises the step of providing access to this knowledge from a single screen display.

15. A method of developing and maintaining a workplace hearing protection program, the method comprising the steps, performed by a data processing system, of:

(a) executing first program code to display screens which prompt the development of a workplace hearing protection program that includes hearing protection requirements and creation of records; and, (b) executing second program code to display screens which permit a user to maintain the workplace hearing protection program and to maintain the records so as to stay in compliance with the hearing protection requirements.

16. The method of claim 15 further comprising the step of executing program code to provide integration of the first and second program codes through a single screen display.

17. A method of maintaining a workplace hearing protection program and of preparing for an audit thereof, the method comprising the steps, performed by a data processing system, of:

(a) executing first program code to display screens which permit a user to enter data so as to maintain records relating to the workplace hearing protection program; and, (b) executing second program code to display screens which permit a user to prepare for an audit of the workplace hearing program.

18. The method of claim 17 wherein the step of executing the second program code comprises the step of executing program code to provide knowledge most likely to be requested by an auditor.

19. The method of claim 18 wherein the step of executing program code to provide knowledge most likely to be requested by an auditor comprises the step of providing access to this knowledge from a single screen display.

20. The method of claim 18 wherein the knowledge most likely to be requested by an auditor is based upon the records.

21. A method of developing workplace protection programs, the method comprising the steps, performed by a data processing system, of:

(a) executing first program code to display a first workplace protection program to a user on a computer display;

(b) executing second program code to display a second workplace protection program to the user on a computer display; and, (c) executing third program code to prompt creation by the user of records and to store the records in memory of a computer, wherein the records relate to the first and second workplace protection programs.

22. The method of claim 21 further comprising the step of executing fourth program code in order to maintain the records so as to stay in compliance with protection requirements.

23. The method of claim 21 wherein the first workplace protection program is a respiratory protection program.

24. The method of claim 21 wherein the first workplace protection program is a hearing protection program.

25. The method of claim 21 wherein the first workplace protection program is a hearing protection program, and wherein the second workplace protection program is a respiratory protection program.

26. The method of claim 21 wherein the step of executing first program code comprises the step of executing fourth program code to selectively prompt development by the user of the first workplace protection program based upon requirements of the first workplace protection program stored in the database and displayed to the user on a computer display, and wherein the step of executing second program code comprises the step of executing fifth program code to selectively prompt development by the user of the second workplace protection program based upon requirements of the second workplace protection program stored in the database and displayed to the user on a computer display.

27. The method of claim 26 wherein the step of executing fourth program code comprises the step of executing program code to prompt the development of the first workplace protection program by the user which complies with regulations relating to governmental workplace protection requirements, and wherein the step of executing fifth program code comprises the step of executing program code to prompt the development of the second workplace protection program by the user which complies with regulations relating to governmental workplace protection requirements.

28. The method of claim 26 wherein the steps of executing fourth and fifth program code to selectively prompt development by the user of corresponding first and second workplace protection programs each comprises the step of executing program code in order to display on the computer display forms useful to the user in the development of the corresponding first and second workplace protection programs, wherein the forms are stored in the database.

29. The method of claim 28 wherein the forms represent the records.

30. The method of claim 28 wherein the forms represent records of data concerning hearing protection of employees.

31. The method of claim 28 wherein the forms represent records of data concerning respiratory protection of employees.

32. The method of claim 26 further comprising the step of, upon development of the first and second workplace protection programs, executing program code to display on the computer display standard operating procedures relating to the first and second workplace protection programs, wherein the standard operating procedures are stored in the database of the data processing system.

33. The method of claim 21 further comprising a common engine for driving execution of the first and second program code.

34. The method of claim 33 wherein the first and second program code are separately executable.

35. The method of claim 21 wherein the first and second program code are separately executable.

36. The method of claim 21 wherein the first and second program code share resources.

37. The method of claim 36 further comprising a common engine for driving execution of the first and second program code.

38. The method of claim 36 wherein the shared resources comprise an engine.

39. The method of claim 36 wherein the shared resources comprise information on employees.

40. The method of claim 36 wherein the shared resources comprise information on jobs and locations.

41. The method of claim 21 wherein the records are displayed as forms.

42. The method of claim 41 wherein the forms represent records of data concerning hearing protection of employees.

43. The method of claim 41 wherein the forms represent records of data concerning respiratory protection of employees.

44. The method of claim 21 wherein the step of executing first program code comprises the step of executing program code to display first standard operating procedures relating to the first workplace protection program on the computer display, wherein the step of executing second program code comprises the step of executing program code to display second standard operating procedures relating to the second workplace protection program on the computer display, and wherein the first and second standard operating procedures are stored in a database of the data processing system.

45. A computer readable storage medium having program code stored thereon, wherein the program code is arranged so that, when the program code is executed by a computer, a) requirements of a workplace hearing protection program are retrieved from a database stored on the computer readable storage medium and are displayed to a user by way of a computer display, and b) development of the workplace hearing protection program is prompted based upon the requirements of the workplace hearing protection program stored in the database and displayed to the user.

46. The computer readable storage medium of claim 45 wherein the program code is arranged so that, when the program code is executed by a computer, the development of the workplace hearing protection program is prompted so that the workplace hearing protection program, when developed, complies with regulations relating to governmental hearing protection requirements.

47. The computer readable storage medium of claim 46 wherein the program code is arranged so that, when the program code is executed by a computer, forms are displayed on the computer display during development of the workplace hearing protection program, wherein the forms are useful in the development of the workplace hearing protection program, and wherein the forms are stored in the database of the computer readable storage medium.

48. The computer readable storage medium of claim 45 wherein the program code is arranged so that, when the program code is executed by a computer, forms are displayed on the computer display during development of the workplace hearing protection program, wherein the forms are useful in the development of the workplace hearing protection program, and wherein the forms are stored in the database of the computer readable storage medium.

49. The computer readable storage medium of claim 45 wherein the program code is arranged so that, when the program code is executed by a computer, standard operating procedures are displayed on the computer display upon development of the workplace hearing protection program, wherein standard operating procedures relate to the workplace hearing protection program, and wherein the standard operating procedures are stored in the database of the computer readable storage medium.

50. A computer readable storage medium having program code stored thereon, wherein the program code is arranged so that, when the program code is executed by a computer, a) requirements for a workplace hearing protection program are displayed on a computer display, b) forms useful in the development of the workplace hearing protection program are displayed on the computer display, and c) the requirements for the workplace hearing protection program and the forms useful in the development of the workplace hearing protection program are linked in hypertext fashion.

51. The computer readable storage medium of claim 50 wherein the program code is arranged so that, when the program code is executed by a computer, the forms represent records of data concerning hearing protection of employees, and multiple views of the data concerning hearing protection of employees are displayed on the computer display.

52. The computer readable storage medium of claim 50 wherein the program code is arranged so that, when the program code is executed by a computer, standard operating procedures related to the workplace hearing protection program are displayed on the computer display.

53. The computer readable storage medium of claim 52 wherein the program code is arranged so that, when the program code is executed by a computer, the requirements for the workplace hearing protection program, the forms useful in the development of the workplace hearing protection program, and the standard operating procedures related to the workplace hearing protection program are linked in hypertext fashion.

54. A computer readable storage medium having first, second, and third program code stored thereon, wherein the first, second, and third program code are arranged so that, (i) when the first program code is executed by a computer, execution of the second and third program code is selected, (ii) when execution of the second program code is selected, the second program code is executed to retrieve requirements of a first workplace protection program from a database of the data processing system, to display the requirements of the first workplace protection program to a user, and to prompt development of the first workplace protection program based upon the requirements of the first workplace protection program stored in the database and displayed to the user on a computer display, and (ii) when execution of the third program code is selected, the third program code is executed to retrieve requirements of a second workplace protection program from a database of the data processing system, to display the requirements of the second workplace protection program to the user, and to prompt development of the second workplace protection program based upon the requirements of the second workplace protection program stored in the database and displayed to the user on the computer display.

55. The computer readable storage medium of claim 54 wherein the first workplace protection program is a respiratory protection program.

56. The computer readable storage medium of claim 54 wherein the first workplace protection program is a hearing protection program.

57. The computer readable storage medium of claim 54 wherein the first workplace protection program is a hearing protection program, and wherein the second workplace protection program is a respiratory protection program.

58. The computer readable storage medium of claim 54 wherein the second program code is arranged so that, when the second program code is executed, the development of the first workplace protection program which complies with regulations relating to governmental workplace protection requirements is prompted, and wherein the third program code is arranged so that, when the third program code is executed, the development of the second workplace protection program which complies with regulations relating to governmental workplace protection requirements is prompted.

59. The computer readable storage medium of claim 58 wherein the second and third program code are arranged so that, when the second and third program code are executed, forms useful in the development of the corresponding first and second workplace protection programs are displayed on the computer display, and wherein the forms are stored in the database of the computer readable storage medium.

60. The computer readable storage medium of claim 59 wherein the forms represent records of data concerning respiratory protection of employees, and wherein the computer readable storage medium further has fourth program code stored thereon, wherein the fourth program code is arranged so that, when the fourth program code is executed, multiple views of the data are displayed on the computer display.

61. The computer readable storage medium of claim 59 wherein the forms represent records of data concerning hearing protection of employees, and wherein the computer readable storage medium further has fourth program code stored thereon, wherein the fourth program code is arranged so that multiple views of the data are displayed on the computer display.

62. The computer readable storage medium of claim 54 wherein the second and third program code are arranged so that, when the second and third program code are executed, forms useful in the development of the corresponding first and second workplace protection programs are displayed on the computer display, and wherein the forms are stored in the database of the computer readable storage medium.

63. The computer readable storage medium of claim 54 wherein the computer readable storage medium further has fourth program code stored thereon, wherein the fourth program code is arranged so that, when the fourth program code is executed, standard operating procedures relating to the developed workplace protection program are displayed on the computer display, wherein the standard operating procedures are stored in the database of the computer readable storage medium.

64. The computer readable storage medium of claim 54 wherein the computer readable storage medium stores a common engine for driving execution of the second and third program code.

65. The computer readable storage medium of claim 54 wherein the second and third program code are separately executable.

66. The computer readable storage medium of claim 54 wherein the second and third program code are separately executable.

67. The computer readable storage medium of claim 54 wherein the second and third program code share resources stored on the computer readable storage medium.

68. The computer readable storage medium of claim 67 wherein the computer readable storage medium stores a common engine for driving execution of the second and third program code.

69. The computer readable storage medium of claim 67 wherein the shared resources comprise an engine.

70. The computer readable storage medium of claim 67 wherein the shared resources comprise information on employees.

71. The computer readable storage medium of claim 67 wherein the shared resources comprise information on jobs and locations.

* * * * *